(12) United States Patent
Takagi

(10) Patent No.: US 7,635,506 B2
(45) Date of Patent: Dec. 22, 2009

(54) STRETCHED CELLULOSE ESTER FILM, HARD COAT FILM, ANTIREFLECTIVE FILM, AND OPTICAL COMPENSATION FILM, AND POLARIZING PLATE, AND DISPLAY DEVICE USING THEM

(75) Inventor: Takahiro Takagi, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 89 days.

(21) Appl. No.: 11/403,340

(22) Filed: Apr. 13, 2006

(65) Prior Publication Data
US 2006/0182901 A1 Aug. 17, 2006

Related U.S. Application Data

(63) Continuation-in-part of application No. PCT/JP2004/018977, filed on Dec. 14, 2004.

(30) Foreign Application Priority Data

Dec. 24, 2003 (JP) ............................. 2003-426549

(51) Int. Cl.
*B32B 23/16* (2006.01)

(52) U.S. Cl. ................ 428/1.33; 106/182.1; 106/184.3; 106/186.2

(58) Field of Classification Search ................ 428/1.33, 428/1.54; 106/181.1, 182.1, 184.3, 186.2; 264/191, 200, 207–208, 211; 349/117, 96
See application file for complete search history.

(56) References Cited

U.S. PATENT DOCUMENTS 2,689,799 A * 9/1954 Albus et al. ............ 106/169.39
3,110,603 A * 11/1963 Ingwalson et al. ..... 106/169.36
3,211,688 A * 10/1965 Eisenhard et al. ........... 524/308
5,308,802 A * 5/1994 Haun ........................... 501/12

(Continued)

FOREIGN PATENT DOCUMENTS

JP 2002-292659 A 10/2002

(Continued)

OTHER PUBLICATIONS

Notice of Rejection from JP Patent Office in JP 2005-516482.

*Primary Examiner*—David R Sample
*Assistant Examiner*—Sophie Hon
(74) *Attorney, Agent, or Firm*—Frishauf, Holtz, Goodman & Chick, P.C.

(57) ABSTRACT

In a stretched cellulose ester film containing a plasticizer, the plasticizer includes at least an aromatic terminal ester type plasticizer expressed by the following general formula (1): and stretched cellulose ester film includes a cellulose ester having a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, B—(G—A)$n$—G—B     General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

18 Claims, 1 Drawing Sheet

U.S. PATENT DOCUMENTS

| | | |
|---|---|---|
| 6,958,394 B2 | 10/2005 | Saito |
| 2003/0037703 A1* | 2/2003 | Saito .................... 106/169.33 |
| 2003/0156235 A1* | 8/2003 | Kuzuhara et al. ............. 349/96 |
| 2003/0170482 A1* | 9/2003 | Murakami ................. 428/615 |

FOREIGN PATENT DOCUMENTS

| | | |
|---|---|---|
| JP | 2003-012823 A | 1/2003 |
| JP | 2003-033998 A | 2/2003 |
| JP | 2003-096236 A | 4/2003 |
| JP | 2003-232920 A | 8/2003 |
| JP | 2003-232926 A | 8/2003 |
| JP | 2003-248104 A | 9/2003 |

* cited by examiner

STRETCHED CELLULOSE ESTER FILM, HARD COAT FILM, ANTIREFLECTIVE FILM, AND OPTICAL COMPENSATION FILM, AND POLARIZING PLATE, AND DISPLAY DEVICE USING THEM

This application is a Continuation-in-Part Application of International Application PCT/JP2004/018977 filed on Dec. 14, 2004 in the Japanese Patent Office, which is incorporated herein by this reference in its entirety.

TECHNICAL FIELD

The present invention relates to an stretched cellulose ester film, hard coat film, antireflection film, optical compensation film, and the polarizing plate and display apparatus using these films, particularly to an stretched cellulose ester film, hard coat film, antireflection film, optical compensation film, and the polarizing plate and display apparatus using these films characterized by excellent resistance to a rupture during the production, sticking or depression during long-term storage and transportation, as well as superb dimensional stability and flatness.

BACKGROUND ART

In recent years, high quality displays, for example, a full color display for a note book computer or for a mobile telephone, and a high resolution display, have been developed. These high quality displays are required to have a highly functional optical film exhibiting antireflective or antistatic properties. The surface of such a display is often touched so that the display is required to be resistant to scratching. Accordingly, a hard coat film is usually provided on the surface of a display. Recently, in order to improve visibility, displays are required to have antireflective and antistain properties. For these purposes, an optical film of a cellulose ester having a functional film (such as a metal oxide film) has been developed. The functional film may be provided directly or after forming an interlayer on the cellulose ester film. Also, a thinner hard coat film for a thinner display, or a wider hard coat film for a larger display is demanded. Specifically, for a large area display, a sufficiently flat hard coat film is desired. However, so far, a wide and thin hard coat film with superior flatness has been difficult to obtain. Also, a wide film with sufficient scratch resistance has yet to be obtained.

Generally, a cellulose ester film contains such an additive as a plasticizer and ultraviolet absorber. Such an additive is utilized to improve the processability and moisture permeability of the cellulose ester film. However, use of such an additive involves a problem of coating degeneration when the cellulose ester film is coated with various types pf coating layers. Bleed-out or volatilization of such an additive has raised the problem of causing a change in physical properties and degenerating the storage stability of the unprocessed cellulose ester film.

Further, the cellulose ester film absorbs moisture to expand and shrink. When the end of a wide roll film in particular is provided with knurling, the film is elongated or slackened by moisture absorption and expansion. This causes a roughened surface, streak and fold to be produced on the film. This problem has been particularly serious in a thin film. There has been a intense demand for improvement.

One of the solutions to the aforementioned problems is proposed in a laminated cellulose ester film based on the co-casting method for providing a distribution in widthwise direction of the film in the process of containing a plasticizer and ultraviolet absorber (Patent Documents 1 through 4). Another solution is found in the method of changing the type of the plasticizer or using a plurality of the types of plasticizers (Patent Documents 5 through 8). However, the advantages of these methods are restricted in a wide and thin film. Satisfactory improvement cannot be achieved in dimensional stability and flatness.

On the other hand, a method of including a polyester or polyester ether for improvement of dimensional stability has been disclosed (Patent Documents 9 and 10). It has been made clear, however, the cellulose ester film disclosed in the (Patent Documents 9 and 10) has a problem of sticking during a long-term storage. It has been revealed that, especially when the film is wound up in the form of a roll and is exposed to a high temperature and humidity, sticking tends to occur. This problem was not very serious in the earlier stage. However, when the film is transported to overseas countries by ship, the film is exposed to severe conditions of a high temperature and humidity for a long time. This problem has come to require a solution. Further, the winding shape of a film may be subjected to concave deformation during the long-term transportation. This problem also requires a solution.

To control the optical characteristics and physical properties, drawing must be made at a higher draw rate. To improve productivity, film production speed must be increased. This has resulted in a film more vulnerable to rupture. The solution to this problem is urgently required.

[Patent Document 1] Official Gazette of Japanese Patent Tokkaihei 8-207210

[Patent Document 2] Official Gazette of Japanese Patent Tokkai 2001-131301

[Patent Document 3] Official Gazette of Japanese Patent Tokkai 2001-151902

[Patent Document 4] Official Gazette of Japanese Patent Tokkai 2002-90544

[Patent Document 5] Official Gazette of Japanese Patent Tokkaihei 5-5047

[Patent Document 6] Official Gazette of Japanese Patent Tokkaihei 11-124445

[Patent Document 7] Official Gazette of Japanese Patent Tokkaihei 11-246704

[Patent Document 8] Official Gazette of Japanese Patent Tokkai 2001-247717

[Patent Document 9] Official Gazette of Japanese Patent Tokkai 2002-22956

[Patent Document 10] Official Gazette of Japanese Patent Tokkai 2002-120244

DISCLOSURE OF THE INVENTION

The object of the present invention is to provide an stretched cellulose ester film, hard coat film, antireflection film and optical compensation film, as well as a polarizing plate and display apparatus using such films, characterized by excellent resistance to rupture during production and sticking or depression during long-term storage and transportation, and superb dimensional stability and flatness.

To achieve the aforementioned object;

(1) One of the embodiments of the present invention is an stretched cellulose ester film containing plasticizers, wherein at least one of the aforementioned plasticizers is an aromatic terminal ester plasticizer expressed by the following general formula (1), and the aforementioned stretched cellulose ester film is the cellulose ester having an overall degree of substitution of the acyl group being 2.4 through 2.9, a number average molecular weight (Mn) of 30000 through 200000, and a weight-average molecular weight (Mw)/number average molecular weight (Mn) of 1.4 through 3.0:

B—(G—A)n—G—B        General formula (1)

where B denotes a benzenemonocarboxylic acid residue, G indicates an alkylene glycol residue having a carbon number of 2 through 12 or an oxyalkylene glycol residue having a carbon number of 4 through 12, A shows an alkylene dicarboxylic acid residue having a carbon number of 4 through 12, and n indicates an integer of 0 or more.

(2) Another embodiment of the present invention is the stretched cellulose ester film described in the aforementioned (1), wherein the aromatic terminal ester plasticizer expressed by the aforementioned general formula (1) has an acid number of 0.5 mgKOH/g or less.

(3) A further embodiment of the present invention is the stretched cellulose ester film described in the aforementioned (1) or (2), wherein polyvalent alcohol ester plasticizers are further contained as the aforementioned plasticizers.

(4) A still further embodiment of the present invention is the stretched cellulose ester film described in any one of the aforementioned (1) through (3), further containing a benzophenone ultraviolet absorber or triazine ultraviolet absorber.

(5) A still further embodiment of the present invention is the stretched cellulose ester film described in any one of the aforementioned (1) through (4), further containing a polycondensation of reactive metallic compound.

(6) A still further embodiment of the present invention is the stretched cellulose ester film described in any one of the aforementioned (1) through (5), the aforementioned stretched cellulose ester film having a thickness of 10 μm through 70 μm.

(7) A still further embodiment of the present invention is the stretched cellulose ester film described in any one of the aforementioned (1) through (6), the aforementioned stretched cellulose ester film having a width of 1.4 m through 4 m.

(8) A still further embodiment of the present invention is a hard coat film, wherein an actinic radiation curable resin layer is provided on the oriented cellulose ester described in any one of the aforementioned (1) through (7).

(9) A still further embodiment of the present invention is an antireflection film wherein an antireflection layer is provided on the hard coat film described in the aforementioned (8).

(10) A still further embodiment of the present invention is an optical compensation film, wherein, in the stretched cellulose ester film described in any one of the aforementioned (1) through (7), the Ro defined by the following formula is 20 nm through 300 nm at a temperature of 23° C. with a relative humidity of 55% RH, and the Rt is 70 through 400 nm at a temperature of 23° C. with a relative humidity of 55% RH:

$Ro=(Nx-Ny) \times d$ $Rt=\{(Nx+Ny)/d-Nz\} \times d$ where Nx, Ny and Nz represent the refractive indexes in the directions of the main axes x, y and z of the indicatrix, respectively; Nx and Ny denote the refractive index in the film in-plane direction; and Nz shows the refractive index in the widthwise direction of the film, wherein Nx>Ny, and d indicates the thickness (nm) of the film.

(11) A still further embodiment of the present invention is a polarizing plate further containing the antireflection film described in the aforementioned (9) or the optical compensation film described in the aforementioned (10).

(12) A still further embodiment of the present invention is a display apparatus, wherein the antireflection film described in the aforementioned (9) is provided on the surface.

(13) A still further embodiment of the present invention is a display apparatus further containing the polarizing plate described in the aforementioned (11).

BEST MODE FOR CARRYING OUT THE INVENTION

Figure 1:
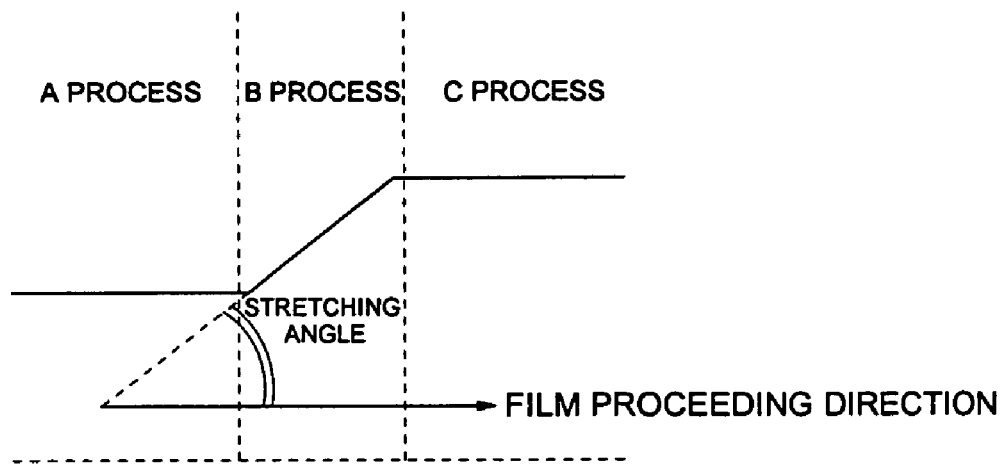
FIG. 1 is a schematic drawing explaining a stretching angle in a stretching process.

The following describes the best embodiments of the present invention without being restricted thereto:

The stretched cellulose ester film of the present invention (hereinafter referred to also as "cellulose ester film") is an stretched cellulose ester film containing plasticizers, wherein at least one of the aforementioned plasticizers is an aromatic terminal ester plasticizer expressed by the following general formula (1), and the aforementioned stretched cellulose ester film is the cellulose ester having an overall degree of substitution of the acyl group being 2.4 through 2.9, a number average molecular weight (Mn) of 30000 through 200000, and a weight-average molecular weight (Mw)/number average molecular weight (Mn) of 1.4 through 3.0:

B—(G—A)n—G—B        General formula (1)

where B denotes a benzenemonocarboxylic acid residue, G indicates an alkylene glycol residue having a carbon number of 2 through 12 or an oxyalkylene glycol residue having a carbon number of 4 through 12, A shows an alkylene dicarboxylic acid residue having a carbon number of 4 through 12, and n indicates an integer of 0 or more.

The plasticizer used in the conventional cellulose ester film is easy to bleed out. Thus, if the plasticizer is to be contained in the amount required to adjust the moisture permeability of the cellulose ester film, the plasticizer is removed at the time of manufacturing or storing the film, and the dimensional stability and flatness of the film are deteriorated. In contrast, the plasticizer of the present invention does not exhibit such a behavior even if it is added in a great amount. It provides an excellent function as a moisture permeable adjustor. Moreover, when combined with the cellulose ester having specific physical properties, this plasticizer provides remarkable advantages. The discovery of this phenomenon has led the present inventors to the present invention. The present inventors have also found out that, when the acid value of the aromatic terminal ester plasticizer expressed by the aforementioned general formula (1) is 0.5 mgKOH/g or less, the advantages of the present invention are more effectively improved.

Hereinafter, the present invention will be explained in detail.

In the present invention, the Mw/Mn value of the cellulose ester is preferably from 1.4 to 3.0, which means that it is acceptable when the Mw/Mn value of the cellulose ester itself is from 1.4 to 3.0, however it is more preferable that the Mw/Mn value of entire cellulose ester film including those used as the protective film of the polarizing plate (preferably cellulose triacetate or cellulose acetate propionate) is from 1.4 to 3.0. It is difficult to obtain a cellulose ester having a Mw/Mn value lower than 1.4 in the preparation process. It is possible to obtain a cellulose ester having monodistributed molecular weight by fractionating through gel filtration, however, this method is undesirable since it is expensive. The cellulose ester having Mw/Mn values higher than 3.0 is also undesirable because these materials may cause a loss in flatness of the film. The Mw/Mn value is more preferably from 1.7 to 2.2.

The number average molecular weight (Mn) of the cellulose ester is required to be from 30,000 to 200,000.

For a cellulose ester having a large Mn value with a small molecular weight distribution, the amount of the plasticizers and the UV absorbing agent solving out of the cellulose ester film in the casting process of the hard coat layer are assumed to be small. It is also assumed that this effect becomes more noticeable for a cellulose ester in which cellulose ester molecules are oriented in the lateral direction as a result of a biaxial stretching. The total acyl substitution degree of the cellulose ester is required to be from 2.4 to 2.9 because the appropriately remaining unsubstituted hydroxyl groups in the cellulose ester chains may form hydrogen bonds with the plasticizers and the UV absorbing agent resulting in lowering the amount of those compounds solving out of the cellulose ester film.

<Cellulose Ester>

The number average molecular weight (Mn) of the cellulose ester used in the present invention is preferably from 30,000 to 200,000, more preferably from 50,000 to 200,000 and still more preferably from 70,000 to 200,000.

The ratio of molecular weight distribution Mw/Mn of the cellulose ester used in the present invention is preferably from 1.4 to 3.0 and more preferably from 1.7 to 2.2.

The average molecular weight and the molecular weight distribution can be determined by any well known method in the art using high-speed liquid chromatography, a number average molecular weight and a weight average molecular weight are calculated utilizing the same and the ratio (Mw/Mn) thereof can be determined.

The measurement conditions are as follows:

Solvent: methylene chloride

Column: Shodex K806, K805, K803G (three columns of products by Showa Denko K. K. were utilized in a junction)

Column temperature: 25° C.

Sample concentration: 0.1 percent by weight

Detector: RI Model 504 (produced by GL Science Co.)

Pump: L6000 (produced by Hitachi, Ltd.)

Flow rate: 1.0 ml/min

Calibration curve: calibration curves based on 13 samples of standard polystyrene STK, standard polystyrene (manufactured by Tosoh Corp.) Mw=500 to 1,000,000, were utilized. The intervals among the 13 samples should be almost equal.

The cellulose ester used in the present invention is a carboxylate ester having from 2 to 22 carbon atoms, and specifically, a lower fatty acid ester of a cellulose is preferably used. The lower fatty acid represents one having carbon atoms of 6 or fewer, including, for example: cellulose acetate, cellulose propionate, cellulose butyrate, cellulose acetate phthalate and mixed fatty acid esters disclosed in JP-A 10-45804, JP-A 8-231761, and U.S. Pat. No. 2,319,052 (for example: cellulose acetatepropionate and cellulose acetatebutyrate). Among these, cellulose triacetate, and cellulose acetatepropionate are specifically preferable. These cellulose esters are preferably also used in combination.

For cellulose triacetate, one with a total acyl substitution degree from 2.6 to 2.9 is preferably used.

Another preferable cellulose ester besides cellulose triacetate, is one having an acyl group with from 2 to 22 carbon atoms as a substituent, when a substitution degree of acetyl group is X and a substitution degree of acyl group with from 3 to 22 carbon atoms is Y, and simultaneously satisfying the following formulae (I) and (II):

$$2.4 \leq X+Y \leq 2.9 \qquad \text{Formula (I)}$$

$$0 \leq X \leq 2.5 \qquad \text{Formula (II)}$$

Especially, cellulose acetate propionate with $1.9 \leq X \leq 2.5$ and $0.1 \leq Y \leq 0.9$ (while X+Y corresponds to the total acyl substitution degree) is preferable. A hydroxyl group remains in the part where acyl substitution is not carried out. These esters may be prepared through any well known method in the art.

An acyl substitution degree can be determined through a method prescribed in ASTM-D817-96.

Cellulose ester can be prepared using cotton linter, wood pulp or kenaf as starting materials which may be used alone or in combination. It is particularly preferable to use a cellulose ester prepared from cotton linter (hereafter described merely as linter) or from wood pulp.

These cellulose esters may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

In the case of an acetyl cellulose, it is necessary to prolong the acetylation duration in order to obtain a higher degree of acetylation, however, a too long acetylation duration may result in a undesirable reaction such as cutting off of a polymer chain or a decomposition of an acyl group. Accordingly, the acetylation duration should be limited within an appropriate range, however, specifying a degree of acetylation with an acetylation duration is not fully recommended because the acetylation conditions differ when a different reactor or different equipment is utilized. In general, during decomposition of a polymer, the distribution of the molecular weight increases, so that, also in the case of a cellulose ester, the degree of decomposition can be specified by the commonly used Mw/Mn value, where Mw represents a weight average molecular weight and Mn denotes a number average molecular weight. Namely, the Mw/Mn value can be used as one of the parameters representing the degree of acetylation reaction at which the decomposition of the polymer has not been excessive and, at the same time, sufficient acetylation has already been achieved.

An example of a preparation method of cellulose ester is described below. Cotton linter of 100 weight parts as a starting material of cellulose was crushed, and after adding 40 weight parts of acetic acid, the system was pretreated for activation at 36° C. for 20 minutes. Thereafter, 8 weight parts of sulfuric acid, 260 weight parts of acetic anhydride and 350 weight parts of acetic acid were added, after which esterification was performed at 36° C. for 120 minutes. The system was saponification ripened at 63° C. for 35 minutes after being neutralized with 11 weight parts of 24% magnesium acetate aqueous solution to obtain acetyl cellulose. After the system was stirred with adding ten times of an acetic acid solution (acetic acid/water=1/1, based on weight ratio) at ambient temperature for 160 minutes, the resulting solution was filtered and dried to obtain a purified acetyl cellulose having an acetyl substitution degree of 2.75. The obtained acetyl cellulose exhibited Mn of 92,000, Mw of 156,400, and Mw/Mn of 1.7. In a similar manner, cellulose esters having different substitution degrees and different Mw/Mn ratios can be synthesized by controlling the esterification conditions of cellulose ester (temperature, duration and stirring rate) as well as hydrolysis conditions. Removal of low molecular weight component by refining and removal of non-acetized component by filtering from the prepared cellulose ester are also preferably carried out.

Further, a cellulose ester of mixed acids can be prepared by a reaction employing the method described in JP-A 10-45804. The acyl substitution degree can be measured according to the definition of ASTM-D817-96.

The properties of a cellulose ester are influenced by residual amounts of metal components which may be originated from the water used in the manufacturing process. Metal components which may cause insoluble cores should preferably be minimal. Metal ions of iron (Fe), calcium (Ca), magnesium (Mg) and other metals may form insoluble cores by forming salts in combination with decomposition products of polymers which may possibly contain organic acid groups. Accordingly these metal ions should be minimal. The amount of iron is preferably less than 1 ppm. Calcium is contained in a considerable quantity in groundwater or in river water, and an appreciable quantity of which forms hard water. Calcium easily forms a coordinated compound, namely a complex, with acid components such as carbonic acid, sulfuric acid, or with various ligands, and causes much insoluble scum (insoluble residue and turbidity).

The preferable amount of calcium is commonly less than 60 ppm, and is more preferably from 0 to 30 ppm. Too much magnesium may also cause insoluble residue, and the preferable amount is from 0 to 70 ppm, more preferably from 0 to 20 ppm. After an absolutely dry cellulose ester film is treated with a microdigest wet-decomposer (sulfuric acid-nitric acid decomposing) followed by being subjected to alkali fusion, the amounts of iron, calcium, magnesium are determined by means of IPC-AES (Inductively Coupled Plasma-Atomic Emission Spectroscopy).

<Plasticizers>

It is characterized in that at least one of the plasticizer according to the present invention is an aromatic teminal ester type plasticizer expressed with the following general formula (I).

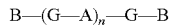

B—(G—A)$_n$—G—B    Formula (I)

where B represents benzene monocarboxylic acid residue, G represents an alkylene glycol residue having 2-12 carbon atoms or an oxyalkylene glycol residue having 4-12 carbon atoms, A represents an alkylene dicarboxylic residue having 4-12 carbon atoms and n represents an integer of 0 or more. A compound represented by Formula (1) is prepared through a reaction similar to the preparation reaction of a common polyester type plasticizer.

Examples of a benzene monocarboxylic acid component of the aromatic teminal ester of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the aromatic teminal ester of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids.

The number average molecular weight of the aromatic teminal ester used in the present invention is preferably 250-2000, and more preferably 300-1500. The acid value of the ester plasticizer used in the present invention is preferably not more than 0.5 mgKOH/g and more preferably not more than 0.3 mgKOH/g. The hydroxyl value of the ester plasticizer used in the present invention is preferably not more than 25 mgKOH/g and more preferably not more than 15 mgKOH/g.

<Acid Number of Aromatic Teminal Ester, Hydroxyl Value>

An acid number means the milligram quantity of potassium hydroxide required in order to neutralize the acid (a carboxyl group which exists in a teminal end of molecule) contained in a sample of 1 g. The acid number and hydroxyl value are measured based on JIS K0070.

Examples of a synthetic method of an aromatic terminal ester type plasticizer are shown below:

<Sample No. 1 (Aromatic Terminal Ester Sample)>

In a container, 365 weight parts (2.5 moles) of adipic acid, 418 weight parts (5.5 moles) of 1,2-propylene glycol, 610 weight parts (5 moles) of benzoic acid and 0.30 weight part of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated and, finally, to 3 mmHg at 200-230° C., while the distillate was removed. The product was filtered to obtain an aromatic terminal ester having the following features:

Viscosity (25° C., mPa·s): 815

Acid value: 0.4

<Sample No. 2 (Aromatic Terminal Ester Sample)>

An aromatic terminal ester having the following features was prepared in the same manner as Sample No. 1 except that 365 weight parts (2.5 moles) of adipic acid, 610 weight parts (5 moles) of benzoic acid, 583 weight parts (5.5 moles) of diethylene glycol and 0.45 weight part of tetra-isopropyl titanates (as a catalyst) were used in a container.

Viscosity (25° C., mPa·s): 90

Acid value: 0.05

<Sample No. 3 (Aromatic Terminal Ester Sample)>

An aromatic terminal ester having the following features was prepared in the same manner as Sample No. 1 except that 365 weight parts (2.5 moles) of adipic acid, 610 weight parts (5 moles) of benzoic acid, 737 weight parts (5.5 moles) of dipropylene glycol and 0.40 weight part of tetra-isopropyl titanates (as a catalyst) were used.

Viscosity (25° C., mPa·s): 134
Acid value: 0.03

<Sample No. 4 (Aromatic Terminal Ester Sample)>

In a container, 365 weight parts (2.5 moles) of adipic acid, 418 weight parts (5.5 moles) of 1,2-propylene glycol, 548 weight parts (4 moles) of p-methyl benzoic acid and 0.30 weight part of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated at 200-230° C. and, finally, to 3 mmHg, while the distillate was removed. The product was filtered to obtain an aromatic terminal ester having the following features:

Viscosity (25° C., mPa·s): 905 mPa·s
Acid value: 0.5

<Sample No. 5 (Aromatic Terminal Ester Sample)>

In a container, 365 weight parts (2.5 moles) of adipic acid, 418 weight parts (5.5 moles) of 1,2-propylene glycol, 685 weight parts (5 moles) of p-methyl benzoic acid and 0.20 weight part of tetra-isopropyl titanates (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated at 200-230° C. and, finally, to 3 mmHg, while the distillate was removed. The product was filtered to obtain an aromatic terminal ester having the following features:

Viscosity (25° C., mPa·s): 820
Acid value: 0.6

<Sample No. 6 (Comparative Polyester Sample)>

A polyester having the following features was prepared in the same manner as Sample No. 1 except that 730 weight parts (5 moles) of adipic acid, 441 weight parts (4.9 moles) of 1,3-butanediol, 169 weight parts (1.3 moles) of 2-ethyl hexanol and 0.4 weight part of dibutyl tin oxide (as a catalyst) were used in conatiner.

Viscosity (25° C., mPa·s): 3000
Acid value: 0.53

<Sample No. 7 (Comparative Polyester Sample)>

A polyester having the following features was prepared in the same manner as Sample No. 1 except that 730 weight parts (5 moles) of adipic acid, 190 weight parts (2.5 moles) of 1,2-propylene glycol, 225 weight parts (2.5 moles) of 1,3-butanediol, 216 weight parts (1.5 moles) of iso-nonanol and 0.16 weight part of tetra-isopropyl titanates (as a catalyst) were used in conatiner.

Viscosity (25° C., mPa·s): 3480
Acid value: 1.8

The content of the aromatic terminal ester plasticizer in the cellulose ester film is preferably 1 through 20 percentage by mass, more preferably 3 through 11 percentage by mass.

The cellulose ester film used in the present invention is also preferred to contain a plasticizer other than the aforementioned plasticizer.

When two or more types of plasticizer are included, leaching of the plasticizer is reduced. The reason is not yet made clear. It appears that leaching is reduced by reduction in the amount to be added per one type, and interaction between two or more types of plasticizer and interaction between the plasticizer and cellulose ester.

There is no restriction to the two or more types of plasticizer. However, they are preferably selected from among the following polyvalent alcohol ester plasticizer, phthalic acid ester, citric acid ester, fatty acid ester, glycolate plasticizer and polyvalent carboxylic acid ester. At least one type of them is preferably the polyvalent alcohol ester plasticizer.

The polyvalent alcohol ester plasticizer is a plasticizer made of divalent or higher aliphatic polyvalent alcohol and monocarboxylic acid ester. An aromatic ring or cycloalkyl ring is preferably contained in the molecule. It is preferred to be aliphatic polyvalent alcohol ester having valence 2 through 20.

A polyalcohol (polyvalent alcohol) used in the present invention is represented by formula (1)

$$R_1-(OH)_n \qquad \text{Formula (1)}$$

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10. The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: (i) benzoic acid and toluic acid, both of which have benzene ring in which alkyl groups are introduced, (ii) biphenylcarboxylic acid, naphthalenecarboxylic and tetralincarboxylic acid having 2 or more benzene rings, and (iii) derivatives thereof, of these, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups.

Specific examples of polyalcohol esters are shown below:

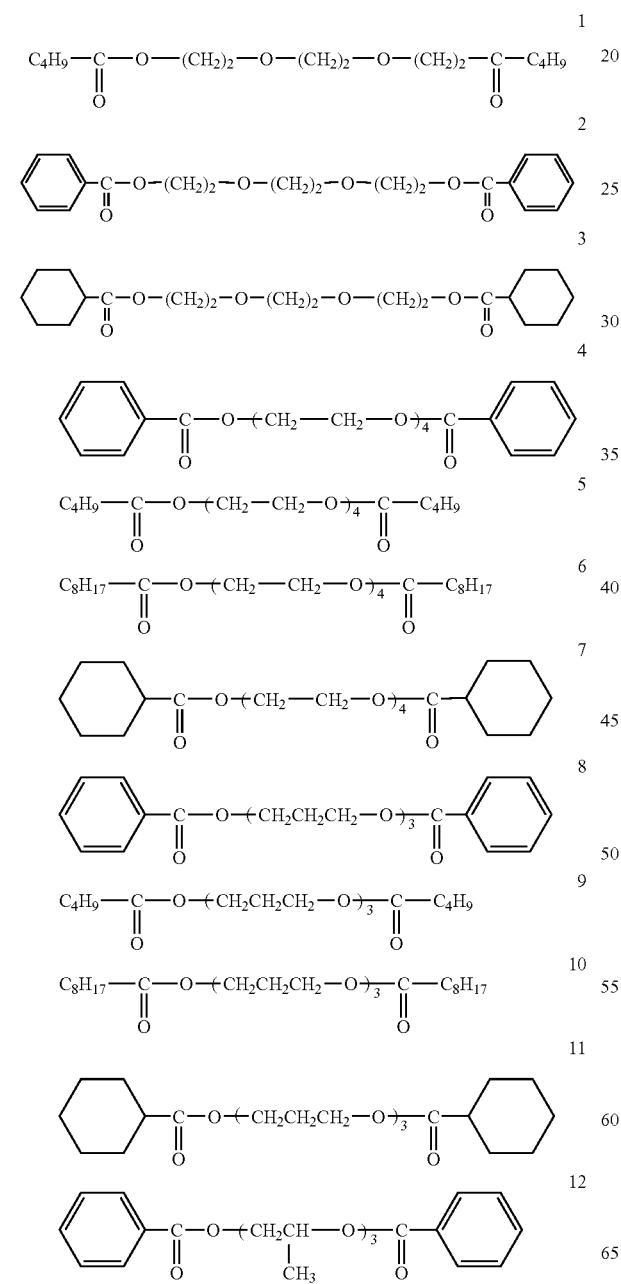

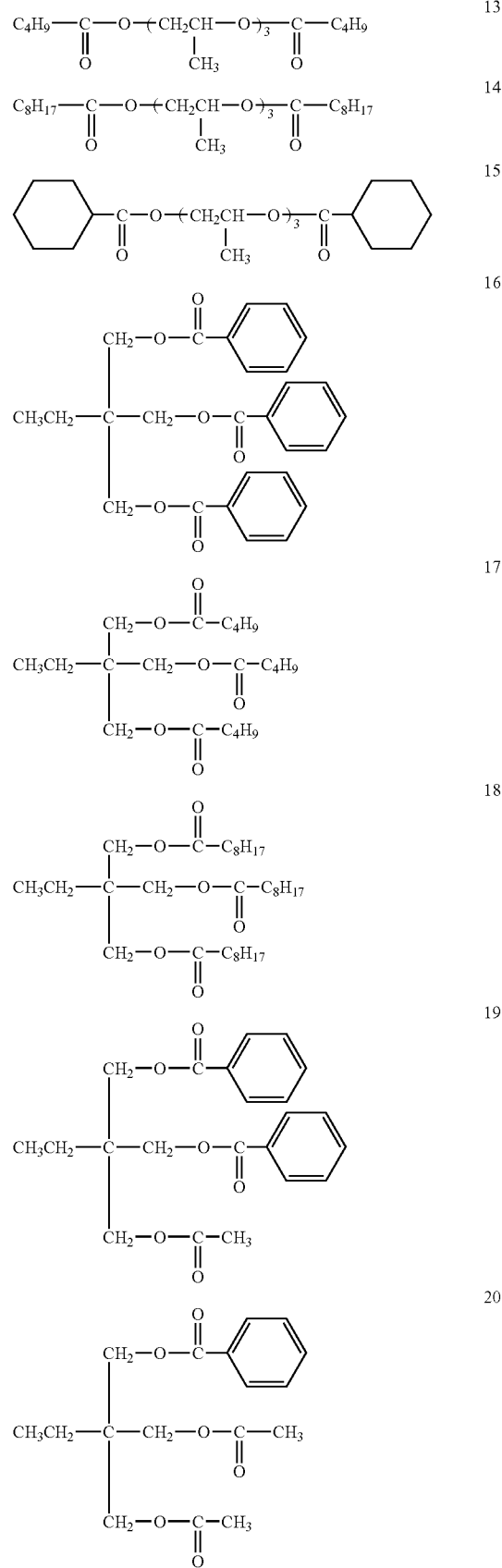

21
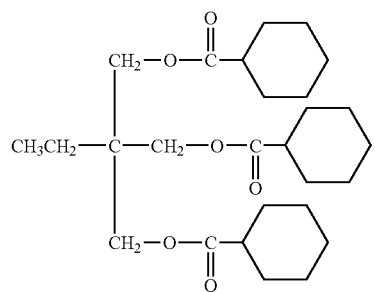
22
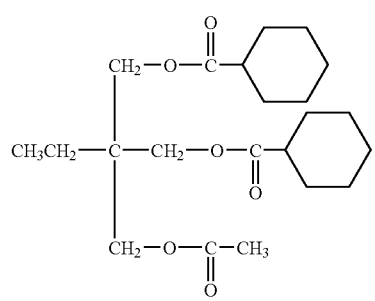
23
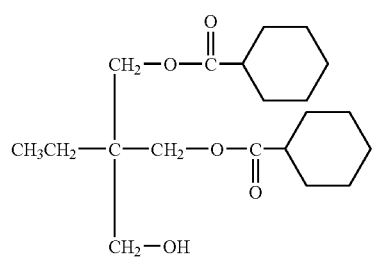
24
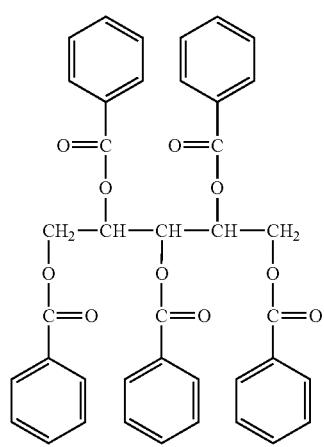
25
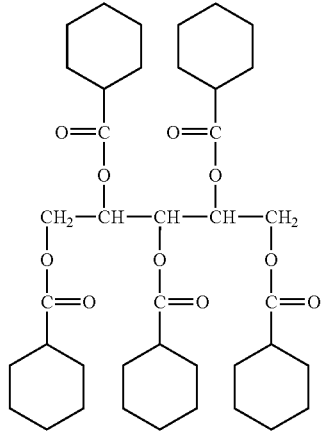
26
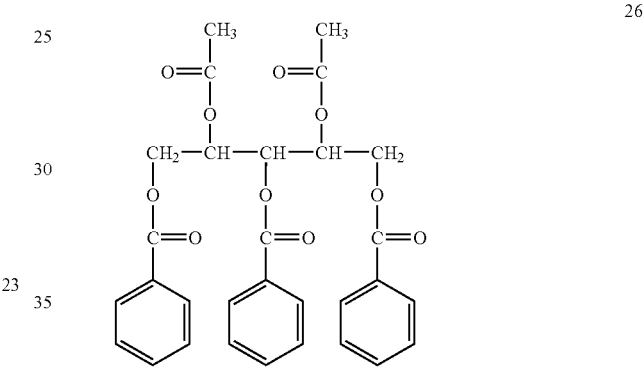
27
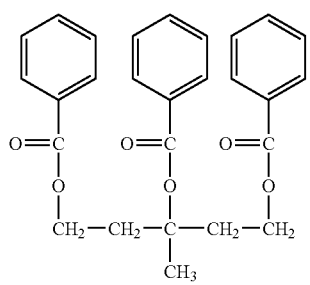
28
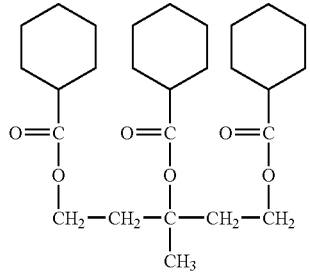

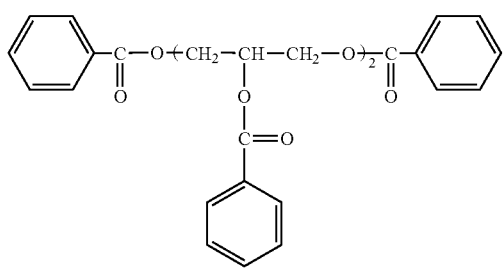

29

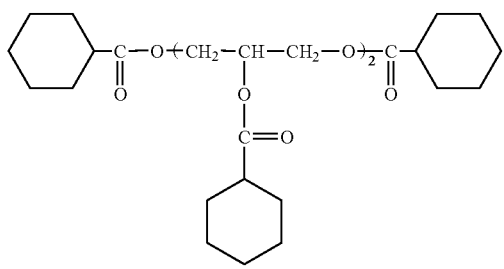

30

31

32

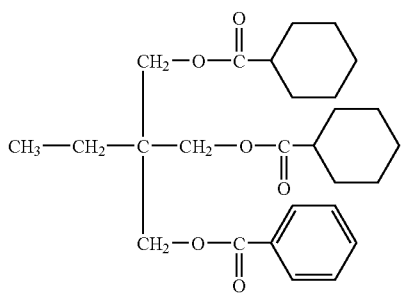

33

34

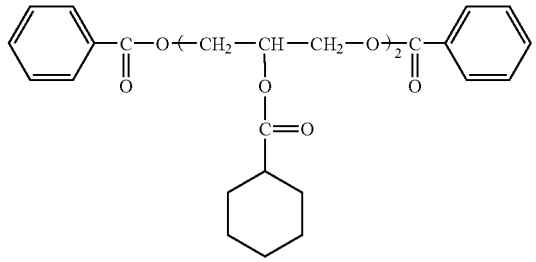

35

Generally, bleed-out tends to occur when the polyester and polyester ether described in the Official Gazette of Japanese Patent Tokkai 2002-22956 or the Official Gazette of Japanese Patent Tokkai 2002-120244 and the polyvalent alcohol ester preferably used in the present invention are contained at one time. It is necessary to reduce the amounts of both components, according to the conventional art. This has the problem in that reduction in the amount of the plasticizer contained therein leads to the reduction in moisture permeability and resistance to high temperature and high humidity. Especially when the ultraviolet absorber is further added, the ultraviolet absorber tends to bleed out and this has raised a handling problem. By contrast, the polyester based plasticizer expressed by the general formula (1) in the present invention does not raise such a problem so often, and can be contained at the same time. When the aromatic terminal ester plasticizer expressed by the general formula (1) and the aforementioned polyvalent alcohol ester plasticizer are further added, the ratio of the contents is preferably 1:5 through 5:1.

A glycolate ester type plasticizer is not specifically limited, however, an alkylphthalylalkyl glycolate type is preferably used, which include, for example: methylphthalylmethyl glycolate, ethylphthalylethyl glycolate, propylphthalyl-propyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalic ester type plasticizer includes, for example: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citrate ester type plasticizer includes, for example: acetyltrimethyl citrate, acetyltriethyl citrate and acetyltributyl citrate.

A fatty acid ester type plasticizer includes, for example: butyl oleate, methylacetyl ricinoleate and dibutyl sebacate.

The polyvalent carboxylic acid ester plasticizer is also used preferably. To put it more specifically, the polyvalent carboxylic acid ester described in the paragraphs [0015] through [0020] of the Official Gazette of Japanese Patent Tokkai 2002-265639 is preferably added as one of the plasticizers.

A phosphoric ester type plasticizer includes, for example: triphenyl phosphate, tricresyl phosphate, cresylphenyl phosphate, octyldiphenyl phosphate, diphenylbiphenyl phosphate, trioctyl phosphate and tributyl phosphate. However, the cellulose ester film used in the present invention does not include a substantial amount of phosphate ester. As described above, the expression "does not include a substantial amount" means that the amount of an included phosphate ester is less than 1 percent by weight, more preferably less than 0.1 percent by weight, and most preferably, contains no phosphate ester.

As mentioned above, the use of a phosphoric ester may result in deformation of the cellulose ester substrate during the step of providing a hard coat layer, and is not preferable in the present invention.

The total content of plasticizers in the cellulose ester film is preferably from 5 to 20 percent by weight based on the total solid portion of the cellulose ester film, more preferably from 6 to 16 percent by weight, and specifically preferably from 8 to 13 percent by weight. The content of each of the two plasticizers is preferably not less than 1 percent by weight and more preferably not less than 2 percent by weight.

The content of the polyalcohol ester type plasticizer is preferably from 1 to 12 percent by weight and specifically preferably from 3 to 11 percent by weight. When an amount of the polyalcohol ester type plasticizer is insufficient, the flatness of the cellulose ester film may be degraded, while, when it is too much, bleeding out may occur.

<UV Absorbing Agent>

The cellulose ester film of the present invention includes a UV absorbing agent in order to increase a durability of the film by absorbing UV rays having a wavelength less than 400 nm. The transmittance at a wavelength of 370 nm is preferably not more than 10 percent and is more preferably not more than 5 percent and still more preferably not more than 2 percent.

For example, oxybenzophenone type compounds, benzotriazol type compounds, saricylate ester type compounds, benzophenone type compounds, cyanoacrylate type compounds, triazine type compounds, nickel complex salt type compounds and inorganic particles are included, however, the present invention is not limited thereto.

For example: 5-chloro-2-(3,5-di-sec-butyl-2-hyroxylphenyl)-2H-benzotriazole, (2-2H-benzotriazole-2-ile)-6-(straight chain and side chain dodecyl)-4-methylphenyl, 2-hydroxy-4-benziloxybenzophenone, and 2,4-benziloxybenzophenone; and TINUVIN 109, TINUVIN 171, TINUVIN 234, TINUVIN 326, TINUVIN 327 and TINUVIN 328 which are manufactured by Chiba Speciality Chemicals Co.

For example, as a benzotriazole UV absorbing agent, the compound represented by the following Formula (A) is applicable.

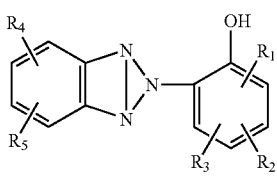

Formula (A)

wherein $R_1$, $R_2$, $R_3$, $R_4$, and $R_5$ may be the same or may be different, and each represent a hydrogen atom, a halogen atom, a nitro group, a hydroxyl group, an alkyl group, an alkenyl group, an aryl group, an alkoxy group, an acyloxyl group, an aryloxy group, an alkylthio group, an arylthio group, a mono or di alkylamino group, an acylamino group, or a heterocyclic group of 5-6 member; and R4 and R5 may be combined to form a 5-6 membered ring.

Each of the above mentioned groups may have an arbitrary substituent.

Examples of an UV absorbing agent used for the present invention is given to below, however, the present invention is not limited thereto.

UV-1: 2-(2'-hydroxy-5'-methylphenyl)benzotriazole

UV-2: 2-(2'-hydroxy-3',5'-di-tert-butylphenyl) benzotriazole

UV-3: 2-(2'-hydroxy-3'-tert-butyl-5'-methylphenyl) benzotriazole

UV-4: 2-(2'-hydroxy-3',5'-di-tert-butylphenyl)-5-chloro benzotriazole

UV-5: 2-(2'-hydroxy-3'-(3",4",5",6"-tetrahydro phthalimidomethyl)-5'-methylphenyl)benzotriazole UV-6: 2,2-methylenebis(4-(1,1,3,3-tetramethylbutyl)-6-(2H-benzotriazole-2-yl)phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (TINUVIN109, product of Ciba Specialty Chemicals Inc.)

Further, examples of the UV absorbing agents preferably used in the present invention include a benzophenone UV absorbing agent and a triazine UV absorbing agent, of these, a triazine UV absorbing agent is specifically preferable.

As a benzotriazole UV absorbing agent, the compound represented by the following Formula (B) is preferably used.

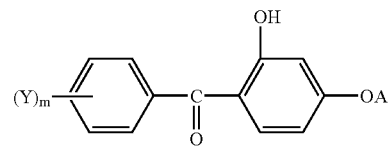

Formula (B)

wherein Y represents a hydrogen atom, a halogen atom, an alkyl group, an alkenyl group, an alkoxyl group, or a phenyl group, of these, the alkyl group, the alkenyl group, and the phenyl group may have a substituent; A represents a hydrogen atom, an alkyl group, an alkenyl group, a phenyl group, a cycloalkyl group, an alkylcarbonyl group, an alkylsulfonyl group, or —CO(NH)n-1-D group, wherein D represents an alkyl group, an alkenyl group or a phenyl group which may have a substituent; and m and n each represent 1 or 2.

In the above description, the alkyl group represents, for example, a normal or branched aliphatic group having not more than 24 carbon atoms, the alkoxyl group represents, for example, an alkoxyl group having not more than 18 carbon atoms, and the alkenyl group represents, for example, an alkenyl group having not more than 16 carbon atoms, such as an allyl group or a 2-butenyl group. Examples of a substituent to the alkyl group, the alkenyl group, and the phenyl group include, for example: a halogen atom such as a chlorine atom, a bromine atom and a fluorine atom, a hydroxyl group and a phenyl group (the phenyl group may further have an alkyl group or a halogen atom as a substituent).

Specific examples of a benzophenone related compound represented by Formula (B) are shown below, however, the present invention is not limited thereto.

UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

A compound having a 1,3,5-triazine ring is also preferably used as an UV absorbing agent of the optical film of the present invention.

Among the compounds having a 1,3,5-triazine ring, compounds represented by Formula (C) are preferably used.

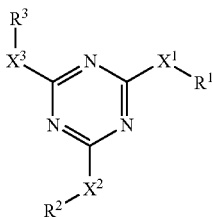

Formula (C)

wherein (i) $X^1$ represents a single bond, for example, —NR4-, —O—, or —S—; (ii) $X^2$ represents a single bond, for example, —NR5, —O—, or —S—; (iii) $X^3$ represents a single bond, for example, —NR6-, —O—, or —S—; (iv) $R^1$, $R^2$, and $R^3$ each represents, for example, an alkyl group, an alkenyl group, an aryl group, or a heterocyclic group; and (v) $R^4$, $R^5$ and $R^6$ each represents a hydrogen atom, an alkyl group, an alkenyl group, an aryl group, or a heterocyclic group.

A melamine compound is specifically preferable among the compounds represented by Formula (A).

In a melamine compound represented by Formula (A): (i) $X^1$, $X^2$, and $X^3$ represent —NR4-, —NR5-, and —NR6-, respectively; or (ii) $X^1$, $X^2$, and $X^3$ each represents a single bond, and $R^1$, $R^2$, and $R^3$ each represents a heterocyclic group having a free valence on nitrogen atoms. —X1-R1, —X2-R2, and —X3-R3 are preferably the same substituents. R1, R2, and R3 are specifically preferably aryl groups. R4, R5, and R6 are specifically preferably hydrogen atoms.

As the above alkyl group, a chain alkyl group is more preferable than a cyclic alkyl group and a linear-chain alkyl group is more preferable than a branched chain alkyl group.

The number of carbon atoms in an alkyl group is preferably 1 to 30, more preferably 1 to 20, further more preferably 1 to 10, specifically more preferably 1 to 8 and the most preferably 1 to 6. An alkyl group may have a substituent.

Examples of a substituent include: a halogen atom, an alkoxy group (for example, a methoxy group, an ethoxy group, and epoxyethyloxy group), an acyloxy group (for example, an acryloyloxy group and a methacryloyloxy group). As the above alkenyl group, a chain alkenyl group is more preferable than a cyclic alkenyl group and a linear-chain alkenyl group is more preferable than a branched chain alkenyl group. The number of carbon atoms in an alkenyl group is preferably 2 to 30, more preferably 2 to 20, further more preferably 2 to 10, specifically more preferably 2 to 8 and the most preferably 2 to 6. An alkenyl group may have a substituent.

Examples of a substituent include: a halogen atom, an alkoxy group (for example, a methoxy group and an ethoxy group, and an epoxyethyloxy group) and an acyloxy group (for example, an acryloyloxy group and a methacryloyloxy group).

As the above aryl group, a phenyl group or a naphthyl group is preferable, and a phenyl group is specifically preferable. An aryl group may have a substituent.

Examples of a substituent include: a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfonamides group, a carbamoyl group, an alkyl substituted carbamoyl group, an alkenyl substituted carbamoyl group, an aryl substituted carbamoyl group, an amide group, an alkylthio group, an alkenylthio group, an arylthio group, and an acyl group. The alkyl groups described here are common to the aforementioned alkyl groups.

The alkyl portions of the alkoxy group, the acyloxy group, the alkoxycarbonyl group, the alkyl substitute sulfamoyl group, the sulfonamide group, the alkyl substituted carbamoyl group, the amide group, the alkylthio group, and the acyl group described here are common to the aforementioned alkyl groups.

The alkenyl groups described here are common to the aforementioned alkenyl groups.

The alkenyl portions of an alkenyloxy group, an acyloxy group, an alkenyloxycarbonyl group, an alkenyl substituted sulfamoyl group, a sulfonamide group, an alkenyl substituted carbamoyl group, an amide group, an alkenylthio group, and an acyl group represents the same alkenyl groups as those previously mentioned.

Examples of the above aryl group include: a phenyl group, an α-naphthyl group, a β-naphthyl group, a 4-methoxyphenyl group, a 3,4-diethoxyphenyl group, a 4-octyloxyphenyl group, and a 4-dodecyloxyphenyl group.

The examples of aryl portions of an aryloxy group, an acyloxy group, an aryloxycarbonyl group, an aryl substituted sulfamoyl group, a sulfonamide group, an aryl substituted carbamoyl group, an amide group, an arylthio group, and an acyl group are common to the aforementioned examples.

When $X^1$, $X^2$, or $X^3$ are —NR—, —O—, or —S—, respectively, a heterocyclic group preferably has aromaticity.

The heterocyclic ring contained in an aromatic heterocyclic group is generally a unsaturated heterocyclic ring and preferably has the maximum number of double bonds. The heterocyclic ring is preferably a 5 membered ring, a 6 membered ring, or a 7 membered ring, more preferably a 5 membered ring, or a 6 membered ring, and the most preferably a 6 membered ring.

The hetero atom in a heterocyclic ring is preferably a N atom, a S atom, or an O atom, and specifically preferably a N atom.

As an aromatic heterocyclic ring, a pyridine ring (examples of a heterocyclic group include: a 2-pyridyl group or a 4-pyridyl group) is specifically preferable. A heterocyclic group may have a substituent. The examples described for the substituents of the aryl portions are also common for the substituents of the heterocyclic groups.

When $X^1$, $X^2$, or $X^3$ are single bonds, a heterocyclic group preferably has a free valence on a N atom. A heterocyclic group which has a free valence on a N atom is preferably a 5 membered ring, a 6 membered ring, or a 7 membered ring, more preferably a 5 membered ring, or a 6 membered ring, and the most preferably a 5 membered ring. A heterocyclic group may have a plurality of N atoms.

A hetero atom contained in a heterocyclic group may be a hetero atom other than a nitrogen atom (for example, an O atom or a S atom). A heterocyclic group may have a substituent. The examples described for the substituents of the aryl portions are also common to the substituents of the heterocyclic groups.

Examples of a heterocyclic group having a free valence on a N atom will be shown below.

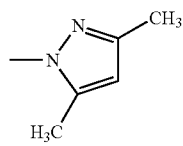
(Hc-1)

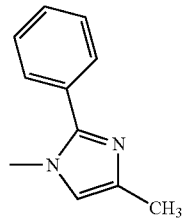
(Hc-2)

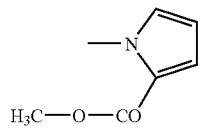
(Hc-3)

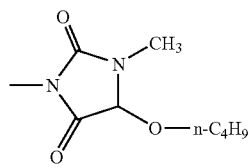
(Hc-4)

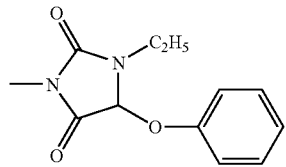
(Hc-5)

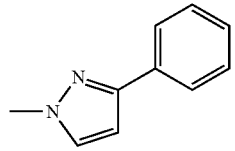
(Hc-6)

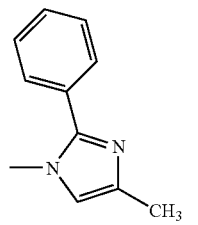
(Hc-7)

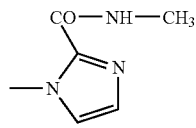
(Hc-8)

-continued

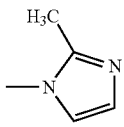
(Hc-9)

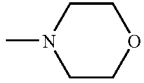
(Hc-10)

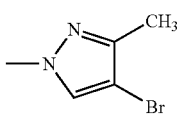
(Hc-11)

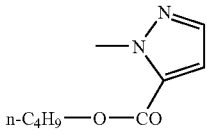
(Hc-12)

Examples of a compound having a 1,3,5-triazine ring will be shown below.

In the following, a plurality of R represent the same groups.

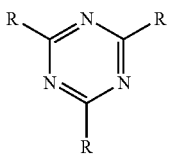
(1)-(12)

(1) butyl
(2) 2-methoxy-2-ethoxyethyl
(3) 5-undecenyl
(4) phenyl
(5) 4-ethoxycarbonylphenyl.
(6) 4-butoxyphenyl
(7) p-biphenylyl
(8) 4-pyridyl
(9) 2-naphthyl
(10) 2-methylphenyl
(11) 3,4-dimethoxyphenyl
(12) 2-furyl

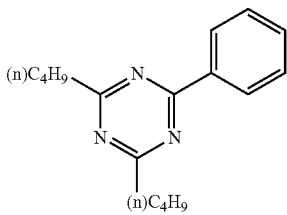
(13)

-continued

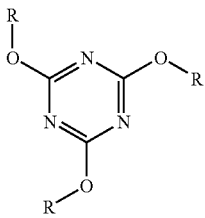

(14)-(79)

(14) phenyl
(15) 3-ethoxycarbonylphenyl
(16) 3-butoxyphenyl
(17) m-biphenylyl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenyl
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenylyl
(36) 4-phenylthiophenyl
(37) 4-chlorophenyl
(38) 4-benzoylphenyl
(39) 4-acetoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylphenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

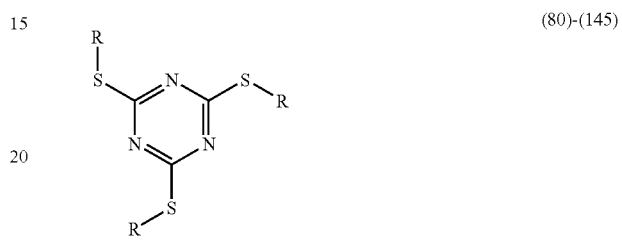

(80)-(145)

(80) phenyl
(81) 3-ethoxycarbonylphenyl
(82) 3-butoxyphenyl
(83) m-biphenylyl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3 Hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl (122) 3,4-dibenzoylphenyl
(123) 3,4-diacetoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

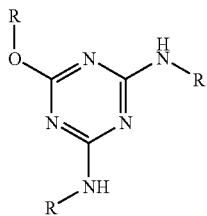
(146)-(164)

(146) phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl

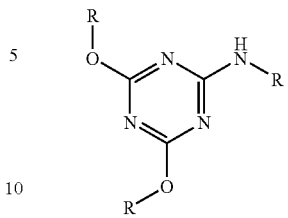
(165)-(183)

(165) phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

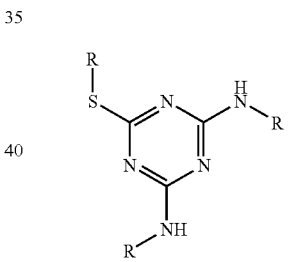
(184)-(202)

(184) Phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenyl
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl

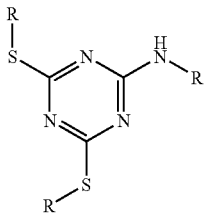

(203)-(221)

(203) phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxy-i-phenyl
(212) 4-phenoxycarbonylphenyl
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl

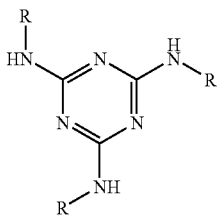

(222)-(419)

(222) phenyl
(223) 4-butylphenyl
(224) 4-(2-methoxy-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenylyl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxiphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3 Hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-acetoxyphenyl
(276) 2-benzoyloxyphenyl
(277) 2-phenoxycarbonylphenyl
(278) 2-methoxyphenyl
(279) 2-anilinophenyl
(280) 2-isobutyrylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2 Hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl (312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxy phenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydroxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl
(382) 2,4,6-triphenoxyphenyl
(383) 2,4,6-trihydroxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenyl sulfamoyl-2-naphthyl
(395) 1-(4-methylphenyl)-2-naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

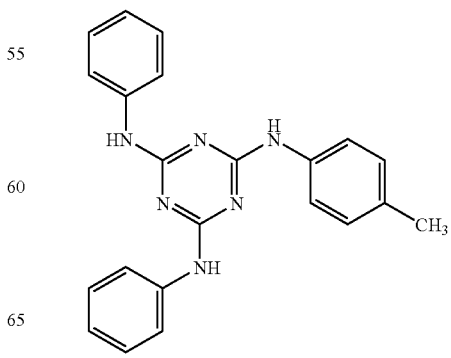

(420)

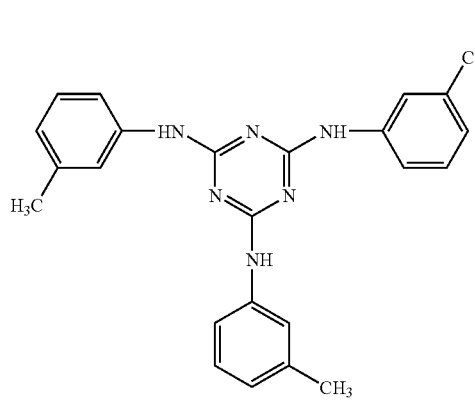
(420')
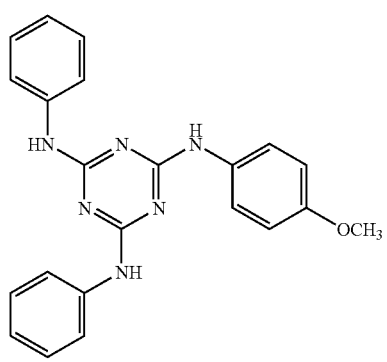
(421)
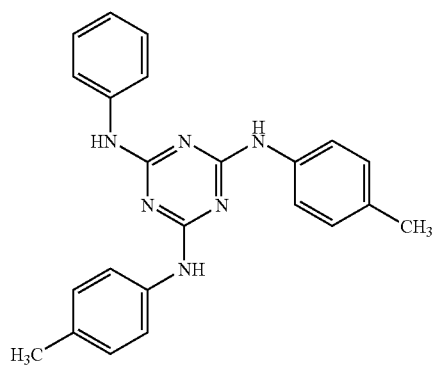
(422)
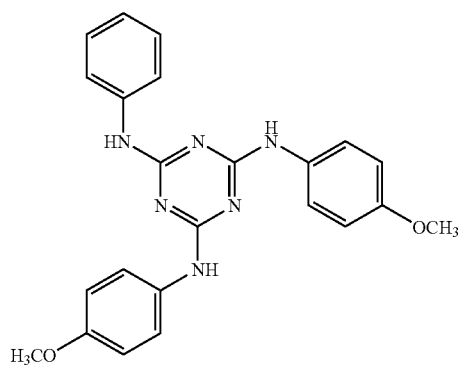
(423)
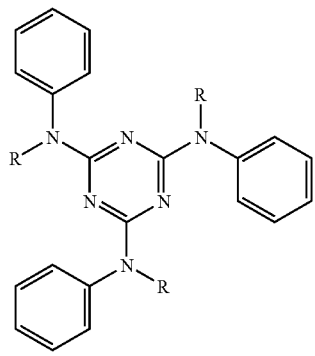
(424)–(426)
(424) methyl
(425) phenyl
(426) butyl
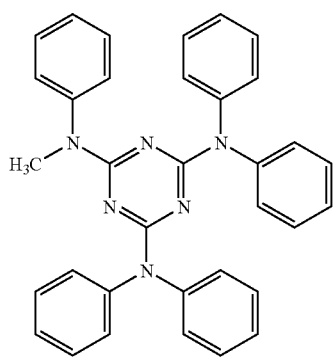
(427)
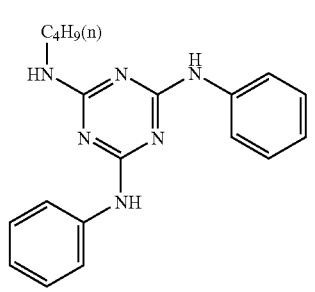
(428)
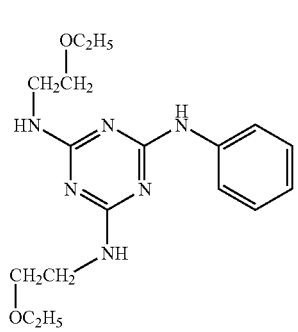
(429)

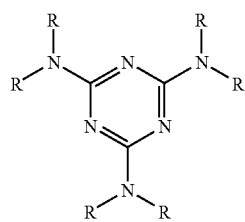
(430) methyl
(431) ethyl
(432) butyl
(433) octyl
(434) dodecyl
(435) 2-butoxy-2-ethoxyethyl
(436) benzyl
(437) 4-methoxybenzyl
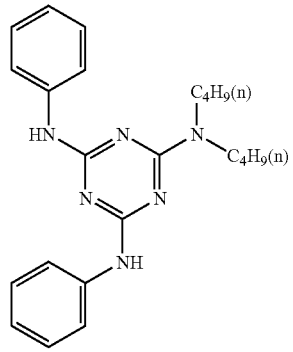
(438)
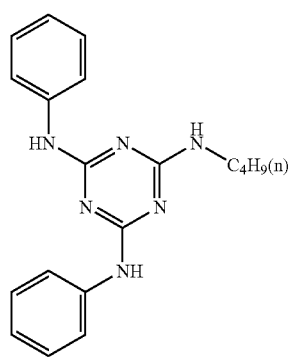
(439)
(430)–(437)
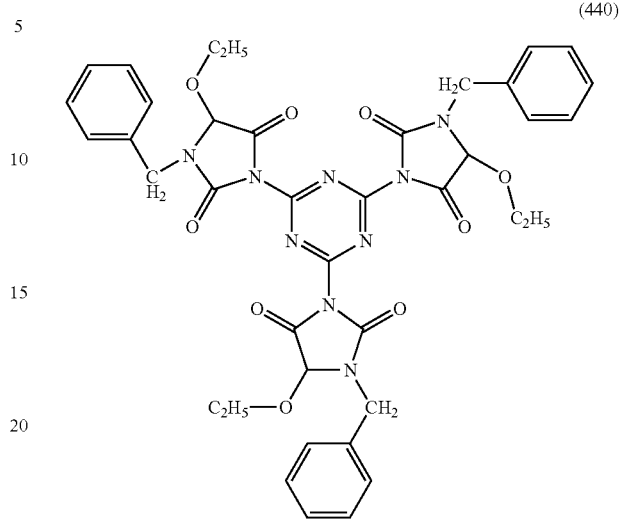
(440)
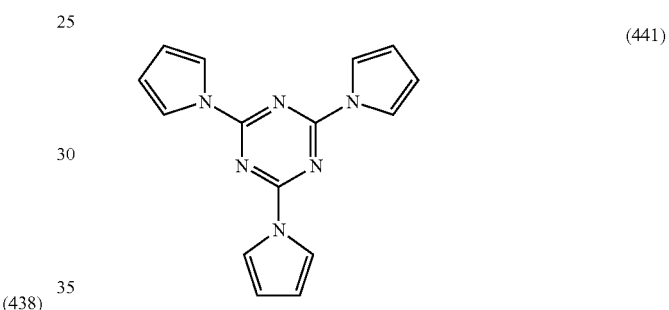
(441)
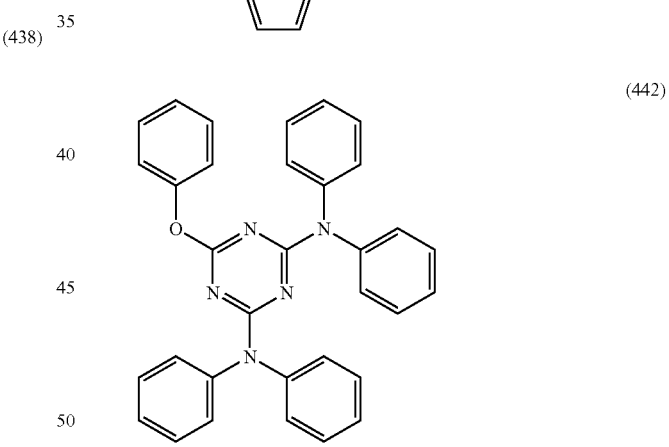
(442)
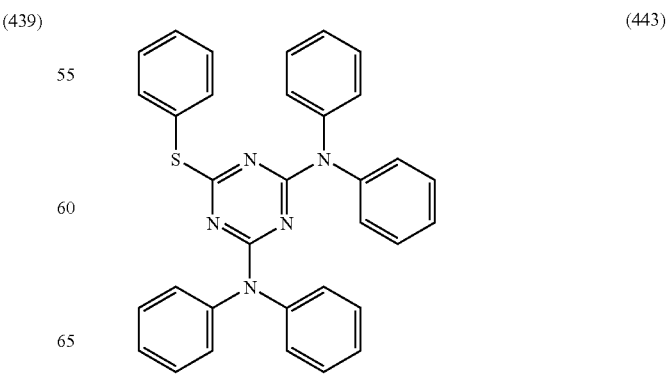
(443)

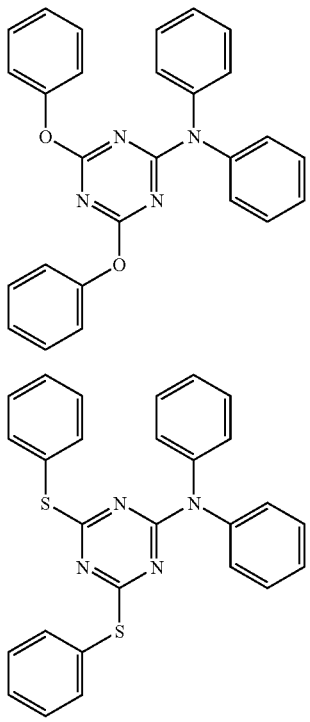

(444)

(445)

In the present invention, a melamine polymer may be used as a compound having 1, 3, and 5-triazine ring. A melamine polymer is preferably prepared through a polymerization reaction of a melamine compound represented by Formula (B) and a carbonyl compound.

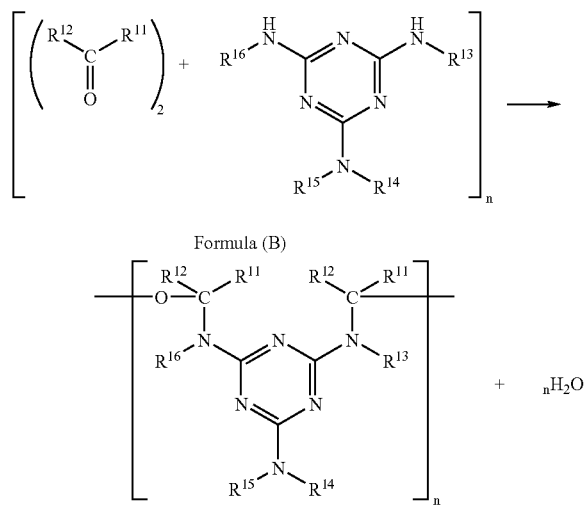

In the above reaction scheme, $R^{11}$, $R^{12}$, $R^{13}$, $R^{14}$, $R^{15}$, and $R^{16}$ each represents an alkyl group, an alkenyl group, an aryl group, or a heterocyclic group.

The above alkyl group, an alkenyl group, an aryl group, heterocyclic groups, and these substituents are common to those aforementioned in relation to Formula (A).

The polymerization reaction of a melamine compound and carbonyl compounds is carried out in same manner as a usual synthetic method of a melamine resin (for example, a melamine formaldehyde resin). A commercially available melamine polymer (melamine resin) may also be used.

The molecular weight of a melamine polymer is preferably 2000 to 400,000. Examples of a repeat unit will be shown below:

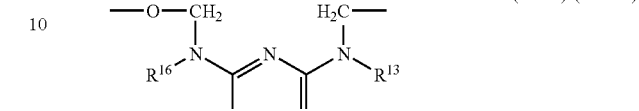

(MP-1)-(MP-50)

MP-1: $R^{13}$, $R^{14}$, $R^{15}$, $R^{16}$: $CH_2OH$

MP-2: $R^{13}$, $R^{14}$, $R^{15}$, $R^{16}$: $CH_2OCH_3$

MP-3: $R^{13}$, $R^{14}$, $R^{15}$, $R^{16}$: $CH_2O\text{-i-}C_4H_9$

MP-4: $R^{13}$, $R^{14}$, $R^{15}$, $R^{16}$: $CH_2O\text{-n-}C_4H_9$

MP-5: $R^{13}$, $R^{14}$, $R^{15}$, $R^{16}$: $CH_2NHCOCH=CH_2$

MP-6: $R^{13}$, $R^{14}$, $R^{15}$, $R^{16}$: $CH_2NHCO(CH_2)7CH=CH(CH_2)7CH_3$

MP-7: $R^{13}$, $R^{14}$, $R^{15}$: $CH_2OH$; $R^{16}$: $CH_2OCH_3$

MP-8: $R^{13}$, $R^{14}$, $R^{16}$: $CH_2OH$; $R^{15}$: $CH_2OCH_3$

MP-9: $R^{13}$, $R^{14}$: $CH_2OH$; $R^{15}$, $R^{16}$: $CH_2OCH_3$

MP-10: $R^{13}$, $R^{16}$: $CH_2OH$; $R^{14}$, $R^{15}$: $CH_2OCH_3$

MP-11: $R^{13}$: $CH_2OH$; $R^{14}$, $R^{15}$, $R^{16}$: $CH_2OCH_3$

MP-12: $R^{13}$, $R^{14}$, $R^{16}$: $CH_2OCH_3$; $R^{15}$: $CH_2OH$

MP-13: $R^{13}$, $R^{16}$: $CH_2OCH_3$; $R^{14}$, $R^{15}$: $CH_2OH$

MP-14: $R^{13}$, $R^{14}$, $R^{15}$: $CH_2OH$; $R^{16}$: $CH_2O\text{-i-}C_4H_9$ MP-15: $R^{13}$, $R^{14}$, $R^{16}$: $CH_2OH$; $R^{15}$: $CH_2O\text{-i-}C_4H_9$ MP-16: $R^{13}$, $R^{14}$: $CH_2OH$; $R^{15}$, $R^{16}$: $CH_2O\text{-i-}C_4H_9$ MP-17: $R^{13}$, $R^{16}$: $CH_2OH$; $R^{14}$, $R^{15}$: $CH_2O\text{-i-}C_4H_9$ MP-18: $R^{13}$: $CH_2OH$; $R^{14}$, $R^{15}$, $R^{16}$: $CH_2O\text{-i-}C_4H_9$ MP-19: $R^{13}$, $R^{14}$, $R^{16}$: $CH_2O\text{-i-}C_4H_9$; $R^{15}$: $CH_2OH$ MP-20: $R^{13}$, $R^{16}$: $CH_2O\text{-i-}C_4H_9$; $R^{14}$, $R^{15}$: $CH_2OH$ MP-21: $R^{13}$, $R^{14}$, $R^{15}$: $CH_2OH$; $R^{16}$: $CH_2O\text{-n-}C_4H_9$ MP-22: $R^{13}$, $R^{14}$, $R^{16}$: $CH_2OH$; $R^{15}$: $CH_2O\text{-n-}C_4H_9$ MP-23: $R^{13}$, $R^{14}$: $CH_2OH$; $R^{15}$, $R^{16}$: $CH_2O\text{-n-}C_4H_9$ MP-24: $R^{13}$, $R^{16}$: $CH_2OH$; $R^{14}$, $R^{15}$: $CH_2O\text{-n-}C_4H_9$ MP-25: $R^{13}$: $CH_2OH$; $R^{14}$, $R^{15}$, $R^{16}$: $CH_2O\text{-n-}C_4H_9$ MP-26: $R^{13}$, $R^{14}$, $R^{16}$: $CH_2O\text{-n-}C_4H_9$; $R^{15}$: $CH_2OH$ MP-27: $R^{13}$, $R^{16}$: $CH_2O\text{-n-}C_4H_9$; $R^{14}$, $R^{15}$: $CH_2OH$ MP-28: $R^{13}$, $R^{14}$: $CH_2OH$; $R^{15}$: $CH_2OCH_3$; $R^{16}$: $CH_2O\text{-n-}C_4H_9$ MP-29: $R^{13}$, $R^{14}$: $CH_2OH$; $R^{15}$: $CH_2O\text{-n-}C_4H_9$; $R^{16}$: $CH_2OCH_3$ MP-30: $R^{13}$, $R^{16}$: $CH_2OH$; $R^{14}$: $CH_2OCH_3$; $R^{15}$: $CH_2O\text{-n-}C_4H_9$ MP-31: $R^{13}$: $CH_2OH$; $R^{14}$, $R^{15}$: $CH_2OCH_3$; $R^{16}$: $CH_2O$-n-$C_4H_9$ MP-32: $R^{13}$: $CH_2OH$; $R^{14}$, $R^{16}$: $CH_2OCH_3$; $R^{15}$: $CH_2O$-n-$C_4H_9$ MP-33: $R^{13}$: $CH_2OH$; $R^{14}$: $CH_2OCH_3$; $R^{15}$, $R^{16}$: $CH_2O$-n-$C_4H_9$ MP-34: $R^{13}$: $CH_2OH$; $R^{14}$, $R^{15}$: $CH_2O$-n-$C_4H_9$; $R^{16}$: $CH_2OCH_3$ MP-35: $R^{13}$, $R^{14}$: $CH_2OCH_3$; $R^{15}$: $CH_2OH$; $R^{16}$: $CH_2O$-n-$C_4H_9$ MP-36: $R^{13}$, $R^{16}$: $CH_2OCH_3$; $R^{14}$: $CH_2OH$; $R^{15}$: $CH_2O$-n-$C_4H_9$ MP-37: $R^{13}$: $CH_2OCH_3$; $R^{14}$, $R^{15}$: $CH_2OH$; $R^{16}$: $CH_2O$-n-$C_4H_9$ MP-38: $R^{13}$, $R^{16}$: $CH_2O$-n-$C_4H_9$; $R^{14}$: $CH_2OCH_3$; $R^{15}$: $CH_2OH$ MP-39: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$ MP-40: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$ MP-41: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$ MP-42: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$ MP-43: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$ MP-44: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$ MP-45: $R^{13}$: $CH_2OH$; $R^{14}$: $CH_2OCH_3$; $R^{15}$: $CH_2NHCO(CH_2)7CH=CH(CH_2)7CH_3$; $R^{16}$: $CH_2NHCOCH=CH_2$ MP-46: $R^{13}$: $CH_2OH$; $R^{14}$: $CH_2OCH_3$; $R^{15}$: $CH_2NHCOCH=CH_2$; $R^{16}$: $CH_2NHCO(CH_2)7CH=CH(CH_2)7CH_3$ MP-47: $R^{13}$: $CH_2OH$; $R^{14}$: $CH_2NHCO(CH_2)7CH=CH(CH_2)7CH_3$; $R^{15}$: $CH_2NHCOCH=CH_2$; $R^{16}$: $CH_2OCH_3$ MP-48: $R^{13}$: $CH_2OCH_3$; $R^{14}$: $CH_2OH$; $R^{15}$: $CH_2NHCO(CH_2)7CH=CH(CH_2)7CH_3$; $R^{16}$: $CH_2NHCOCH=CH_2$ MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)7CH=CH(CH_2)7CH_3$ MP-50: $R^{13}$: $CH_2NHCO(CH_2)7CH=CH(CH_2)7CH_3$; $R^{14}$: $CH_2OCH_3$; $R^{15}$: $CH_2OH$; $R^{16}$: $CH_2NHCOCH=CH_2$

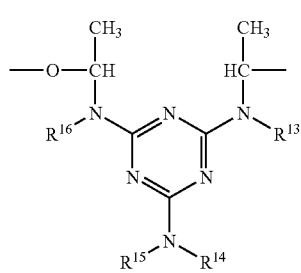

(MP-51)-(MP-100)

MP-51: $R^{13}$, $R^{14}$, $R^{15}$, $R^{16}$: $CH_2OH$

MP-52: $R^{13}$, $R^{14}$, $R^{15}$, $R^{16}$: $CH_2OCH_3$

MP 53: $R^{13}$, $R^{14}$, $R^{15}$, $R^{16}$: $CH_2O$-i-$C_4H_9$

MP-54: $R^{13}$, $R^{14}$, $R^{15}$, $R^{16}$: $CH_2O$-n-$C_4H_9$

MP-55: $R^{13}$, $R^{14}$, $R^{15}$, $R^{16}$: $CH_2NHCOCH=CH_2$

MP-56: $R^{13}$, $R^{14}$, $R^{15}$, $R^{16}$: $CH_2NHCO(CH_2)7CH=CH(CH_2)7CH_3$

MP-57: $R^{13}$, $R^{14}$, $R^{15}$: $CH_2OH$; $R^{16}$: $CH_2OCH_3$

MP-58: $R^{13}$, $R^{14}$, $R^{16}$: $CH_2OH$; $R^{15}$: $CH_2OCH_3$

MP-59: $R^{13}$, $R^{14}$: $CH_2OH$; $R^{15}$, $R^{16}$: $CH_2OCH_3$

MP-60: $R^{13}$, $R^{16}$: $CH_2OH$; $R^{14}$, $R^{15}$: $CH_2OCH_3$

MP-61: $R^{13}$: $CH_2OH$; $R^{14}$, $R^{15}$, $R^{16}$: $CH_2OCH_3$

MP-62: $R^{13}$, $R^{14}$, $R^{16}$: $CH_2OCH_3$; $R^{15}$: $CH_2OH$

MP-63: $R^{13}$, $R^{16}$: $CH_2OCH_3$; $R^{14}$, $R^{15}$: $CH_2OH$

MP-64: $R^{13}$, $R^{14}$, $R^{15}$: $CH_2OH$; $R^{16}$: $CH_2O$-i-$C_4H_9$

MP-65: $R^{13}$, $R^{14}$, $R^{16}$: $CH_2OH$; $R^{15}$: $CH_2O$-i-$C_4H_9$

MP-66: $R^{13}$, $R^{14}$: $CH_2OH$; $R^{15}$, $R^{16}$: $CH_2O$-i-$C_4H_9$

MP-67: $R^{13}$, $R^{16}$: $CH_2OH$; $R^{14}$, $R^{15}$: $CH_2O$-i-$C_4H_9$

MP-68: $R^{13}$: $CH_2OH$; $R^{14}$, $R^{15}$, $R^{16}$: $CH_2$-i-$C_4H_9$

MP-69: $R^{13}$, $R^{14}$, $R^{16}$: $CH_2O$-i-$C_4H_9$; $R^{15}$: $CH_2OH$

MP-70: $R^{13}$, $R^{16}$: $CH_2O$-i-$C_4H_9$; $R^{14}$, $R^{15}$: $CH_2OH$

MP-71: $R^{13}$, $R^{14}$, $R^{15}$: $CH_2OH$; $R^{16}$: $CH_2O$-n-$C_4H_9$

MP-72: $R^{13}$, $R^{14}$, $R^{16}$: $CH_2OH$; $R^{15}$: $CH_2O$-n-$C_4H_9$

MP-73: $R^{13}$, $R^{14}$: $CH_2OH$; $R^{15}$, $R^{16}$: $CH_2O$-n-$C_4H_9$

MP-74: $R^{13}$, $R^{16}$: $CH_2OH$; $R^{14}$, $R^{15}$: $CH_2O$-n-$C_4H_9$

MP-75: $R^{13}$: $CH_2OH$; $R^{14}$, $R^{15}$, $R^{16}$: $CH_2O$-n-$C_4H_9$

MP-76: $R^{13}$, $R^{14}$, $R^{16}$: $CH_2O$-n-$C_4H_9$; $R^{15}$: $CH_2OH$

MP-77: $R^{13}$, $R^{16}$: $CH_2O$-n-$C_4H_9$; $R^{14}$, $R^{15}$: $CH_2OH$

MP-78: $R^{13}$, $R^{14}$: $CH_2OH$; $R^{15}$: $CH_2OCH_3$; $R^{16}$: $CH_2O$-n-$C_4H_9$

MP-79: $R^{13}$, $R^{14}$: $CH_2OH$; $R^{15}$: $CH_2O$-n-$C_4H_9$; $R^{16}$: $CH_2OCH_3$

MP-80: $R^{13}$, $R^{16}$: $CH_2OH$; $R^{14}$: $CH_2OCH_3$; $R^{15}$: $CH_2O$-n-$C_4H_9$

MP-81: $R^{13}$: $CH_2OH$; $R^{14}$, $R^{15}$: $CH_2OCH_3$; $R^{16}$: $CH_2O$-n-$C_4H_9$

MP-82: $R^{13}$: $CH_2OH$; $R^{14}$, $R^{16}$: $CH_2OCH_3$; $R^{15}$: $CH_2O$-n-$C_4H_9$

MP-83: $R^{13}$: $CH_2OH$; $R^{14}$: $CH_2OCH_3$; $R^{15}$, $R^{16}$: $CH_2O$-n-$C_4H_9$

MP-84: $R^{13}$: $CH_2OH$; $R^{14}$, $R^{15}$: $CH_2O$-n-$C_4H_9$; $R^{16}$: $CH_2OCH_3$

MP-85: $R^{13}$, $R^{14}$: $CH_2OCH_3$; $R^{15}$: $CH_2OH$; $R^{16}$: $CH_2O$-n-$C_4H_9$

MP-86: $R^{13}$, $R^{16}$: $CH_2OCH_3$; $R^{14}$: $CH_2OH$; $R^{15}$: $CH_2O$-n-$C_4H_9$

MP-87: $R^{13}$: $CH_2OCH_3$; $R^{14}$, $R^{15}$: $CH_2OH$; $R^{16}$: $CH_2O$-n-$C_4H_9$

MP-88: $R^{13}$, $R^{16}$: $CH_2O$-n-$C_4H_9$; $R^{14}$: $CH_2OCH_3$; $R^{15}$: $CH_2OH$

MP-89: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$

MP-90: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$

MP-91: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$

MP-92: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$

MP-93: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$

MP-94: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$

MP-95: $R^{13}$: $CH_2OH$; $R^{14}$: $CH_2OCH_3$; $R^{15}$: $CH_2NHCO(CH_2)7CH=CH(CH_2)7CH_3$; $R^{16}$: $CH_2NHCOCH=CH_2$

MP-96: $R^{13}$: $CH_2OH$; $R^{14}$: $CH_2OCH_3$; $R^{15}$: $CH_2NHCOCH=CH_2$; $R^{16}$: $CH_2NHCO(CH_2)7CH=CH(CH_2)7CH_3$

MP-97: $R^{13}$: $CH_2OH$; $R^{14}$: $CH_2NHCO(CH_2)7CH=CH(CH_2)7CH_3$; $R^{15}$: $CH_2NHCOCH=CH_2$; $R^{16}$: $CH_2OCH_3$

MP-98: $R^{13}$: $CH_2OCH_3$; $R^{14}$: $CH_2OH$; $R^{15}$: $CH_2NHCO(CH_2)7CH=CH(CH_2)7CH_3$; $R^{16}$: $CH_2NHCOCH=CH_2$

MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)7CH=CH(CH_2)7CH_3$

MP-100: $R^{13}$: $CH_2NHCO(CH_2)7CH=CH(CH_2)7CH_3$; $R^{14}$: $CH_2OCH_3$; $R^{15}$: $CH_2OH$; $R^{16}$: $CH_2NHCOCH=CH_2$

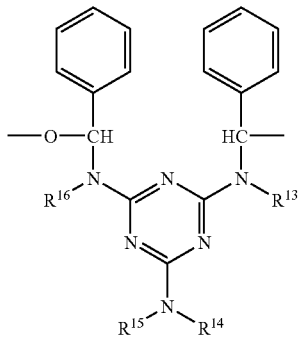

(MP-101)-(MP-150)

MP-101: $R^{13}$, $R^{14}$, $R^{15}$, $R^{16}$: $CH_2OH$

MP-102: $R^{13}$, $R^{14}$, $R^{15}$, $R^{16}$: $CH_2OCH_3$

MP-103: $R^{13}$, $R^{14}$, $R^{15}$, $R^{16}$: $CH_2O$-i-$C_4H_9$

MP-104: $R^{13}$, $R^{14}$, $R^{15}$, $R^{16}$: $CH_2O$-n-$C_4H_9$

MP-105: $R^{13}$, $R^{14}$, $R^{15}$, $R^{16}$: $CH_2NHCOCH=CH_2$

MP-106: $R^{13}$, $R^{14}$, $R^{15}$, $R^{16}$: $CH_2NHCO(CH_2)7CH=CH(CH_2)7CH_3$

MP-107: $R^{13}$, $R^{14}$, $R^{15}$: $CH_2OH$; $R^{16}$: $CH_2OCH_3$

MP-108: $R^{13}$, $R^{14}$, $R^{16}$: $CH_2OH$; $R^{15}$: $CH_2OCH_3$

MP-109: $R^{13}$, $R^{14}$: $CH_2OH$; $R^{15}$, $R^{16}$: $CH_2OCH_3$

MP-110: $R^{13}$, $R^{16}$: $CH_2OH$; $R^{14}$, $R^{15}$: $CH_2OCH_3$

MP-111: $R^{13}$: $CH_2OH$; $R^{14}$, $R^{15}$, $R^{16}$: $CH_2OCH_3$

MP-112: $R^{13}$, $R^{14}$, $R^{16}$: $CH_2OCH_3$; $R^{15}$: $CH_2OH$

MP-113: $R^{13}$, $R^{16}$: $CH_2OCH_3$; $R^{14}$, $R^{15}$: $CH_2OH$

MP-114: $R^{13}$, $R^{14}$, $R^{15}$: $CH_2OH$; $R^{16}$: $CH_2O$-i-$C_4H_9$

MP-115: $R^{13}$, $R^{14}$, $R^{16}$: $CH_2OH$; $R^{15}$: $CH_2O$-i-$C_4H_9$

MP-116: $R^{13}$, $R^{14}$: $CH_2OH$; $R^{15}$, $R^{16}$: $CH_2O$-i-$C_4H_9$

MP-117: $R^{13}$, $R^{16}$: $CH_2OH$; $R^{14}$, $R^{15}$: $CH_2O$-i-$C_4H_9$

MP-118: $R^{13}$: $CH_2OH$; $R^{14}$, $R^{15}$, $R^{16}$: $CH_2O$-i-$C_4H_9$

MP-119: $R^{13}$, $R^{14}$, $R^{16}$: $CH_2O$-i-$C_4H_9$; $R^{15}$: $CH_2OH$

MP-120: $R^{13}$, $R^{16}$: $CH_2O$-i-$C_4H_9$; $R^{14}$, $R^{15}$: $CH_2OH$

MP-121: $R^{13}$, $R^{14}$, $R^{15}$: $CH_2OH$; $R^{16}$: $CH_2O$-n-$C_4H_9$

MP-122: $R^{13}$, $R^{14}$, $R^{16}$: $CH_2OH$; $R^{15}$: $CH_2O$-n-$C_4H_9$

MP-123: $R^{13}$, $R^{14}$: $CH_2OH$; $R^{15}$, $R^{16}$: $CH_2O$-n-$C_4H_9$

MP-124: $R^{13}$, $R^{16}$: $CH_2OH$; $R^{14}$, $R^{15}$: $CH_2O$-n-$C_4H_9$

MP-125: $R^{13}$: $CH_2OH$; $R^{14}$, $R^{15}$, $R^{16}$: $CH_2O$-n-$C_4H_9$

MP-126: $R^{13}$, $R^{14}$, $R^{16}$: $CH_2O$-n-$C_4H_9$; $R^{15}$: $CH_2OH$

MP-127: $R^{13}$, $R^{16}$: $CH_2O$-n-$C_4H_9$; $R^{14}$, $R^{15}$: $CH_2OH$

MP-128: $R^{13}$, $R^{14}$: $CH_2OH$; $R^{15}$: $CH_2OCH_3$; $R^{16}$: $CH_2$-n-$C_4H_9$

MP-129: $R^{13}$, $R^{14}$: $CH_2OH$; $R^{15}$: $CH_2O$-n-$C_4H_9$; $R^{16}$: $CH_2OCH_3$

MP-130: $R^{13}$, $R^{16}$: $CH_2OH$; $R^{14}$: $CH_2OCH_3$; $R^{15}$: $CH_2O$-n-$C_4H_9$

MP-131: $R^{13}$: $CH_2OH$; $R^{14}$, $R^{15}$: $CH_2OCH_3$; $R^{16}$: $CH_2O$-n-$C_4H_9$

MP-132: $R^{13}$: $CH_2OH$; $R^{14}$, $R^{16}$: $CH_2OCH_3$; $R^{15}$: $CH_2O$-n-$C_4H_9$

MP-133: $R^{13}$: $CH_2OH$; $R^{14}$: $CH_2OCH_3$; $R^{15}$, $R^{16}$: $CH_2O$-n-$C_4H_9$

MP-134: $R^{13}$: $CH_2OH$; $R^{14}$, $R^{15}$: $CH_2O$-n-$C_4H_9$; $R^{16}$: $CH_2OCH_3$

MP-135: $R^{13}$, $R^{14}$: $CH_2OCH_3$; $R^{15}$: $CH_2OH$; $R^{16}$: $CH_2O$-n-$C_4H_9$

MP-136: $R^{13}$, $R^{16}$: $CH_2OCH_3$; $R^{14}$: $CH_2OH$; $R^{15}$: $CH_2O$-n-$C_4H_9$

MP-137: $R^{13}$: $CH_2OCH_3$; $R^{14}$, $R^{15}$: $CH_2OH$; $R^{16}$: $CH_2O$-n-$C_4H_9$

MP-138: $R^{13}$, $R^{16}$: $CH_2O$-n-$C_4H_9$; $R^{14}$: $CH_2OCH_3$; $R^{15}$: $CH_2OH$

MP-139: $R^{13}$: $CH_2OH$; $R^{14}$: $CH_2OCH_3$; $R^{16}$: $CH_2O$-n-$C_4H_9$; $R^{16}$: $CH_2NHCOCH=CH_2$

MP-140: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$

MP-141: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$

MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$

MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$

MP-144: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$

MP-145: $R^{13}$: $CH_2OH$; $R^{14}$: $CH_2OCH_3$; $R^{15}$: $CH_2NHCO(CH_2)7CH=CH(CH_2)7CH_3$; $R^{16}$: $CH_2NHCOCH=CH_2$

MP-146: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$

MP-147: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$

MP-148: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$

MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$

MP-150: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

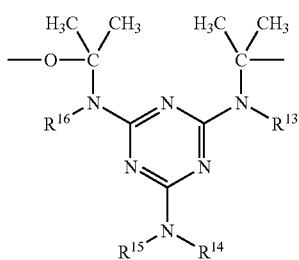

(MP-151)-(MP-200)

MP-151: $R^{13}$, $R^{14}$, $R^{15}$, $R^{16}$: $CH_2OH$

MP-152: $R^{13}$, $R^{14}$, $R^{15}$, $R^{16}$: $CH_2OCH_3$

MP-153: $R^{13}$, $R^{14}$, $R^{15}$, $R^{16}$: $CH_2O$-i-$C_4H_9$

MP-154: $R^{13}$, $R^{14}$, $R^{15}$, $R^{16}$: $CH_2O$-n-$C_4H_9$

MP-155: $R^{13}$, $R^{14}$, $R^{15}$, $R^{16}$: $CH_2NHCOCH=CH_2$

MP-156: $R^{13}$, $R^{14}$, $R^{15}$, $R^{16}$: $CH_2NHCO(CH_2)_7CH=CH(CH_2)_7CH_3$

MP-157: $R^{13}$, $R^{14}$, $R^{15}$: $CH_2OH$; $R^{16}$: $CH_2OCH_3$

MP-158: $R^{13}$, $R^{14}$, $R^{16}$: $CH_2OH$; $R^{15}$: $CH_2OCH_3$

MP-159: $R^{13}$, $R^{14}$: $CH_2OH$; $R^{15}$, $R^{16}$: $CH_2OCH_3$

MP-160: $R^{13}$, $R^{16}$: $CH_2OH$; $R^{14}$, $R^{15}$: $CH_2OCH_3$

MP-161: $R^{13}$: $CH_2OH$; $R^{14}$, $R^{15}$, $R^{16}$: $CH_2OCH_3$

MP-162: $R^{13}$, $R^{14}$, $R^{16}$: $CH_2OCH_3$; $R^{15}$: $CH_2OH$

MP-163: $R^{13}$, $R^{16}$: $CH_2OCH_3$; $R^{14}$, $R^{15}$: $CH_2OH$

MP-164: $R^{13}$, $R^{14}$, $R^{15}$: $CH_2OH$; $R^{16}$: $CH_2O$-i-$C_4H_9$

MP-165: $R^{13}$, $R^{14}$, $R^{16}$: $CH_2OH$; $R^{15}$: $CH_2O$-i-$C_4H_9$

MP-166: $R^{13}$, $R^{14}$: $CH_2OH$; $R^{15}$, $R^{16}$: $CH_2O$-i-$C_4H_9$

MP-167: $R^{13}$, $R^{16}$: $CH_2OH$; $R^{14}$, $R^{15}$: $CH_2O$-i $C_4H_9$

MP-168: $R^{13}$: $CH_2OH$; $R^{14}$, $R^{15}$, $R^{16}$: $CH_2O$-i-$C_4H_9$

MP-169: $R^{13}$, $R^{14}$, $R^{16}$: $CH_2O$-i-$C_4H_9$; $R^{15}$: $CH_2OH$

MP-170: $R^{13}$, $R^{16}$: $CH_2O$-i-$C_4H_9$; $R^{14}$, $R^{15}$: $CH_2OH$

MP-171: $R^{13}$, $R^{14}$, $R^{15}$: $CH_2OH$; $R^{16}$: $CH_2O$-n-$C_4H_9$

MP-172: $R^{13}$, $R^{14}$, $R^{16}$: $CH_2OH$; $R^{15}$: $CH_2O$-n-$C_4H_9$

MP-173: $R^{13}$, $R^{14}$: $CH_2OH$; $R^{15}$, $R^{16}$: $CH_2O$-n-$C_4H_9$

MP-174: $R^{13}$, $R^{16}$: $CH_2OH$; $R^{14}$, $R^{15}$: $CH_2O$-n-$C_4H_9$

MP-175: $R^{13}$: $CH_2OH$; $R^{14}$, $R^{15}$, $R^{16}$: $CH_2O$-n-$C_4H_9$

MP-176: $R^{13}$, $R^{14}$, $R^{16}$: $CH_2O$-n-$C_4H_9$; $R^{15}$: $CH_2OH$

MP-177: $R^{13}$, $R^{16}$: $CH_2O$-n-$C_4H_9$; $R^{14}$, $R^{15}$: $CH_2OH$

MP-178: $R^{13}$, $R^{14}$: $CH_2OH$; $R^{15}$: $CH_2OCH_3$; $R^{16}$: $CH_2O$-n-$C_4H_9$

MP-179: $R^{13}$, $R^{14}$: $CH_2OH$; $R^{15}$: $CH_2O$-n-$C_4H_9$; $R^{16}$: $CH_2OCH_3$

MP-180: $R^{13}$, $R^{16}$: $CH_2OH$; $R^{14}$: $CH_2OCH_3$; $R^{15}$: $CH_2O$-n-$C_4H_9$

MP-181: $R^{13}$: $CH_2OH$; $R^{14}$, $R^{15}$: $CH_2OCH_3$; $R^{16}$: $CH_2O$-n-$C_4H_9$

MP-182: $R^{13}$: $CH_2OH$; $R^{14}$, $R^{16}$: $CH_2OCH_3$; $R^{15}$: $CH_2O$-n-$C_4H_9$

MP-183: $R^{13}$: $CH_2OH$; $R^{14}$: $CH_2OCH_3$; $R^{15}$, $R^{16}$: $CH_2O$-n-$C_4H_9$

MP-184: $R^{13}$: $CH_2OH$; $R^{14}$, $R^{15}$: $CH_2O$-n-$C_4H_9$; $R^{16}$: $CH_2OCH_3$

MP-185: $R^{13}$, $R^{14}$: $CH_2OCH_3$; $R^{15}$: $CH_2OH$; $R^{16}$: $CH_2O$-n-$C_4H_9$

MP-186: $R^{13}$, $R^{16}$: $CH_2OCH_3$; $R^{14}$: $CH_2OH$; $R^{15}$: $CH_2O$-n-$C_4H_9$

MP-187: $R^{13}$: $CH_2OCH_3$; $R^{14}$, $R^{15}$: $CH_2OH$; $R^{16}$: $CH_2O$-n-$C_4H_9$

MP-188: $R^{13}$, $R^{16}$: $CH_2O$-n-$C_4H_9$; $R^{14}$: $CH_2OCH_3$; $R^{15}$: $CH_2OH$

MP-189: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$

MP-190: $R^{13}$: $CH_2OH$; $R^{14}$: $CH_2OCH_3$; $R^{15}$: $CH_2NHCOCH=CH_2$; $R^{16}$: $CH_2O$-n-$C_4H_9$

MP-191: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$

MP-192: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$

MP-193: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$

MP-194: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$

MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$

MP-196: $R^{13}$: $CH_2OH$; $R^{14}$: $CH_2OCH_3$; $R^{15}$: $CH_2NHCOCH=CH_2$; $R^{16}$: $CH_2NHCO(CH_2)_7CH=CH(CH_2)_7CH_3$

MP-197: $R^{13}$: $CH_2OH$; $R^{14}$: $CH_2NHCO(CH_2)_7CH=CH(CH_2)_7CH_3$; $R^{15}$: $CH_2NHCOCH=CH_2$; $R^{16}$: $CH_2OCH_3$

MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$

MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$

MP-200: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

In the present invention, a copolymer in which two or more kinds of above-mentioned repetition units are combined may be used. Two or more kinds of homopolymers or copolymers may be used together.

A compound having two or more kinds of 1,3,5-triazine rings may be used and two or more discotic compounds (for example, a compound having a 1,3,5-triazine ring and a compound having a porphyrin moiety) are also usable.

0.2 through 30 percentage by mass—more preferably, 1 through 20 percentage by mass—of these additives is preferably added to the cellulose ester film. The triazine based compound expressed by the general formula (1) in the Official Gazette of Japanese Patent Tokkai 2001-235621 is also used preferably in the cellulose ester film of the present invention.

The ultraviolet absorber can be a mixture of two or more substances. A high molecular ultraviolet absorber is also used preferably as the ultraviolet absorber. Especially the polymer type ultraviolet absorber disclosed in the Official Gazette of Japanese Patent Tokkaihei 6-148430 is preferably used.

The method of adding the ultraviolet absorber is described below: One way is to dissolve the ultraviolet absorber in such an organic solvent as alcohol, methylene chloride and dioxolane. Then dope is added. Another way is to add it directly in the dope composition. In the case of the inorganic powder or the like that does not melt in the organic solvent, it is dispersed in the organic solvent and cellulose ester using a dissolver and sand mill, and then the dope is added.

The amount of the ultraviolet absorber to be used varies depending on the type of the compound and operating condition. If the thickness of the dried cellulose ester film is 30 through 200 µm, 0.5 through 4.0 masse for the cellulose ester film is prefereable, 0.6 through 2.0 mass % is more prefereable.

(Organic/Inorganic Hybrid Film)

The cellulose ester film of the present invention is the organic/inorganic hybrid film containing the reactive metallic compound, polycondensation. This arrangement helps improve the advantages of the present invention. The major component of the present invention is preferably the inorganic polymer formed of the aforementioned cellulose ester and the polycondensation of alkoxysilane by hydrolysis expressed by the following general formula (2). The major component in the sense in which it is used here refers to the aforementioned cellulose ester and polycondensation of alkoxysilane by hydrolysis accounting for 80% or more in terms of percentage by mass. In addition to the major component, additives such as a plasticizer and matting agent may be included.

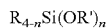  General formula (2)

In the aforementioned general formula (2), R' denotes a hydrogen atom or a monovalent substituent, and "n" indicates 3 or 4.

The alkyl group represented by R' includes the methyl group, ethyl group, propyl group, butyl group, and methoxyethyl group. It can be replaced by the substituent (e.g. halogen atom, alkoxy group). The alkoxy group is desorbed by hydrolysis and polycondensation of the alkoxysilane to produce alcohol. A lower alkoxy group that volatilizes easily when dried is preferred. Especially methyl and ethyl groups are preferably used.

The monovalent substituent represented by R can be any compound that exhibits the properties of alkoxysilane. To put it more specifically, it includes alkyl group, cycloalkyl group, alkenyl group, aryl group, aromatic heterocyclic ring group, and silyl group. Among them, preferred examples are the alkyl group, cycloalkyl group and alkenyl group. They can be further replaced. The substituent of R includes a halogen atom such as fluorine atom and chlorine atom, amino group, epoxy group, mercapto group, hydroxyl group and acetoxy group. In particular, various substituents that do not lose the properties of alkoxysilane can be mentioned.

The specific examples of the preferably used alkoxysilane expressed in the general formula (1) are: tetramethoxysilane, tetraethoxysilane (TEOS), tetra n-propoxysilane, tetraisopropoxysilane, tetra n-butoxysilane, tetra t-butoxysilane, tetrakis(methoxyethoxy)silane and tetrakis(methoxypropoxy)silane. The examples further include: methyltrimethoxysilane, methyltriethoxysilane, ethyltrimethoxysilane, ethyltriethoxysilane, n-propyltrimethoxysilane, n-propyltriethoxysilane, n-butyltrimethoxysilane, i-butyltrimethoxysilane, n-hexyltrimethoxysilane, 3-glycidoxypropyltrimethoxysilane, 3-aminopropyltriethoxysilane, 2-(3,4-epoxycyclohexyl)ethyltrimethoxysilane, 3-chloropropyltrimethoxysilane, 3-mercaptopropyltrimethoxysilane, acetoxytriethoxysilane, (heptadecafluoro-1,1,2,2-tetrahydrodesyl)trymethoxysilane, (3,3,3-trifluoropropyl)trimethoxysilane, (3,3,3-trifluoropropyl)trimethoxysilane, and pentafluorophenylpropyltrimethoxysilane. The examples further include: vinyltrimethoxysilane, vinyltriethoxysilane, phenyltrimethoxysilane, vinyltrimethoxysilane, and vinyltriethoxysilane.

It is also possible to use the silicon compound of condensation products with several molecules such as Silicate 40 and Silicate 45, Silicate 48 and M Silicate 51 by Tama Chemical Co., Ltd., the silicon compound being formed by partial condensation of these compounds.

The amount of the organic metallic compound (alkoxysilane hydrolysis polycondensation) contained in the transparent film is preferably 1 through 40 percentage by mass, on the assumption that polycondensation by hydrolysis is perfectly completed, relative to the overall mass of the transparent film, as indicated the following general formula (3) (R is synonymous with R in the aforementioned general formula (2)). To ensure that the transparent film does not easily soften at a high temperature, the amount of the metallic oxide added is preferably 1 percentage by mass or more. To prevent the network structure of the transparent film from being too close and a fragile film from being produced, it is preferred that the amount of the metallic oxide added should not exceed 40 percentage by mass of the transparent film.

$R_{4-n}SiO_{n/2}$  General formula (3)

where R denotes a hydrogen atom or a monovalent substituent, and n indicates 3 or 4.

In the transparent film of the present invention, water and catalyst can be added, if required, to the alkoxysilane expressed by the aforementioned general formula (2) to cause hydrolysis to take place and to promote condensation.

From the viewpoint of productivity in film haze, flatness, film making speed and solvent recycling, water content for hydrolysis and polycondensation of alkoxysilane in the dope is preferably within the range of 0.01 or more without exceeding 2.0 percent by mass.

When water is added to the hydrophobic organic metallic compound, coexistence of such a hydrophilic organic solvent as methanol, ethanol and acetonitrile is preferred to facilitate mixing of the organic metallic compound water. When the organic metallic compound is added to the dope of cellulose derivative, it is preferred that high-quality solvent of the aforementioned cellulose derivative should also be contained, to ensure that the cellulose derivative does not separate out of the dope.

The catalyst used here includes: such inorganic acids as hydrochloric acid, sulfuric acid, nitric acid, phosphoric acid, dodecatungstophosphoric acid (VI), dodecamolybdophosphoric acid (VI) and tungstosilicic acid; and such organic acids as acetic acid, trifluoroacetic acid, levulinic acid, citric acid, p-toluenesulfonic acid and methanesulfonic acid. A base can be added to promote neutralization after sol-gel reaction processes subsequent to addition of acids. When the base is added to promote neutralization, the content of alkali metal is preferably below 5,000 ppm prior to the step of drying (where the alkali metal also includes the ionized substance). Further, Lewis acid, for example, metallic acetate such as germanium, titanium, aluminum, antimony and tin; other organic acids, halogenated compound, and phosphoric acid can be used in combination.

Instead of the aforementioned acids, the following can be used as a catalyst: ammonium, monoethanolamine, diethanolamine, triethanolamine, diethylamine and triethylamine; bicyclo ring based amine such as DBU (diazabicycloundecene-1) and DBN (diazabicyclononene); and a base such as ammonium, phosphine, alkali metal alkoxide, ammonium hydroxide, tetramethylammonium hydroxide and benzyltrimethylammonium hydroxide.

There is no particular restriction to the amount of the acid or alkali catalyst to be added. It is preferably 0.01 through 20 percent by mass relative to the amount of water to be added. Further, processing of acid and base can be used in combination several times. The catalyst can be neutralized, or the volatile catalyst can be removed by pressure reduction or by separation of liquid and washing by water. It is also possible to use such a solid catalyst as an ion exchange resin, which is convenient for removal of the catalyst.

In the present invention, the organic/inorganic hybrid film is manufactured as follows: The solution prepared by dissolving the aforementioned organic polymer, preferably cellulose derivative dissolved therein is mixed with the solution obtained by dissolving the polycondensation of the aforementioned metallic alkoxide by hydrolysis. The hydroxyl group contained in the cellulose derivative is made to react with the metallic alkoxide or the polycondensation thereof, thereby preparing the solution (dope) made of organic and inorganic hybrid polymers. After that, according to the solvent casting method, the solution (dope) made up of the aforementioned hybrid polymer is cast from the die onto the continuously traveling endless support member (hereinafter referred to also as an endless belt, casting belt or belt), so that film thickness will be uniform. After having been dried until the film becomes strong enough to be separated on the endless support member, the formed film is separated from the support member. After it has been dried completely again, it is wound up, whereby the organic/inorganic hybrid film is manufactured.

<Microparticles>

The cellulose ester film of the present invention preferably contains microparticles.

Microparticles may be inorganic, for example: silicon dioxide, titanium dioxide, aluminum oxide, zirconium oxide, calcium carbonate, talk, clay, calcined kaolin, calcined calcium silicate, hydrated calcium silicate, aluminum silicate, magnesium silicate or calcium phosphate. Microparticles containing silicon are preferable in respect to decreasing turbidity, and silicon dioxide is specifically preferable.

The mean diameter of primary particles is preferably from 5 to 50 nm, and more preferably from 7 to 20 nm. The particle should preferably exist as an aggregated secondary particle of a diameter from 0.05 to 0.3 µm. The content of the particle in a cellulose ester film is preferably from 0.05 to 1 percent by weight, and is more preferably from 0.1 to 0.5 percent. In a multi-layered cellulose ester film prepared by a co-casting method, a major part of the particles should preferably exist near the surface.

Microparticle of silicon dioxide available on the market include, for example: AEROSIL R972, R927V, R974, R812, 200, 200V, 300, R202 and OX50 which are manufacture by Nippon Aerosil Co., Ltd.

Microparticles of zirconium oxide available on the market include, for example: AEROSIL R976 and R811 manufacture by Nippon Aerosil Co., Ltd.

Microparticles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to exhibiting a lower friction coefficient while the low turbidity is maintained. Kinetic friction coefficient of the rear side of a hard coat layer in the present invention is preferably not more than 1.0.

<Dyes>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of the 8 positions of anthraquinone. Preferable substituents are an aniline group, a hydroxyl group, an amino group, a nitro group and a hydrogen atom. Blue dyes disclosed in JP-A 2001-154017, particularly anthraquinone type dyes, are preferably added to the film.

Additives described above may be added to a dope containing cellulose ester via batch mixing, or, alternatively, they may be added via in-line mixing using a dissolving solvent of the additives. Specifically, microparticles are preferably added, partially or entirely via an in-line mixing, in order to reduce a load to a filter.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Industries, Inc., is preferably used.

<Manufacturing Method of Cellulose Ester>

Next, a manufacturing method of the cellulose ester of the present invention will be explained.

The manufacturing method of the cellulose ester film in the present invention comprises (i) a dope preparing step in which cellulose ester and additives are dissolved in solvents, (ii) a flow-casting step in which a dope is flow-cast on a continuously running endless metal support, (iii) a drying process in which a flow-cast dope is dried to form a web, (iv) a peeling step in which a dried web is peeled from a metal support, (v) a stretching step in both the longitudinal and the lateral directions, (vi) a further drying step and (vii) a winding step of the resulting film.

In the dope preparing step, a higher content of cellulose ester in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. A mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is used in the flow-casting step. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is preferably from 0 to 40° C. and more preferably from 5 to 30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support.

In order to obtain a cellulose ester film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 60 to 130 percent by weight.

The residual solvent content of the web is defined by the following formula:

Residual solvent content (% by weight)=$\{(M-N)/N\} \times 100$

Where M represents weight of a sample of the web collected in the manufacturing step or after manufacturing, and N represents weight of the same sample after it was dried at 115° C. for 1 hour.

In the drying step of a cellulose ester film, the film is peeled from a support and further dried. The content of residual solvent in the resulting film is preferably less than 1 percent, more preferably less than 0.1 percent and specifically preferably from 0 to 0.01 percent.

In a drying process of a film, two methods may be employed, i.e., (i) a roll drying method in which a cellulose ester film is passed through many rollers placed alternatively up and down in a staggered manner, and (ii) a tenter method in which a cellulose ester film is transported while both sides of the film are clipped to put tension in the lateral direction.

It is specifically preferable that a cellulose ester film is peeled from a metal support and is immediately stretched in the transport (longitudinal) direction while the film still contains much residual solvent. The film is then preferably stretched in the lateral direction using an above described tenter method. The stretching magnifications in both the longitudinal and the lateral directions are preferably in the range from 1.05 to 1.3 and more preferably from 1.05 to 1.15. The area of the film is preferably from 1.12 to 1.44 times larger and more preferably from 1.15 to 1.32 times larger, after the film is stretched in both the longitudinal and the lateral directions. The magnification of the stretched film area is a product of the stretch magnifications in both the longitudinal and the lateral directions. When one of the two stretching magnifications is lower than 1.05, the flatness of the film may be reduced by the irradiation of the UV rays in the hard coat layer forming step. A stretching magnification of higher than 1.3 is also unfavorable because of a greater loss in flatness and an increase in haze of the film.

A film is preferably peeled from the support with a tension of larger than 210 N/m and more preferably with a tension from 220 to 300 N/m in order to stretch the film in the longitudinal direction just after peeling.

The method to dry the web is not specifically limited, however, generally, hot air, IR ray, heated rollers or microwave irradiation is used. Hot air is preferably used with respect to ease of cure and low cost.

The preferable drying temperature of a web to obtain stable film dimensions is from 40 to 150° C. and more preferably from 40 to 140° C. The temperature is preferably increased stepwise.

The thickness of a cellulose ester is not specifically limited, however, a thickness from 10 to 200 µm is preferable. So far, a cellulose ester film of a thickness from 10 to 70 µm having a superior flatness as well as a sufficient hardness have been difficult to obtain, however, in the present invention, such films can be obtained at considerably high productivity. Hence, a preferable film thickness is from 10 to 70 µm, more preferably from 20 to 60 µm and most preferably from 35 to 60 µm.

A multilayer retardation film formed by a co-casting method using a plurality of dope solutions is also preferable. The multilayer retardation film can also have a layer containing a plasticizer. The layer containing a plasticizer may be a core layer, a skin layer or both the layers.

The cellulose ester film used in the present invention has a width of 1 m through 4 m. When productivity and handling ease are taken into account, the particularly preferred width is 1.4 m through 2 m. The average roughness (Ra) of the surface on which actinic radiation curable resin of the cellulose ester film is provided is preferably 0.001 µm through 1 µm.

The cellulose ester film of the present invention is preferred as the optical compensation film in addition to the antireflection film (to be described later).

The anisotropic liquid crystal material and polarizing plate is used as the liquid crystal display. This involves a problem of the angle of visibility. Namely, even if a satisfactory display is obtained as viewed from the front, the display performance is unsatisfactory when viewed from off-center. A compensation plate for the angle of visibility is required to improve the performance. An average refractive index distribution is greater in the widthwise direction of the cell, and is smaller in the in-plane direction. Thus, the anisotropy is offset as a compensation plate. Such being the case, greater advantages are provided by the film having a so-called negative uniaxial structure, wherein the refractive index in the direction of film thickness is smaller than that in the in-plane direction. Thus, the cellulose ester film of the present invention can also be used as the optical compensation film having such a function.

In the present invention, the retardation film preferably has the Ro value of 20-300 nm under a condition of 23° C. and 55% RH and the Rt value of 70-40 under the same condition, the Ro and Rt values being defined by the following formulas.

$$Ro = (nx - ny) \times d$$

$$Rt = (((nx + ny)/2) - nz) \times d$$

wherein Ro represents an in-plane retardation value; Rt represents an out-of-plane retardation value in a thickness direction; nx represents an in-plane refractive index in a slow axis direction; ny represents an in-plane refractive index in a fast axis direction; nz represents an out-of-plane refractive index in the thickness direction; and d represents a thickness (nm) of the retardation film.

The retardation values Ro, Rt and an angle between the lateral direction of the long sheet film and the slow axis direction θ0 (°) were measured by using an automatic birefringence meter: KOBRA-21ADH (manufactured by Oji Keisokukiki Co., Ltd.) under a condition of 23° C. and 55% RH at a wavelength of 590 nm.

An example of a stretching process (or a tenter process) to produce a optical compensating film according to the present invention is explained with reference to FIG. 2.

Figure 2:
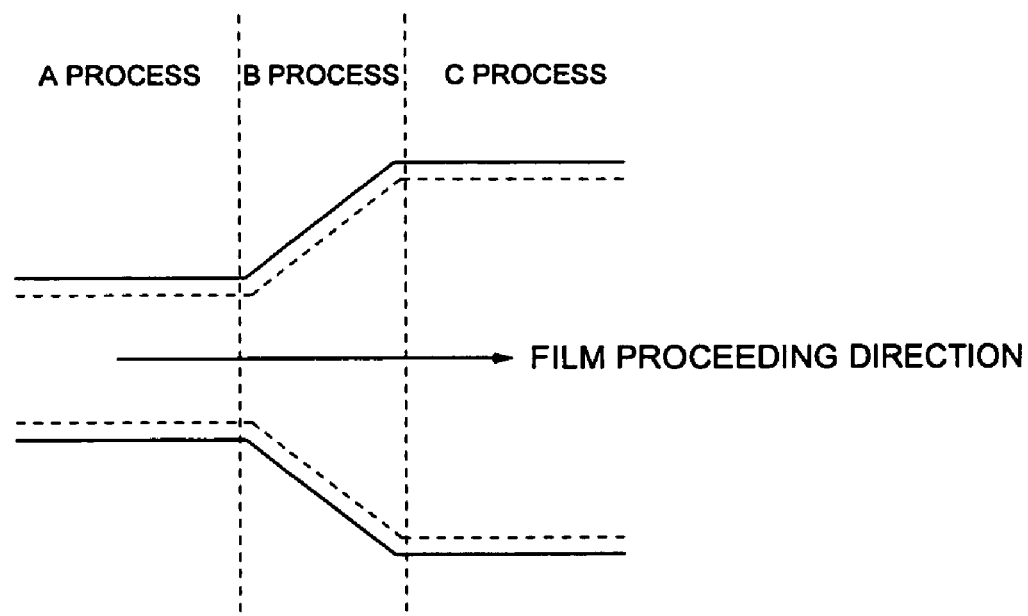
FIG. 2 is a schematic diagram showing one example of a tenter process used in the present invention.

Process A of FIG. 2 is one where a film (web) conveyed from the D0 process (not illustrated) is held by clipping. In Process B, the film is stretched in the transverse direction (the lateral direction) with the stretching angle illustrated in FIG. 1 (to be explained later). In Process C, stretching is completed and the film is conveyed to the next production step while being clipped.

A slitter which trims both edges of the film is preferably provided at any position between just after the web is peeled and just after Process B or C. Specifically preferably, a slitter is provided just before Process A. When a stretching was carried out under the same condition, a stretched film which is slit before Process B showed an improved orientation angle distribution of slow axes than a stretched film without slitting.

This may be because an undesirable stretching in the machine direction is suppressed between the peeling process and Process B where the film still contains much solvent.

In a tenter process, different temperature domains may be purposely provided in the film to improve the orientation angle distribution of slow axes. Also a neutral domain is preferably provided between two different temperature domains to prevent interference.

The stretching process may be divided into several steps. Biaxial stretching in both machine and transverse directions is also preferable. Biaxial stretching may be carried out simultaneously or in series of steps. In stepped stretching, stretching may be carried out in different directions or in the same direction. Stretching in different directions may also be added to the sequence of stepped stretching in the same direction. The following stretching steps may be possible.

- stretching in the casting direction—stretching in the transverse direction and simultaneously stretching in the casting direction;
- stretching in the casting direction—stretching in the transverse direction and simultaneously stretching in the casting direction.

Further, simultaneous biaxial stretching may includes a case in which the stretching is conducted in one direction and contracting is conducted in the other direction by easing the tension.

A preferable stretching magnification of the simultaneous biaxial stretching to obtain an optical compensation film according to the present invention is ×1.05 to ×1.5 in the widthwise direction and ×0.8 to ×1.3 in a longitudinal direction (a casting direction), in particular, it may be more preferable to make it to be ×1.1 to ×1.5 in the widthwise direction and ×0.8 to ×0.99 in a longitudinal direction. Especially, it may be further more preferable to make it to be ×1.1 to ×1.4 in the widthwise direction and ×0.9 to ×0.99 in a longitudinal direction.

The term "stretching direction" is usually used to indicate the direction in which a direct stretching stress is applied to a film (expression 1), however, in a case of stepped biaxial stretching, "stretching direction" may indicate the direction in which the final stretching factor is the largest (expression 2), which is usually identical to the direction of a slow axis.

When a changing rate of a film dimension is discussed, the term "stretching direction" without explanation may be used in the meaning of above expression 2, and when an amount of residual solvent is discussed, the term is usually used in the meaning of above expression 1.

In order to improve dimensional stability of a stretched film after it is subjected to a high temperature-high humidity test (hereafter denoted as a 80° C.-90% RH test), stretching is preferably carried out while the film is heated and while the film still contains a residual solvent.

It is well known that, when a film is stretched in the transverse direction of the film, the dispersion of orientations of slow axes (hereafter referred to as a orientation angle dispersion) becomes larger. In order to conduct stretching in the transverse direction of a film while the ratio of Rth to Ro is kept constant and the orientation angle dispersion is kept small, a film preferably satisfies Ta≦(Tb−10), or Tc≦Tb, and more preferably the film satisfies both Ta≦(Tb−10) and Tc≦Tb, wherein Ta, Tb and Tc each represents a temperatures in Celsius at each end of Processes A, B and C, respectively.

In order to decrease the above mentioned orientation angle dispersion, the temperature increasing rate of the film in Process B is preferably 0.5 to 10° C./s.

The stretching duration in Process B is preferably shorter to increase a dimensional stability in the 80° C.-90% RH test, however, a lower limitation of the stretching duration may be prescribed to maintain uniformity of the film. The stretching duration is preferably 1 to 10 seconds, more preferably 4 to 10 seconds.

In the tenter process, a coefficient of heat transfer may be constant or may be changed. The heat transfer coefficient is preferably in the range of 41.9×10³ to 419×10³ J/m² hr, more preferably 41.9×10³ to 209.5×10³ J/m² hr, and further more preferably 41.9×10³ to 126×10³ J/m² hr.

In order to improve the dimensional stability of a film in the 80° C.-90% RH test, the stretching rate in the transverse direction in Process B may be constant or may be changed. The stretching rate is preferably in the range of 50 to 500%/minute, more preferably 100 to 400%/minute, and most preferably 200 to 300%/minute.

In the tenter process, the distribution of environmental temperature is preferably smaller to improve uniformity of a film. The distribution of environmental temperature in the tenter process is preferably within ±5° C., more preferably within ±2° C., and most preferably within ±1° C. By decreasing the distribution of environmental temperature, the temperature distribution in the transverse direction of a film may also be decreased.

In Process C, in order to suppress further stretching, the width of a film held by a tenter is preferably reduced. Specifically, the width is preferably reduced to 95 to 99.5% of the former process.

After a film is treated in the tenter process, a subsequent-drying process (hereafter referred to as Process D1) is preferably provided. In order to refine the optical property provided to the film in the tenter process and to further dry the film, the film is preferably subjected to a heat treatment in the temperature range of 50 to 140° C., more preferably, 80 to 140° C., and most preferably 110 to 130° C.

In Process D1, the distribution of environmental temperature in the transverse direction on a film is preferably smaller to improve uniformity of a film. The distribution of environmental temperature in the transverse direction is preferably within ±5° C., more preferably within ±2° C., and most preferably within ±1° C.

Although the film tension while the film is being conveyed is affected by several factors, for example: the property of a dope, the amount of residual solvent at the peeling process and Process D0, and the temperature of Process D1, the film tension is preferably 120 to 200 N/m, more preferably 140 to 200 N/m, and most preferably 140 to 160 N/m.

In order to reduce further stretching in the machine direction of the film in Process D1, a tension cut roll (an additional roll which reduces the tension of the film while the film is conveyed) is preferably provided. Preferably conducted is the trimming of both edges of the film using a slitter after the drying is completed and before winding in a roll, to obtain a roll of the preferable shape.

When the cellulose ester film of the present invention is used as an optical compensation film, the film, prepared by casting film formation method, having a thickness of 30 μm through 150 μm or less is preferably used. This is because of the advantage of ensuring compatibility between the physical strength and film manufacturing method, in addition to the advantages of the present invention. The thickness of the aforementioned film is more preferably 40 μm through 120 μm or less.

<Physical Properties>

The moisture permeability of the cellulose ester film of the present invention is 850 g/m² per 24 hours, preferably 20 g/m² through 800 g/m² per 24 hours, more preferably 20 g/m² through 750 g/m² per 24 hours at a temperature of 40° C. with a relative humidity of 90% RH. The moisture permeability can be measured according to the test procedure described in the JIS Z 0208.

The cellulose ester film of the present invention The elongation at break is preferably 10% through 80% according to the following measurement procedure, more preferably 20% through 50%.

(Measurement of Elongation at Break)

A sample 10 mm wide and 130 mm long is taken from the film including the residual solvent. This sample is stored for 24 hours at a temperature of 23° C. with a relative humidity of 55% RH. This sample is subjected to a tensile test at a chuck-to-chuck distance of 100 mm with at a tensile speed of 100 mm/min., whereby elongation at break is obtained.

The transmittance of the visible light obtained by the following method for measuring the cellulose ester film of the present invention is preferably 90% or more, more preferably 93% or more.

(Measurement of Transmittance)

Transmittances T of 380, 400 and 500 nm can be calculated from the spectral transmittance τ(λ) having been obtained for each sample at intervals of 10 nm in the wavelength range from 350 nm through 700 nm using the spectrophotometer U-3400 (Hitachi Limited).

The haze of the cellulose ester film of the present invention measured by the following method is preferably less than 1%, more preferably 0 through 0.1%.

(Haze)

Haze is measured according to the JIS K-6714 using the haze meter (Model 1001 DP by Nihon Denshoku Kogyo Co., Ltd.), and can be used as an indicator of transparency.

The preparation method of an acitinic ray-cured resin layer of a hard coat film of the present invention will be described.

In a hard coat film of the present invention, an actinic ray-curable resin is preferably used.

An actinic ray cured resin layer refers to a layer mainly comprising a resin which can be cured through a cross-linking reaction caused by irradiating with actinic rays such as UV rays or electron beams. A composition containing ethylenically unsaturated monomers is preferably utilized to form a hard coat layer by hardening the composition with irradiating actinic rays such as UV rays or electron beams. Typical examples of actinic ray curable resins include a UV ray-curable resin and an electron beam curable resin, however, a UV ray-curable resin is more preferably utilized.

The UV curable resin includes, for example: a UV-curable acryl urethane type resin, a UV-curable polyester acrylate type resin, a UV-curable epoxy acrylate type resin, a UV-curable polyol acrylate type resin and a UV-curable epoxy type resin.

The UV-curable urethane acrylate type resin includes compounds which are generally prepared easily by, initially, reacting polyester polyol with a monomer or a prepolymer of isocyanate, followed by further reacting the product with an acrylate type monomer having a hydroxy group such as 2-hydroxyethyl acrylate, 2-hydroxyethyl methacrylate (hereinafter, only acrylates are described, however methacrylates are also included) and 2-hydroxypropyl acrylate. For example, a compound disclosed in JP-A 59-151110 is preferably used.

For example, a mixture of 100 weight parts of UNIDIC 17-806 (Dainippon Ink and Chemicals, Inc.) and 1 weight part of COLONATE L (Nippon Polyurethane Industry Co., Ltd.) is preferably used.

The UV-curable polyester acrylate type resins include compounds which are generally prepared easily by reacting a polyester polyol with a 2-hydroxyethyl acrylate type or a 2-hydroxy acrylate type monomer. For example, those disclosed in JP-A 59-151112 are preferably used.

The UV-curable epoxy acrylate type resin includes compounds which are prepared by reacting an epoxy acrylate oligomer with a reactive dilutant and a photoreaction initiator. For example, as disclosed in JP-A 1-105738 are preferably used.

The UV-curable polyol acrylate type resin includes, for example: trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

The photoreaction initiators include, for example: benzoine including derivatives, acetophenone, benzophenone, hydroxy benzophenone, Michler's ketone, α-amyloxim ester and thioxanthone including derivatives. These compounds may be utilized together with a photo sensitizer. The photoreaction initiator described above can also be utilized as a photo sensitizer. Further, sensitizers such as n-butyl amine, triethyl amine and tri-n-butyl phosphine can be utilized together with an epoxy acrylate type photoreaction agent. The amount of a photoreaction initiator or a photo sensitizer is preferably from 0.1 to 15 weight parts, more preferably from 1 to 10 weight parts in 100 weight parts of the UV-curable resins described above.

Resin monomers include, for example: (i) a monomer having one unsaturated double bond, such as methyl acrylate, ethyl acrylate, butyl acrylate, benzyl acrylate, cyclohexyl acrylate, vinyl acetate and styrene, and (ii) a monomer having two or more unsaturated double bonds, such as ethylenegly-col diacrylate, propyleneglycol diacrylate, divinyl benzene, 1,4-cyclohexyane diacrylate and 1,4-cyclohexyldimethyl diacrylate. Foregoing trimethylolpropane triacrylate and pentaerythritol tetraacrylate ester are also included.

Selected products available on the market as a UV curable resin which can be utilized in the present invention may be: Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include, for example: trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

7454 (E2)

The UV-curable resin layer thus obtained may preferably contain inorganic or organic particles in order to attain the following characteristics: (i) improving scratch resistance, (ii) providing lubrication and (iii) controlling refractive index.

Inorganic particles to be contained in a hard coat layer include, for example: silicon oxide, titanium oxide, aluminum oxide, tin oxide, indium oxide, ITO, zinc oxide, zirconium oxide, magnesium oxide, calcium carbonate, talc, clay, calcined kaolin, calcined calcium silicate, hydrated calcium silicate, aluminum silicate, magnesium silicate and calcium phosphate. Of these, silicon oxide, titanium oxide, aluminum oxide, zirconium oxide, magnesium oxide are specifically preferable.

Organic particles include, for example: particles of polymethacrylic acid methyl acrylate resin, acryl styrene based resin, polymethyl methacrylate resin, silicon-containing resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic particles include, for example: particles of cross-linked polystyrene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The mean particle diameter of the particles is preferably from 0.01 to 5 μm, more preferably from 0.1 to 5 μm, and specifically preferably from 0.1 to 4 μm. The hard coat layer preferably contains two or more kinds of particles having different diameters. The mixing ratio of particles and UV-curable resin composition is preferably from 0.1 to 30 weight parts of particles per 100 weight parts of resin composition.

The hard coat layer is preferably a layer having a mean center-line roughness (Ra: prescribed by JIS B 0601) of 0.001 to 0.1 μm or may be an anti-glare layer having Ra value of 0.1 to 1 μm. The mean center line roughness (Ra) is preferably measured by means of a non-contact surface micro morphology meter, for example, WYKO Optical Profiler NT-2000 manufactured by Veeco Instruments.

The refractive index of the actinic radiation curable resin of the present invention is preferably 1.5 through 2.0, more preferably 1.6 through 1.7 from the viewpoint of optical designing to get low-reflection film. The refractive index of the actinic radiation curable resin can be adjusted in conformity to the refractive index and content of the particles or inorganic binder to be added. From the viewpoint of ensuring a sufficient durability and resistance to shock, the film of the actinic radiation curable resin is preferred to have a thickness of 0.5 μm through 10 μm, and more preferred to have a thickness of 1 μm through 5 μm.

The hard coat layers can be applied by any method well known in the art, for example: a gravure coater, a dip coater, a reverse coater, a wire bar coater, a die coater and ink jet printing. After coating, the hard coat layer is dried by heating, followed by being subjected to hardening treatment.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is generally from 5 to 150 mJ/cm$^2$, and is more preferably from 20 to 100 mJ/cm$^2$.

Irradiation with ionizing radiation onto the hard coat layer is preferably carried out while tension in the transportation direction is applied to the film, and more preferably it is carried out while tension in the lateral direction is also applied to the file. The tension to be applied is preferably 30-300 N/m. The method to apply the tension is not specifically limited. The tension may be applied to the film transportation direction on a backroll or may be applied to the lateral direction or to the biaxial directions by using a tenter, whereby a film having further improved flatness is obtained.

The coating solution for the hard coat layer may contain solvent which may be a mixed solution or a diluted solution.

An organic solvent can be selected from, for example: the hydrocarbon series, the alcohol series (methanol, ethanol, isopropanol, butanol and cyclohexanol), the ketone series (acetone, methyl ethyl ketone and isobutyl ketone), the ester series (methyl acetate, ethyl acetate and methyl), the glycol ether series and other organic solvents. These organic solvents may be also used in combinations. The above mentioned organic preferably contains propyleneglycol monoalkylether (with an alkyl group having 1 to 4 carbon atoms) or propyleneglycol monoalkylether acetate ester (with an alkyl group having 1 to 4 carbon atoms) with a content of 5 percent by weight or more, and more preferably from 5 to 80 percent by weight.

In a coating solution of a UV ray-curable resin, a silicon compound such as a polyether modified silicone oil, is preferably added. The number average molecular weight of a polyether modified silicone oil is preferably from 1,000 to 100,000 and more preferably from 2,000 to 50,000. Addition of a polyether modified silicone oil with a number average molecular weight of less than 1,000 may lower the drying rate of the coating solution, while on the other hand, that of more than 100,000 may result in a difficulty in bleeding out at the surface of the coated film. Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of the solution onto a substrate or an under coat layer. If these compounds are used as the top layer of stacked film layers, these compounds may contribute to improve not only water-resistance, oil-resistance and antistaining properties, but also improve scratch resistance of the film. The content of the added silicon compound is preferably from 0.01 to 3 percent by weight based on the solid composition in the coating solution.

Aforementioned coating methods are preferably also used to coat a solution of UV ray-curable resin. The thickness of a wet film of coated UV-curable resin is preferably from 0.1 to 30 μm and more preferably from 0.5 to 15 μm. The thickness of the dried film of the same is preferably from 0.1 to 10 μm and more preferably from 1 to 10 μm.

A UV ray-curable resin layer is preferably irradiated with UV rays while the layer is being dried, or alternatively after it is dried. The duration of UV ray irradiation of the amount from 5 to 100 mJ/cm$^2$ as mentioned above is preferably from 0.1 seconds to 5 minuets. With respect to working efficiency and hardening efficiency of the UV-curable resin, the duration of the same is more preferably from 0.1 to 10 seconds.

The intensity of the actinic ray is preferably from 50 to 150 mW/m$^2$.

(Back Coat Layer)

The hard coat film of the present invention having a hard coat layer on one surface of the cellulose ester film is preferably provided with a back coat layer on the other surface of the cellulose ester film. A back coat film is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Inorganic microparticle available on the market include, for example: AEROSIL R972, R927V, R974, R812, 200, 200V, 300, R202 and OX50 which are manufacture by Nippon Aerosil Co. Ltd. Microparticles of zirconium oxide available on the market include, for example: AEROSIL R976 and R811 manufacture by Nippon Aerosil Co. Ltd.

Microparticles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably less than 0.9 and specifically preferably from 0.1 to 0.9.

The content of microparticles contained in the back coat layer is preferably from 0.1 to 50 percent by weight and more preferably from 0.1 to 10 percent by weight. The increase in haze after the hard coat film is provided with a back coat layer is preferably less than 1 percent, more preferably less than 0.5 percent and specifically preferably from 0.0 to 0.1 percent.

The back coat layer is formed by means of a coating method using a coating solution containing a solvent which dissolves and/or swells cellulose ester (hereafter this type of solvent is referred to as "type A solvent"). The solvent may occasionally be comprised of a solvent which does not dissolve nor swell cellulose ester (hereinafter this type of solvent is referred to as "type B solvent"). The mixing ratio of these solvents and the amount of the coating solution to be used for forming a back coat layer is appropriately determined depending on the extent of the curl and the type of the resin used for the hard coat film.

In order to have a larger effect to prevent curl in the film, the mixing ratio of type A solvent is increased while the ratio of type B solvent is decreased. The mixing ratio of type A solvent to type B solvent is preferably 10 to 0 through 1 to 9.

Examples of type A solvent include: dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of type B solvent include: methanol, ethanol, n-propyl alcohol, i-propyl alcohol, n-butanol and hydrocarbons (such as toluene, xylene and cyclohexane).

The back coat layer is coated by means of, for example: a gravure coater, a dip coater, a reverse coater, a wire-bar coater and a die coater, in a thickness of preferably from 1 to 100 μm and specifically preferably from 5 to 30 μm. Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose ester type resins such as cellulose nitrate, cellulose acetate propionate, cellulose diacetate, cellulose triacetate, cellulose acetate phthalate and cellulose acetate butylate; (iii) rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; and (v) a fluorine-containing type resin, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubisi Rayon Co., Ltd.). A resin used in the present invention may suitably be selected from the above examples.

Cellulose type resin such as diacetyl cellulose and cellulose acetate propionate is specifically preferable.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of a back coat layer may preferably be divided in two or more times. Incidentally, a backcourt layer mentioned here can be coated also on an optical compensation film, whereby the flatness of the optical compensation film can be maintained, and a retardation change can be lessen.

<Antireflection Layer>

An antireflection layer is preferably formed on the cellulose ester film of the present invention to form an antireflection film. The antireflection layer can be formed to provide various functions by the coating method, plasma CVD method, atmospheric pressure plasma method or the like. Of these methods, the coating method is preferably used to produce the antireflection film of the present invention.

<Antireflective Layer>

Methods to form an antireflective layer via a coating method includes: (i) a method in which metal oxide powder is dispersed in a binder resin having been dissolved in solvents followed by coating and then drying; (ii) a method in which a polymer having a cross-linked structure is utilized as a binder resin; and (iii) a method in which an ethylenically unsaturated monomer and a photopolymerization initiator are included in a coating solution and formation of a thin layer is carried out by irradiating the same with an actinic ray.

In the present invention, an antireflection layers are formed on the cellulose ester film provided with the aforementioned actinic radiation curable resin, and at least one of the aforementioned antireflection layers is preferably a low-refractive index layer. The following shows the preferred structures of the antireflection film without the present invention being restricted thereto:

In the following description, the hard coated layer refers to the aforementioned actinic radiation curable resin.

Cellulose ester film/clear hard coated layer/low-refractive index layer

Cellulose ester film/clear hard coated layer/high-refractive index layer/low-refractive index layer Cellulose ester film/clear hard coated layer/intermediate refractive index layer/high-refractive index layer/low-refractive index layer Cellulose ester film/antistatic layer/clear hard coated layer/low-refractive index layer Cellulose ester film/antistatic layer/clear hard coated layer/high-refractive index layer/low-refractive index layer Cellulose ester film/antistatic layer/clear hard coated layer/intermediate refractive index layer/high-refractive index layer/low-refractive index layer Cellulose ester film/anti-glare hard coated layer/low-refractive index layer Cellulose ester film/anti-glare hard coated layer/high-refractive index layer/low-refractive index layer Cellulose ester film/anti-glare hard coated layer/intermediate refractive index layer/high-refractive index layer/low-refractive index layer Cellulose ester film/antistatic layer/anti-glare hard coated layer/low-refractive index layer Cellulose ester film/antistatic layer/anti-glare hard coated layer/high-refractive index layer/low-refractive index layer Cellulose ester film/antistatic layer/anti-glare hard coated layer/intermediate refractive index layer/high-refractive index layer/low-refractive index layer For all these films, the aforementioned back coated layer is preferably provided on the face opposite the side coated with the actinic radiation curable resin of the cellulose ester film.

In order to decrease reflectance, a hard coat film preferably has stacking layers on it, for example, a low refractive index metal oxide layer as a top layer and a high refractive index metal oxide layer as a second layer which is in between the above mentioned top layer and the hard coat layer. Further, it may have a medium refractive index metal oxide layer (a metal oxide layer of which the refractive index is controlled by using a different metal or by changing the amount of the metal) as a third layer in between the second layer and the hard coat layer. The refractive index of a high refractive index layer is preferably from 1.55 to 2.30 and more preferably from 1.57 to 2.20. The refractive index of a medium refractive index layer is controlled to be an intermediate value between a refractive index of a cellulose ester substrate (around 1.5) and of a high refractive index layer. The refractive index of a medium refractive index layer is preferably from 1.55 to 1.80. The thickness of a metal oxide layer is preferably from 5 nm to 0.5 µm, more preferably from 10 nm to 0.3 µm and most preferably from 30 nm to 0.2 µm. The haze of a metal oxide layer is preferably not more than 5%, more preferably not more than 3% and most preferably not more than 1%. The pencil hardness grade of a metal oxide layer under a weight of 1 kg is preferably 3H or higher and most preferably 4H or higher. In case a metal oxide layer is formed by a coating method, inorganic microparticles and a binder polymer are preferably incorporated therein.

In the low refractive index layer, in order to obtain a low refractive index, it may be preferable to use complex particles including a porous particle and a cover layer arranged on the surface of said porous particle or hollow particles whose inside is filled with solvent, gas or porous particles.

Inorganic particles are (I) complex particles constituted of a porous particle and a cover layer arranged on the surface of said porous particle or (II) hollow particles, the interior of which is provided with a hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is provided with a hollow, and the hollow is surrounded by a particle wall. The interior of the hollow is filled with the contents such as a solvent, a gas or a porous substance which have been utilized in preparation. The mean particle size of such inorganic particles is preferably in a range of 5-300 nm and preferably of 10-200 nm. The mean particle size of inorganic particles utilized is appropriately selected depending on the thickness of the formed transparent cover film and is preferably in a range of $2/3$-$1/10$ of the layer thickness of the transparent cover film of such as a formed low refractive index layer. These inorganic particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased.

Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those comprising single component or mixture of plural components.

As a manufacturing method of such hollow particles, a preparation method of complex oxide colloidal particles, disclosed in paragraph Nos. [0010]-[0033] of JP-A No. 7-133105 (JP-A refers to Japanese Patent Publication Open to Public Inspection), is suitably applied. Specifically, in the case of a complex particle being comprised of silica and an inorganic compound other than silica, the hollow particle is manufactured according to the following first-third processes.

First Process: Preparation of Porous Particle Precursor

In the first process, alkaline aqueous solutions of a silica raw material and of an inorganic compound raw material other than silica are independently prepared or a mixed aqueous solution of a silica raw material and an inorganic compound raw material other than silica is prepared, in advance, and this aqueous solution is gradually added into an alkaline aqueous solution having a pH of not less than 10 while stirring depending on the complex ratio of the aimed complex oxide, whereby a porous particle precursor is prepared.

As a silica raw material, silicate of alkali metal, ammonium or organic base is utilized. As silicate of alkali metal, utilized are sodium silicate (water glass) and potassium silicate. Organic base includes quaternary ammonium salt such as tetraethylammonium salt; and amines such as monoethanolamine, diethanolamine and triethanolamine. Herein, an alkaline solution, in which such as ammonia, quaternary ammonium hydroxide or an amine compound is added in a silicic acid solution, is also included in silicate of ammonium or silicate of organic base.

Further, as a raw material of an inorganic compound other than silica, utilized is an alkali-soluble inorganic compound. Specific examples include oxoacid of an element selected from such as Al, B, Ti, Zr, Sn, Ce, P, Sb, Mo, Zn and W; alkali metal salt, alkaline earth metal salt, ammonium salt and quaternary ammonium salt of said oxoacid. More specifically, sodium alminate, sodium tetraborate, ammonium zirconyl carbonate, potassium antimonite, potassium stannate, sodium alminosilicate, sodium molybdate, cerium ammonium nitrate and sodium phosphate are suitable.

The pH value of a mixed aqueous solution changes simultaneously with addition of these aqueous solutions, however, operation to control the pH value into a specific range is not necessary. The aqueous solution finally takes a pH value determined by the types and the mixing ratio of inorganic oxide. At this time, the addition rate of an aqueous solution is not specifically limited. Further, dispersion of a seed particle may be also utilized as a starting material at the time of manufacturing of complex oxide particles. Said seed particles are not specifically limited, however, particles of inorganic oxide such as $SiO_2$, $Al_2O_3$, $TiO_2$ or $ZrO_2$ or complex oxide thereof are utilized, and generally sol thereof can be utilized. Further, a porous particle precursor dispersion prepared by the aforesaid manufacturing method may be utilized as a seed particle dispersion. In the case of utilizing a seed particle dispersion, after the pH of a seed particle dispersion is adjusted to not lower than 10, an aqueous solution of the aforesaid compound is added into said seed particle dispersion while stirring. In this case pH control of dispersion is not necessarily required. By utilizing seed particles in this manner, it is easy to control the particle size of prepared particles and particles having a uniform size distribution can be obtained.

A silica raw material and an inorganic compound raw material, which were described above, have a high solubility at alkaline side. However, when the both are mixed in pH range showing this high solubility, the solubility of an oxoacid ion such as a silicic acid ion and an aluminic acid ion will decrease, resulting in precipitation of these complex products to form particles or to be precipitated on a seed particle causing particle growth. Therefore, at the time of precipitation and growth of particles, pH control in a conventional method is not necessarily required.

A complex ratio of silica and an inorganic compound other than silica is preferably in a range of 0.05-2.0 and more preferably of 0.2-2.0, based on mole ratio $MO_x/SiO_2$, when an inorganic compound other than silica is converted to oxide ($MO_x$). In this range, the smaller is the ratio of silica, increases the pore volume of porous particles. However, a pore volume of porous particles barely increases even when the mole ratio is over 2.0. On the other hand, a pore volume becomes small when the mole ratio is less than 0.05. In the case of preparing hollow particles, mole ratio of $MO_x/SiO_2$ is preferably in a range of 0.25-2.0.

Second Process: Elimination of Inorganic Compounds other than Silica from Porous Particles In the second process, at least a part of inorganic compounds other than silica (elements other than silica and oxygen) is selectively eliminated from the porous particle precursor prepared in the aforesaid first process. As a specific elimination method, inorganic compounds in a porous particle precursor are dissolving eliminated by use of such as mineral acid and organic acid, or ion-exchanging eliminated by being contacted with cationic ion-exchange resin.

Herein, a porous particle precursor prepared in the first process is a particle having a network structure in which silica and an inorganic compound element bond via oxygen. In this manner, by eliminating inorganic compounds (elements other than silica and oxygen) from a porous particle precursor, porous particles, which are more porous and have a large pore volume, can be prepared. Further, hollow particles can be prepared by increasing the elimination amount of inorganic compound (elements other than silica and oxygen) from a porous particle precursor.

Further, in advance to elimination of inorganic compounds other than silica from a porous particle precursor, it is preferable to form a silica protective film by adding a silicic acid solution which contains a silane compound having a fluorine substituted alkyl group, and is prepared by dealkalization of alkali metal salt of silica; or a hydrolyzable organosilicon compound, in a porous particle precursor dispersion prepared in the first process. The thickness of a silica protective film is 0.5-15 nm. Herein, even when a silica protective film is formed, since the protective film in this process is porous and has a thin thickness, it is possible to eliminate the aforesaid inorganic compounds other than silica from a porous particle precursor.

By forming such a silica protective film, the aforesaid inorganic compounds other than silica can be eliminated from a porous particle precursor while keeping the particle shape as it is. Further, at the time of forming a silica cover layer described later, the pore of porous particles is not blocked by a cover layer, and thereby the silica cover layer described later can be formed without decreasing the pore volume. Herein, when the amount of inorganic compound to be eliminated is small, it is not necessary to form a protective film because the particles will never be broken.

Further, in the case of preparation of hollow particles, it is preferable to form this silica protective film. At the time of preparation of hollow particles, a hollow particle precursor, which is comprised of a silica protective film, a solvent and insoluble porous solid within said silica protective film, is obtained when inorganic compounds are eliminated, and hollow particles are formed, by making a particle wall from a formed cover layer, when the cover layer described later is formed on said hollow particle precursor.

The amount of a silica source added to form the aforesaid silica protective film is preferably in a range to maintain the particle shape. When the amount of a silica source is excessively large, it may become difficult to eliminate inorganic compounds other than silica from a porous particle precursor because a silica protective film becomes excessively thick. As a hydrolizable organosilicon compound utilized to form a silica protective film, alkoxysilane represented by formula $R_n Si(OR')_{4-n}$ [R, R': a hydrocarbon group such as an alkyl group, an aryl group, a vinyl group and an acryl group; n=0, 1, 2 or 3] can be utilized. Fluorine-substituted tetraalkoxysilane, such as tetramethoxysilane, tetraethoxysilane and tetraisopropoxysilane, is specifically preferably utilized.

As an addition method, a solution, in which a small amount of alkali or acid as a catalyst is added into a mixed solution of these alkoxysilane, pure water and alcohol, is added into the aforesaid dispersion of porous particles, and silicic acid polymer formed by hydrolysis of alkoxysilane is precipitated on the surface of inorganic oxide particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of a porous particle precursor is water alone or has a high ratio of water to an organic solvent, it is also possible to form a silica protective film by use of a silicic acid solution. In the case of utilizing a silicic acid solution, a predetermined amount of a silicic acid solution is added into the dispersion and alkali is added simultaneously, to precipitate silicic acid solution on the porous particle surface. Herein, a silica protective film may also be formed by utilizing a silicic acid solution and the aforesaid alkoxysilane in combination.

Third Process: Formation of Silica Cover Layer

In the third process, by addition of such as a hydrolyzable organosilicon compound containing a silane compound provided with a fluorine substituted alkyl group, or a silicic acid solution, into a porous particle dispersion (into a hollow particle dispersion in the case of hollow particles), which is prepared in the second process, the surface of particles is covered with a polymer substance of such as a hydrolyzable organosilicon compound or a silicic acid solution to form a silica cover layer.

As a hydrolyzable organosilicon compound utilized for formation of a silica cover layer, alkoxysilane represented by formula $R_n Si(OR')_{4-n}$ [R, R': a hydrocarbon group such as an alkyl group, an aryl group, a vinyl group and an acryl group; n=0, 1, 2 or 3], as described before, can be utilized. Tetraalkoxysilane such as tetramethoxysilane, tetraethoxysilane and tetraisopropoxysilane are specifically preferably utilized.

As an addition method, a solution, in which a small amount of alkali or acid as a catalyst is added into a mixed solution of these alkoxysilane, pure water and alcohol, is added into the aforesaid dispersion of porous particles (a hollow particle precursor in the case of hollow particles), and silicic acid polymer formed by hydrolysis of alkoxysilane is precipitated on the surface of porous particles (a hollow particle precursor in the case of hollow particles). At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of porous particles (a hollow particle precursor in the case of hollow particles) is water alone or a mixed solution of water with an organic solvent having a high ratio of water to an organic solvent, it is also possible to form a cover layer by use of a silicic acid solution. A silicic acid solution is an aqueous solution of lower polymer of silicic acid which is formed by ion-exchange and dealkalization of an aqueous solution of alkali metal silicate such as water glass.

A silicic acid solution is added into a dispersion of porous particles (a hollow particle precursor in the case of hollow particles), and alkali is simultaneously added to precipitate silicic acid lower polymer on the surface of porous particles (a hollow particle precursor in the case of hollow particles). Herein, silicic acid solution may be also utilized in combination with the aforesaid alkoxysilane to form a cover layer. The addition amount of an organosilicon compound or a silicic acid solution, which is utilized for cover layer formation, is as much as to sufficiently cover the surface of colloidal particles and the solution is added into a dispersion of porous particles (a hollow particle precursor in the case of hollow particles) at an amount to make a thickness of the finally obtained silica cover layer of 1-20 nm. Further, in the case that the aforesaid silica protective film is formed, an organosilicon compound or a silicic acid solution is added at an amount to make a thickness of the total of a silica protective film and a silica cover layer of 1-20 nm.

Next, a dispersion of particles provided with a cover layer is subjected to a thermal treatment. By a thermal treatment, in the case of porous particles, a silica cover layer, which covers the surface of porous particles, becomes minute to prepare a dispersion of complex particles comprising porous particles covered with a silica cover layer. Further, in the case of a hollow particle precursor, the formed cover layer becomes minute to form a hollow particle wall, whereby a dispersion of hollow particles provided with a hollow, the interior of which is filled with a solvent, a gas or a porous solid, is prepared.

Thermal treatment temperature at this time is not specifically limited provided being so as to block micro-pores of a silica cover layer, and is preferably in a range of 80-300° C. At a thermal treatment temperature of lower than 80° C., a silica cover layer may not become minute to completely block the micro-pores or the treatment time may become long. Further, when a prolonged treatment at a thermal treatment temperature of higher than 300° C. is performed, particles may become minute and an effect of a low refractive index may not be obtained.

A refractive index of inorganic particles prepared in this manner is as low as 1.44. It is estimated that the refractive index becomes low because such inorganic particles maintain porous property in the interior of porous particles or the interior is hollow.

As a binder matrix for the low refractive index layer, a fluorine containing resin fluororesin (hereinafter, it may be referred as "fluorine containing resin fluororesin before cross linkage") which crosslinking undergoes by heat or ionizing radiation may be used preferably.

Preferably listed as fluorine containing resins prior to coating are fluorine containing copolymers which are formed employing fluorine containing vinyl monomers and crosslinking group providing monomers. Listed as specific examples of the above fluorine containing vinyl monomer units are fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). JP-A Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

Further, employed as a fluorine containing resins prior to coating may be fluorine containing copolymers which are prepared by employing the above monomers with fluorine containing vinyl monomers, and monomers other than monomers to provide a crosslinking group in addition to the above monomers. Monomers capable being simultaneously employed are not particularly limited. Those examples include olefins (ethylene, propylene, isoprene, vinyl chloride, and vinylidene chloride); acrylates (methyl acrylate, ethyl acrylate, and 2-ethylhexyl acrylate); methacrylates (methyl methacrylate, ethyl methacrylate, butyl methacrylate, and ethylene glycol dimethacrylate); styrene derivatives (styrene, divinylbenzene, vinyltoluene, and α-methylstyrene); vinyl ethers (methyl vinyl ether); vinyl esters (vinyl acetate, vinyl propionate, and vinyl cinnamate); acrylamides (N-tert-butylacrylamide and N-cyclohexylacrylamide); methacrylamides; and acrylonitrile derivatives. Further, in order to provide desired lubricating properties and antistaining properties, it is also preferable to introduce a polyorganosiloxane skeleton or a perfluoropolyether skeleton into fluorine containing copolymers. The above introduction is performed, for example, by polymerization of the above monomers with polyorganosiloxane and perfluoroether having, at the end, an acryl group, a methacryl group, a vinyl ether group, or a styryl group and reaction of polyorganosiloxane and perfluoropolyether having a functional group.

The used ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

It is possible to obtain the fluorine containing copolymers by polymerizing these monomers employing methods such as a solution polymerization method, a block polymerization method, an emulsion polymerization method or a suspension polymerization method.

The fluorine containing resins prior to coating are commercially available and it is possible to employ commercially available products. Listed as examples of the fluorine containing resins prior to coating are SAITOP (produced by Asahi Glass Co., Ltd.), TEFLON (a registered trade name) AD (produced by Du Pont), vinylidene polyfluoride, RUMIFRON (produced by Asahi Glass Co., Ltd.), and OPSTAR (produced by JSR).

The dynamic friction coefficient and contact angle to water of the low refractive index layer composed of crosslinked fluorine containing resins are in the range of 0.03-0.15 and in the range of 90-120 degrees, respectively.

The low refractive-index layer making the crosslinked fluoroine containing resin as its constituent may contains the above-mentioned inorganic particles.

Moreover, as a binder matrix for other low refractive-index layers, various kinds of sol gel components can also be used. As the sol gel components, a metal alcoholate (alcoholate, such as silane, titanium, aluminum, and zirconium), organo alkoxy metallic compound, and its hydrolyzate can be used. In particular, alkoxy silane, organo alkoxy silane, and its hydrolyzate are desirable.

As these examples, tetra-alkoxy silane (tetramethoxysilane, tetraethoxysilane, etc.), alkyl tri alkoxy silane (methyltrimethoxysilane, ethyltrimethoxysilane, etc.), aryltrialkoxy silane (phenyltrimethoxsilane etc.), dialkyldialkoxy silane, diaryldialkoxy silane, etc. are may be listed. Moreover, organoalkoxy silane having various functional groups (vinyl tri alkoxy silane, methylVinydialkoxy silane, γ-glycidyloxypropyltrialkoxy silane, γ-glycidyloxypropylmethyldialkoxy silane, β-(3,4-epoxycyclohexyl) ethyltrialkoxy silane, γ-methacryloyloxypropyltrialkoxy silane, γ-aminopropyl tri alkoxy silane, γ-mercaptopropyl tri alkoxy silane, γ-chloropropyltrialkoxy silane, etc.), perfluoroalkyl group containing silane compound (for example, (heptadeca fluoro-1,1 and 2,2-tetradecyl)triethoxysilane, 3,3, and 3-trifluoropropyltrimethoxysilane etc.), fluoroalkylether group containing silane compound may be preferably used. Especially, to use fluorine containing silane compound is preferable in making a kayer to be low refractive index and in providing water repelling property and oil repelling property.

It is preferable that the low refractive index layer incorporates polymers in an amount of 5-50 percent by weight. The above polymers exhibit functions such that minute particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of minute particles employing polymers, it is preferable that (1) polymers are combined with surface processing agents of minute particles, (2) a polymer shell is formed around a minute particle used as a core, or (3) polymers are employed as a binder among minute particles. The polymers which are combined with the surface processing agents in (1) are preferably the shell polymers of (2) or binder polymers of (3). It is preferable that the polymers of (2) are formed around the minute particles employing a polymerization reaction prior to preparation of the low refractive index layer liquid coating composition. It is preferable that the polymers of (3) are formed employing a polymerization reaction during or after coating of the low refractive index layer while adding their monomers to the above low refractive index layer coating composition. It is preferable that at least two of (1), (2), and (3) or all are combined and employed. Of these, it is particularly preferable to practice the combination of (1) and (3) or the combination of (1), (2), and (3). (1) surface treatment, (2) shell, and (3) binder will now successively be described in that order.

(1) Surface Treatments

It is preferable that minute particles (especially, minute inorganic particles) are subjected to a surface treatment to improve affinity with polymers. These surface treatments are classified into a physical surface treatment such as a plasma discharge treatment or a corona discharge treatment and a chemical surface treatment employing coupling agents. It is preferable that the chemical surface treatment is only performed or the physical surface treatment and the chemical surface treatment are performed in combination. Preferably employed as coupling agents are organoalkoxymetal compounds (for example, titanium coupling agents and silane coupling agents). In cases in which minute particles are composed of $SiO_2$, it is possible to particularly effectively affect a surface treatment employing the silane coupling agents. As specific examples of the silane coupling agents, preferably employed are those listed above.

The surface treatment employing the coupling agents is achieved in such a manner that coupling agents are added to a minute particle dispersion and the resulting mixture is allowed to stand at room temperature—60° C. for several hours—10 days. In order to accelerate a surface treatment reaction, added to a dispersion may be inorganic acids (for example, sulfuric acid, hydrochloric acid, nitric acid, chromic acid, hypochloric acid, boric acid, orthosilicic acid, phosphoric acid, and carbonic acid), or salts thereof (for example, metal salts and ammonium salts).

(2) Shell

Shell forming polymers are preferably polymers having a saturated hydrocarbon as a main chain. Polymers incorporating fluorine atoms in the main chain or the side chain are preferred, while polymers incorporating fluorine atoms in the side chain are more preferred. Acrylates or methacrylates are preferred and esters of fluorine-substituted alcohol with polyacrylic acid or methacrylic acid are most preferred. The refractive index of shell polymers decreases as the content of fluorine atoms in the polymer increases. In order to lower the refractive index of a low refractive index layer, the shell polymers incorporate fluorine atoms in an amount of preferably 35-80 percent by weight, but more preferably 45-75 percent by weight. It is preferable that fluorine containing polymers are synthesized via the polymerization reaction of fluorine atom containing ethylenic unsaturated monomers. Listed as examples of fluorine atom containing ethylenic unsaturated monomers are fluoroolefins (for example, fluoroethylene, vinylidene fluoride, tetrafluoroethylene, hexafluoropropylene, perfluoro-2, -dimethyl-1,3-dixol), fluorinated vinyl ethers and esters of fluorine substituted alcohol with acrylic acid or methacrylic acid.

Polymers to form the shell may be copolymers having repeating units with and without fluorine atoms. It is preferable that the units without fluorine atoms are prepared employing the polymerization reaction of ethylenic unsaturated monomers without fluorine atoms. Listed as examples of ethylenic unsaturated monomers without fluorine atoms are olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, butyl methacrylate, and ethylene glycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tetrabutylacrylamide and N-cyclohexylacrylamide), as well as methacrylamide and acrylonitrile.

In the case of (3) in which binder polymers described below are simultaneously used, a crosslinking functional group may be introduced into shell polymers and the shell polymers and binder polymers are chemically bonded via crosslinking. Shell polymers may be crystalline. When the glass transition temperature (Tg) of the shell polymer is higher than the temperate during the formation of a low refractive index layer, micro-voids in the low refractive index layer are easily maintained. However, when Tg is higher than the temperature during formation of the low refractive index layer, minute particles are not fused and occasionally, the resulting low refractive index layer is not formed as a continuous layer (resulting in a decrease in strength). In such a case, it is desirous that the low refractive index layer is formed as a continuous layer simultaneously employing the binder polymers of (3). A polymer shell is formed around the minute particle, whereby a minute core/shell particle is obtained. A core composed of a minute inorganic particle is incorporated preferably 5-90 percent by volume in the minute core/shell particle, but more preferably 15-80 percent by volume. At least two types of minute core/shell particle may be simultaneously employed. Further, inorganic particles without a shell and core/shell particles may be simultaneously employed.

(3) Binders

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenic unsaturated monomers. In order to prepare crosslinked binder polymers, it is preferable to employ monomers having at least two ethylenic unsaturated groups. Listed as examples of monomers having at least two ethylenic unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides. It is preferable that polymers having polyether as a main chain are synthesized employing a ring opening polymerization reaction. A crosslinking structure may be introduced into binder polymers employing a reaction of crosslinking group instead of or in addition to monomers having at least two ethylenic unsaturated groups. Listed as examples of the crosslinking functional groups are an isocyanate group, an epoxy group, an aziridine group, an oxazoline group, an aldehyde group, a carbonyl group, a hydrazine group, a carboxyl group, a methylol group, and an active methylene group. It is possible to use, as a monomer to introduce a crosslinking structure, vinylsulfonic acid, acid anhydrides, cyanoacrylate derivatives, melamine, ether modified methylol, esters and urethane. Functional groups such as a block isocyanate group, which exhibit crosslinking properties as a result of the decomposition reaction, may be employed. The crosslinking groups are not limited to the above compounds and include those which become reactive as a result of decomposition of the above functional group. Employed as polymerization initiators used for the polymerization reaction and crosslinking reaction of binder polymers are heat polymerization initiators and photopolymerization initiators, but the photopolymerization initiators are more preferred. Examples of photopolymerization initiators include acetophenones, benzoins, benzophenones, phosphine oxides, ketals, antharaquinones, thioxanthones, azo compounds, peroxides, 2,3-dialkyldiones, disulfide compounds, fluoroamine compounds, and aromatic sulfoniums. Examples of acetophenones include 2,2-diethoxyacetophenone, p-dimethylacetophenone, 1-hydroxydimethyl phenyl ketone, 1-dihydroxycyclohexyl phenyl ketone, 2-methyl-4-methylthio-2-morpholinopropiophene, and 2-benzyl-2-dimethylamino-1-(4 morpholinophenyl)-butanone. Examples of benzoins include benzoin ethyl ether and benzoin isopropyl ether. Examples of benzophenones include benzophenone, 2,4-dichlorobenzophenone, 4,4-dichlorobenzophenone, and p-chlorobenzophenone. An example of phosphine oxides includes 2,4,6-trimethylbenzoyldiphenylphosphine oxide.

It is preferable that binder polymers are formed in such a manner that monomers are added to a low refractive index layer liquid coating composition and the binder polymers are formed during or after coating of the low refractive index layer utilizing a polymerization reaction (if desired, further crosslinking reaction). A small amount of polymers (for example, polyvinyl alcohol, polyoxyethylene, polymethyl methacrylate, polymethyl acrylate, diacetyl cellulose, triacetyl cellulose, nitrocellulose, polyester, and alkyd resins) may be added to the low refractive index layer liquid coating composition.

Further, it is preferable to add slipping agents to the low refractive index layer or other refractive index layers. By providing desired slipping properties, it is possible to improve abrasion resistance. Preferably employed as slipping agents are silicone oil and wax materials. For example, preferred are the compounds represented by the formula below.

$$R_1COR_2 \qquad \text{Formula}$$

In the above formula, $R_1$ represents a saturated or unsaturated aliphatic hydrocarbon group hang at least 12 carbon atoms, while $R_1$ is preferably an alkyl group or an alkenyl group but is more preferably an alkyl group or an alkenyl group having at least 16 carbon atoms. $R_2$ represents —$OM_1$ group ($M_1$ represents an alkaline metal such as Na or K), —OH group, —$NH_2$ group, or —$OR_3$ group ($R_3$ represents a saturated or unsaturated aliphatic hydrocarbon group having at least 12 carbon atoms and is preferably an alkyl group or an alkenyl group). $R_2$ is preferably —OH group, —$NH_2$ group or —$OR_3$ group. In practice, preferably employed may be higher fatty acids or derivatives thereof such as behenic acid, stearic acid amide, or pentacosanoic acid or derivatives thereof and natural products such as carnauba wax, beeswax, or montan wax, which incorporate a large amount of such components. Further listed may be polyorganosiloxane disclosed in Japanese Patent Publication No. 53-292, higher fatty acid amides discloses in U.S. Pat. No. 4,275,146, higher fatty acid esters (esters of a fatty acid having 10-24 carbon atoms and alcohol having 10-24 carbon atoms) disclosed in Japanese Patent Publication No. 58-35341, British Patent No. 927,446, or JP-A Nos. 55-126238 and 58-90633, higher fatty acid metal salts disclosed in U.S. Pat. No. 3,933,516, polyester compounds composed of dicarboxylic acid having at least 10 carbon atoms and aliphatic or alicyclic diol disclosed in JP-A No. 51-37217, and oligopolyesters composed of dicarboxylic acid and diol disclosed in JP-A No. 7-13292.

For example, the added amount of slipping agents employed in the low refractive index layer is preferably 0.01-10 $mg/m_2$.

In the present invention, it may be preferable to provide a high refractive index layer or an intermediate refractive index layer between the low refractive index layer and the active ray curable resin layer.

It is preferable that the medium and high refractive index layers in the present invention are formed in such a manner that a liquid coating composition incorporating monomers or oligomers of organic titanium compounds represented by Formula (14) below, or hydrolyzed products thereof are coated and subsequently dried, and the resulting refractive index is 1.55-2.5.

Formula (14)

wherein $R^1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinking structure via reaction such as —Ti—O—Ti, whereby a cured layer is formed.

Listed as preferred examples of monomers and oligomers of organic titanium compounds employed in the present invention are dimers—decamers of $Ti(OCH_3)_4$, $Ti(OC_2H_5)_4$, $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$, and dimers—decamers of $Ti(O\text{-}n\text{-}C_4H_9)_4$. These may be employed individually or in combinations of at least two types. Of these, particularly preferred are dimers—decamers of $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$.

In the course of preparation of the medium and high refractive index layer liquid coating compositions in the present invention, it is preferable that the above organic titanium compounds are added to the solution into which water and organic solvents, described below, have been successively added. In cases in which water is added later, hydrolysis/polymerization is not uniformly performed, whereby cloudiness is generated or the layer strength is lowered. It is preferable that after adding water and organic solvents, the resulting mixture is vigorously stirred to enhance mixing and dissolution has been completed.

Further, an alternative method is employed. A preferred embodiment is that organic titanium compounds and organic solvents are blended, and the resulting mixed solution is added to the above solution which is prepared by stirring the mixture of water and organic solvents.

Further, the amount of water is preferably in the range of 0.25-3 mol per mol of the organic titanium compounds. When the amount of water is less than 0.25 mol, hydrolysis and polymerization are not sufficiently performed, whereby layer strength is lowered, while when it exceeds 3 mol, hydrolysis and polymerization are excessively performed, and coarse $TiO_2$ particles are formed to result in cloudiness. Accordingly, it is necessary to control the amount of water within the above range.

Further, the content of water is preferably less than 10 percent by weight with respect to the total liquid coating composition. When the content of water exceeds 10 percent by weight with respect to the total liquid coating composition, stability during standing of the liquid coating composition is degraded to result in cloudiness. Therefore, it is not preferable.

Organic solvents employed in the present invention are preferably water-compatible. Preferred as water-compatible solvents are, for example, alcohols (for example, methanol, ethanol, propanol, isopropanol, butanol, isobutanol, secondary butanol, tertiary butanol, pentanol, hexanol, cyclohexanol, and benzyl alcohol; polyhydric alcohols (for example, ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, and thioglycol); polyhydric alcohol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether, and propylene glycol monophenyl ether); amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamthyldiethylenetriamine, and tetramethylpropylenediamine); amides (for example, formamide, N,N-dimethylfromamide, and N,N-dimethylacetamide); heterocycles (for example, 2-pyrrolidone, N-methyl-2-pyrrolidone, cyclohexylpyrrolidone, 2-oxazolidone, 1,3-dimethyl-2-imidazolidinone); and sulfoxides (for example, dimethylsulfoxide); sulfones (for example, sulfolane); as well as urea, acetonitrile, and acetone. Of these, particularly preferred are alcohols, polyhydric alcohols, and polyhydric alcohol ethers. As noted above, the used amount of these organic solvents may be controlled so that the content of water is less than 10 percent by weight with respect to the total liquid coating composition by controlling the total used amount of water and the organic solvents.

The content of monomers and oligomers of organic titanium compounds employed in the present invention, as well as hydrolyzed products thereof is preferably 50.0-98.0 percent by weight with respect to solids incorporated in the liquid coating composition. The solid ratio is more preferably 50-90 percent by weight, but is still more preferably 55-90 percent by weight. Other than these, it is preferable to incorporate polymers of organic titanium compounds (which are subjected to hydrolysis followed by crosslinking) in a liquid coating composition, or to incorporate minute titanium oxide particles.

The high refractive index and medium refractive index layers in the present invention may incorporate metal oxide particles as minute particles and further may incorporate binder polymers.

In the above method of preparing liquid coating compositions, when hydrolyzed/polymerized organic titanium compounds and metal oxide particles are combined, both strongly adhere to each other, whereby it is possible to obtain a strong coating layer provided with hardness and uniform layer flexibility.

The refractive index of metal oxide particles employed in the high and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter of at most 20-30 nm are determined employing electron microscope images. The specific surface area of metal oxide particles is preferably 10-400 m$^2$/g as a value determined employing the BET method, is more preferably 20-200 m$^2$/g, but is most preferably 30-150 m$^2$/g.

Examples of metal oxide particles are metal oxides incorporating at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals. Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltriethoxysilane, N-β-(aminoethyl)-γ-aminopropyltrimethoxysilane, and β-cyanoethyltriethoxysilane.

Further, examples of silane coupling agents having an alkyl group of 2-substitution for silicon include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropyldiethoxysilane, methylvinyldimethoxysilane, and methylvinyldiethoxysilane.

Of these, preferred are vinyltrimethoxysilane, vinyltriethoxysilane, vinylacetoxysilane, vinyltrimethoxethoxyysilane, γ-acryloyloxypropylmethoxysilane, and γ-methacryloyloxypropylmethoxysilane which have a double bond in the molecule, as well as γ-acryloyloxypropylmethyldimethoxysilane, γ-acryloyloxypropyldiethoxysilane, γ-methacryloyloxypropylmethyldimethoxysilane, γ-methacryloyloxypropylmethyldiethjoxysilane, methylvinyldimethoxysilane, and methylvinyldiethaoxysilane which have an alkyl group having 2-substitution to silicon. Of these, particularly preferred are γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane, and γ-methacryloyloxypropylmethyldiethoxysilane.

At least two types of coupling agents may simultaneously be employed. In addition to the above silane coupling agents, other silane coupling agents may be employed. Listed as other silane coupling agents are alkyl esters of ortho-silicic acid (for example, methyl orthosilicate, ethyl orthosilicate, n-propyl orthosilicate, i-propyl orthosilicate, n-butyl orthosilicate, sec-butyl orthosilicate, and t-butyl orthosilicate) and hydrolyzed products thereof.

It is possible to practice a surface treatment employing coupling agents in such a manner that coupling agents are added to a minute particle dispersion and the resulting dispersion is allowed to stand at room temperature—60° C. for several hours—10 days. In order to promote the surface treatment reaction, added to the above dispersion may be inorganic acids (for example, sulfuric acid, hydrochloric acid, nitric acid, chromic acid, hypochlorous acid, boric acid, orthosilicic acid, phosphoric acid, and carbonic acid), and organic acids (for example, acetic acid, polyacrylic acid, benzenesulfonic acid, phenol, and polyglutamic acid), or salts thereof (for example, metal salts and ammonium salts).

It is preferable that these coupling agents have been hydrolyzed employing water in a necessary amount. When the silane coupling agent is hydrolyzed, the resulting coupling agent easily react with the above organic titanium compounds and the surface of metal oxide particles, whereby a stronger layer is formed. Further, it is preferable to previously incorporate hydrolyzed silane coupling agents into a liquid coating composition. It is possible to use the water employed for hydrolysis to perform hydrolysis/polymerization of organic titanium compounds.

In the present invention, a treatment may be performed by combining at least two types of surface treatments. It is preferable that the shape of metal oxide particles is rice grain-shaped, spherical, cubic, spindle-shaped, or irregular. At least two types of metal oxide particles may be employed in the high refractive index layer and the medium refractive index layer.

The content of metal oxide particles in the high refractive index and medium refractive index layers is preferably 5-65 percent by volume, is more preferably 10-60 percent by volume, but is still more preferably 20-55 percent by volume. In cases in which minute particles are incorporated, the ratio of monomers or oligomers of the above organic titanium compounds or hydrolyzed products thereof is commonly 1-50 percent by weight with solids incorporated in the liquid coating composition, is preferably 1-40 percent by weight, but is more preferably 1-30 percent by weight.

The above metal oxide particles are dispersed into a medium and fed to liquid coasting compositions to form a high refractive index layer and a medium refractive index layer. Preferably employed as dispersion medium of metal oxide particles is a liquid at a boiling point of 60-170° C. Specific examples of dispersion media include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate and butyl formate), aliphatic hydrocarbons (for example, hexane and cyclohexanone), halogenated hydrocarbons (for example, methylene chloride, chloroform, and carbon tetrachloride), aromatic hydrocarbons (for example, benzene, toluene, and xylene), amides (for example, dimethylformamide, diethylacetamide, and n-methylpyrrolidone), ethers (for example, diethyl ether, dioxane, and tetrahydrofuran), and ether alcohols (for example, 1-methoxy-2-propanol). Of these, particularly preferred are toluene, xylene, methyl ethyl ketone, methyl isobutyl ketone, cyclohexane and butanol.

Further, it is possible to disperse metal oxide particles into a medium employing a homogenizer. Listed as examples of homogenizers are a sand grinder mill (for example, a bead mill with pins), a high speed impeller mill, a pebble mill, a roller mill, an attritor, and a colloid mill. Of these, particularly preferred are the sand grinder and the high speed impeller mill. Preliminary dispersion may be performed. Listed as examples which are used for the preliminary dispersion are a ball mill, a three-roller mill, a kneader, and an extruder.

It is preferable to employ polymers having a crosslinking structure (hereinafter referred to as a crosslinking polymer) as a binder polymer in the high refractive index and medium refractive index layers. Listed as examples of the crosslinking polymers are crosslinking products (hereinafter referred to as polyolefin) such as polymers having a saturated hydrocarbon chain such as polyolefin, polyether, polyurea, polyurethane, polyester, polyamine, polyamide, or melamine resins. Of these, crosslinking products of polyolefin, polyether, and polyurethane are preferred, crosslinking products of polyolefin and polyether are more preferred, and crosslinking products of polyolefin are most preferred. Further, it is more preferable that crosslinking polymers have an anionic group. The anionic group exhibits a function to maintain the dispersion state of minute inorganic particles and the crosslinking structure exhibits a function to strengthen layers by providing a polymer with layer forming capability. The above anionic group may directly bond to a polymer chain or may bond to a polymer chain via a linking group. However, it is preferable that the anionic group bonds to the main chain via a linking group as a side chain.

Listed as examples of the anionic group are a carboxylic acid group (carboxyl), a sulfonic acid group (sulfo), and phosphoric acid group (phsphono). Of these, preferred are the sulfonic acid group and the phosphoric acid group. Herein, the anionic group may be in the form of its salts. Cations which form salts with the anionic group are preferably alkali metal ions. Further, protons of the anionic group may be dissociated. The linking group which bond the anionic group with a polymer chain is preferably a bivalent group selected from the group consisting of —CO—, —O—, an alkylene group, and an arylene group, and combinations thereof. Crosslinking polymers which are binder polymers are preferably copolymers having repeating units having an anionic group and repeating units having a crosslinking structure. In this case, the ratio of the repeating units having an anionic group in copolymers is preferably 2-96 percent by weight, is more preferably 4-94 percent by weight, but is most preferably 6-92 percent by weight. The repeating unit may have at least two anionic groups.

In crosslinking polymers having an anionic group, other repeating units (an anionic group is also a repeating unit having no crosslinking structure) may be incorporated. Preferred as other repeating units are repeating units having an amino group or a quaternary ammonium group and repeating units having a benzene ring. The amino group or quaternary ammonium group exhibits a function to maintain a dispersion state of minute inorganic particles. The benzene ring exhibits a function to increase the refractive index of the high refractive index layer. Incidentally, even though the amino group, quaternary ammonium group and benzene ring are incorporated in the repeating units having an anionic group and the repeating units having a crosslinking structure, identical effects are achieved.

In crosslinking polymers incorporating as a constituting unit the above repeating units having an amino group or a quaternary ammonium group, the amino group or quaternary ammonium group may directly bond to a polymer chain or may bond to a polymer chain via a side chain. But the latter is preferred. The amino group or quaternary ammonium group is preferably a secondary amino group, a tertiary amino group or a quaternary ammonium group, but is more preferably a tertiary amino group or a quaternary ammonium group. A group bonded to the nitrogen atom of a secondary amino group, a tertiary amino group or a quaternary ammonium group is preferably an alkyl group, is more preferably an alkyl group having 1-12 carbon atoms, but is still more preferably an alkyl group having 1-6 carbon atoms. The counter ion of the quaternary ammonium group is preferably a halide ion. The linking group which links an amino group or a quaternary ammonium group with a polymer chain is preferably a bivalent group selected from the group consisting of —CO—, —NH—, —O—, an alkylene group and an arylene group, or combinations thereof. In cases in which the crosslinking polymers incorporate repeating units having an amino group or an quaternary ammonium group, the ratio is preferably 0.06-32 percent by weight, is more preferably 0.08-30 percent by weight, but is most preferably 0.1-28 percent t by weight.

It is preferable that high and medium refractive index layer liquid coating compositions composed of monomers to form crosslinking polymers are prepared and crosslinking polymers are formed via polymerization reaction during or after coating of the above liquid coating compositions. Each layer is formed along with the formation of crosslinking polymers. Monomers having an anionic group function as a dispersing agent of minute inorganic particles in the liquid coating compositions. The used amount of monomers having an anionic group is preferably 1-50 percent by weight with respect to the minute inorganic particles, is more preferably 5-40 percent by weight, but is still more preferably 10-30 percent by weight. Further, monomers having an amino group or a quaternary ammonium group function as a dispersing aid in the liquid coating compositions. The used amount of monomers having an amino group or a quaternary ammonium group is preferably 3-33 percent by weight with respect to the monomers having an anionic group. By employing a method in which crosslinking polymers are formed during or after coating of a liquid coating composition, it is possible to allow these monomers to effectively function prior to coating of the liquid coating compositions.

Most preferred as monomers employed in the present invention are those having at least two ethylenic unsaturated groups. Listed as those examples are esters of polyhydric alcohols and (meth)acrylic acid (for example, ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol (meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene, 4-vinyl-benzoic acid-2-acryloylethyl ester, and 1,4-divinylcyclohexane); vinylsulfones (for example, divinylsulfone); acrylamides (for example, methylenebisacrylamide); and methacrylamides. Commercially available monomers having an anionic group and monomers having an amino group or a quaternary ammonium group may be employed. Listed as commercially available monomers having an anionic group which are preferably employed are KAYAMAR PM-21 and PM-2 (both produced by Nihon Kayaku Co., Ltd.); ANTOX MS-60, MS-2N, and MS-NH4 (all produced by Nippon Nyukazai Co., Ltd.), ARONIX M-5000, M-6000, and M-8000 SERIES (all produced by Toagosei Chemical Industry Co., Ltd.); BISCOAT #2000 SERIES (produced by Osaka Organic Chemical Industry Ltd.); NEW FRONTIER GX-8289 (produced by Dai-ichi Kogyo Seiyaku Co., Ltd.); NK ESTER CB-1 and A-SA (produced by Shin-Nakamura Chemical Co., Ltd.); and AR-100, MR-100, and MR-200 (produced by Diahachi Chemical Industry Co., Ltd.). Listed as commercially available monomers having an amino group or a quaternary ammonium group which are preferably employed are DMAA (produced by Osaka Organic Chemical Industry Ltd.); DMAEA and DMAPAA (produced by Kojin Co., Ltd.); BLENMER QA (produced by NOF Corp.), and NEW FRONTIER C-1615 (produced by Dia-ichi Kogyo Seiyaku Co., Ltd.).

It is possible to perform polymer polymerization reaction employing a photopolymerization reaction or a thermal polymerization reaction. The photopolymerization reaction is particularly preferred. It is preferable to employ polymerization initiators to perform the polymerization reaction. For example, listed are thermal polymerization initiators and photopolymerization imitators described below which are employed to form binder polymers of the hard coating layer.

Employed as the polymerization initiators may be commercially available ones. In addition to the polymerization initiators, employed may be polymerization promoters. The added amount of polymerization initiators and polymerization promoters is preferably in the range of 0.2-10 percent by weight of the total monomers. Polymerization of monomers (or oligomers) may be promoted by heating a liquid coating composition (being an inorganic particle dispersion incorporating monomers). Further, after the photopolymerization reaction after coating, the resulting coating is heated whereby the formed polymer may undergo additional heat curing reaction.

It is preferable to use relatively high refractive index polymers in the medium and high refractive index layers. Listed as examples of polymers exhibiting a high refractive index are polystyrene, styrene copolymers, polycarbonates, melamine resins, phenol resins, epoxy resins, and urethanes which are obtained by allowing cyclic (alicyclic or aromatic) isocyanates to react with polyols. It is also possible to use polymers having another cyclic (aromatic, heterocyclic, and alicyclic) group and polymers having a halogen atom other than fluorine as a substituent due to their high refractive index.

It is possible to form each layer of the antireflection films employing coating methods such as a dip coating method, an air-knife coating method, a curtain coating method, a roller coating method, a wire bar coating method, a gravure coating method, or an extrusion coating method.

(Polarizing Plate)

A polarizing plate of the present invention will be described below.

A polarizing plate of the present invention can be produced by an ordinary method. It is preferable that the rear surface side of a hard coat film of the present invention is subjected to alkaline saponification processing, and then the processed hard coat film is stuck to at least one surface of a polarizing film produced by immersion expansion in iodine solution with complete saponification polyvinyl alcohol solution. The other surface of the polarizing film may also be pasted with this hard coat film or it may be pasted with another polarizing plate protection film. In this case, while one surface is pasted with a hard coat film of the present invention, the polarizing plate protection film applied to the other surface preferably has a phase difference of an in-plane retardation $R_0$ ranging from 20 to 70 nm and a retardation in the thickness direction $R_t$ ranging from 100 to 400 nm, measured at 590 nm. Such a film can be produced by a method disclosed in JP-A 2002-71957 or Japanese Patent Application No. 2002-155395. Further, preferably used is a polarizing plate protection film that serves also as an optical compensation film having an optically anisotropic layer formed by aligning a liquid crystal compound such as discotic liquid crystals. For example, an optically anisotropic layer can be formed by a method disclosed in JP-A 2003-98348. Utilizing a combination of such a polarizing plate protection film and the hard coat film of the present invention gives a polarizing plate which is excellent in flatness and has a stable effect of enlarging a viewing angle.

A polarizing film, which is a prime element that constructs a polarizing plate, is a device that transmits only light in one certain direction through a polarizing face. Typical polarizing films currently known are polyvinyl alcohol type polarizing films, which include those dyed with iodine and those dyed with a dichromatic dye. Currently used polarizing films are produced in such a way that a polyvinyl alcohol solution is formed into a film, then, the film is uniaxially stretched and then dyed, or the formed film is dyed first and then uniaxially stretched. Thereafter, the film is preferably subjected to durability processing with a boron compound. One surface of the hard coat film of the present invention is stuck on the surface of the polarizing film to form a polarizing plate, preferably with a water type adhesive primarily composed of completely saponified polyvinyl alcohol etc.

Polarizing plates using a conventional hard coat film were poor in terms of flatness, and an image reflected therefrom showed minute wavy irregularities, wherein pencil hardness grade was only 2H or so, and the wavy irregularities was increased in a durability test under the conditions of 60° C. and 90% RH. On the other hand, a polarizing plate with the use of a hard coat film of the present invention had high flatness and high pencil hardness. Further, even in a durability test under the conditions of 60° C. and 90% RH, the wavy irregularities did not increase.

(Display Apparatus)

By incorporating a polarizing plate of the present invention into a display apparatus, a display apparatus, of the present invention, having various aspects of high visibility can be produced. Hard coat films of the present invention are preferably used in reflection types, transparent types, and semi-transparent types of LCDs, and also preferably used in LCDs, with various driving systems, such as TN type, STN type, OCB type, HAN type, VA type, IPS type, etc. Further, anti-reflective films for which an antireflective layer is formed on its hard coat film of the present invention cause extremely slight color shading of reflected lights on the antireflective layer and excel in flatness, and therefore, are preferably used in various types of display apparatuses such as plasma displays, field emission displays, organic EL displays, inorganic EL displays, and electronic papers. Particularly, while images of fluorescent lamps reflected on a display apparatus with a large screen not smaller than a 30-inch type had distortion due to color shading or wavy irregularities, reflected images on display apparatuses of the present invention are free from distortion as in the case of reflection by mirrors, having an effect of preventing eyestrains even for long time viewing.

EXAMPLE

The following is a detailed description of this invention using examples, but the aspects of the invention are not limited by these examples. It is to be noted that "parts" hereinafter represents "parts by weight".

Example 1

Preparation of Cellulose Ester Film

Employing cellulose esters, plasticizers, ultraviolet ray absorbing agents (hereinafter, referred to as UV absorbers), prepared were polycondensation of the following reactive metal compound, microparticles, and solvents, which were described in Table 1, cellulose ester solutions exhibiting dope composition described in Table 2.

<Metal Alkoxide Hydrolysis>

Added to a vessel were 50 parts of tetramethoxy silane and 50 parts of ethanol, after which 2 parts of acetic acid and 8 parts of water were added, following which the mixture was stirred for 2 hours at room temperature.

<Microparticle Dispersion>

Mixed and dissolved while stirring were 5 parts of following Cellulose Ester D, and 1 part of AEROSIL R072V (produced by Nippon Aerosil Co., Ltd.), with 94 parts of methylene chloride and 8 parts of ethanol, whereby Microparticle Dispersion A was prepared.

TABLE 1

| Cellulose Ester | Substitution Degree | Mn | Mw/Mn |
|---|---|---|---|
| A | Acethyl group substitution degree 2.9 | 160000 | 1.7 |
| B | Acethyl group substitution degree 2.8 | 150000 | 2 |
| C | Acethyl group substitution degree 2.8 | 90000 | 3.5 |
| D | Acethyl group substitution degree 2.0 Propionyl group substitution degree: 0.8 | 100000 | 2.1 |
| E | Acethyl group substitution degree 1.9 Propionyl group substitution degree 0.75 | 90000 | 2.2 |
| F | Acethyl group substitution degree 1.88 Propionyl group substitution degree 0.7 | 70000 | 3.1 |
| G | Acethyl group substitution degree 2.5 | 80000 | 3.1 |
| H | Acethyl group substitution degree 1.7 Propionyl group substitution degree 0.9 | 70000 | 2.5 |
| I | Acethyl group substitution degree 1.7 Propionyl group substitution degree 0.85 | 50000 | 2.9 |
| J | Acethyl group substitution degree 1.65 Propionyl group substitution degree 0.9 | 30000 | 2.8 |
| K | Acethyl group substitution degree 1.88 Propionyl group substitution degree 0.7 | 25000 | 3.1 |
| Plasticizer | | | |
| A | Sample No. 1 (aromatic end group ester) | | |
| B | Sample No. 2 (aromatic end group ester) | | |
| C | Sample No. 4 (aromatic end group ester) | | |
| D | Sample No. 5 (aromatic end group ester) | | |
| E | Sample No. 6 (Comparative polyester) | | |
| F | Sample No. 7 (Comparative polyester) | | |
| G | trimethylolpropane tribenzoate (polyalcohol ester) | | |
| H | tripropylene glycol dibenzoate (polyalcohol ester) | | |
| I | ethylphthalylethyl glycolate | | |
| J | triphenyl phosphate | | |
| Ultraviolet Absorbing Agent | | | |
| A | TINUVIN 109 (produced by Ciba Specialty Chemicals) | | |
| B | TINUVIN 171 (produced by Ciba Specialty Chemicals) | | |
| C | 2-hydroxy-4-benzyloxy benzophenone | | |
| D | Compound D | | |
| Polycondensate of Reactive Metal Compoun | | | |
| A | tetramethoxy silane (a metal alkoxide hydrolysis) | | |
| Microparticle Dispersion | | | |
| A | AEROSIL R972V (produced by Nippon Aerosil Co., Ltd.) | | |

TABLE 1-continued

| | Solvent |
|---|---|
| A | 440 kg of methylene chloride and 35 kg of ethanol |
| B | 330 kg of methyl acetate and 145 kg of ethanol |

Chemical formula

Compound D

[Chemical structure of Compound D: a triazine ring with three phenol-containing substituents, one bearing an $OCH_2CHCH_2OC_{12}H_{25}$ group with an $OH$ branch]

A solvent was poured into an airtight vessel, after which the residual raw materials were sequentially added while stirring, and then heated and stirred until completely dissolved. The microparticles were dispersed with a part of the solvent and added to the solution. The solution was cooled to the casting temperature, and set aside, after which a defoaming process was conducted, and followed by the solution being filtered employing Azumi Filter Paper No. 244, produced by Azumi Filter Paper Co., Ltd., to obtain each cellulose ester solution.

Consequently, the cellulose ester solution, maintained at 33° C., was transferred to a die, and uniformly cast through the die slit onto the surface of a looped stainless steel belt. The casting portion of the stainless steel belt was heated by 37° C. water. After casting, doped film (after casting onto the stainless steel belt, known as a "web") on the metal support was dried by 44° C. blown air, and peeled off at a residual solvent volume of 120 weight %, and exhibited tension during peeling to enable it to be draw to obtain the predetermined longitudinal drawing ratio. Subsequently, both web edges were nipped, and the web was drawn at 130° C. to obtain the wide direction draw ratios described in Table 2. After drawing, the web was held for a few seconds to maintain the width, and then, after the wide direction tension was relieved, width maintaining was released. Further, the web was dried for 20 minutes while transporting through the third drying zone set to 125° C., to prepare Cellulose Ester Film Nos. 1-39, exhibiting a width of 1.4-2.0 m, knurling of 1.5 mm width and 8 μm height, and at the predetermined thicknesses.

Regarding each prepared Cellulose Ester Film, organized in Table 2 were the employed cellulose ester, plasticizer, UV absorber, polycondensates of reactive metal compounds, as well as also drawing ratio of the web, thickness of the prepared film, and width of the web.

TABLE 2-1

| *1 | Sellulose ester | Plasticizer | | UV absorber | | *2 | *3 | Solvent | Draw ratio *4 | *5 | Thickness | Width | Remarks |
|---|---|---|---|---|---|---|---|---|---|---|---|---|---|
| 1 | A(100 kg) | A(10 kg) | — | A(1 kg) | B(1 kg) | — | A(2 kg) | A | 1.1 *6 | 1.1 *6 | 40 μm | 1.5 m | Inv. |
| 2 | A(100 kg) | A(5 kg) | B(5 kg) | A(1 kg) | B(1 kg) | — | A(2 kg) | A | 1.1 *6 | 1.1 *6 | 40 μm | 1.5 m | Inv. |
| 3 | A(100 kg) | A(5 kg) | G(5 kg) | A(1 kg) | B(1 kg) | — | A(2 kg) | A | 1.1 *6 | 1.1 *6 | 40 μm | 1.5 m | Inv. |
| 4 | A(100 kg) | A(5 kg) | H(5 kg) | C(1 kg) | — | — | A(2 kg) | A | 1.1 *6 | 1.1 *6 | 40 μm | 1.5 m | Inv. |
| 5 | A(100 kg) | A(5 kg) | I(5 kg) | C(1 kg) | — | — | A(2 kg) | A | 1.1 *6 | 1.1 *6 | 40 μm | 1.5 m | Inv. |
| 6 | A(100 kg) | A(5 kg) | J(5 kg) | C(1 kg) | — | — | A(2 kg) | A | 1.1 *6 | 1.1 *6 | 40 μm | 1.5 m | Inv. |
| 7 | A(100 kg) | A(10 kg) | — | D(1 kg) | — | — | A(2 kg) | A | 1.1 *6 | 1.1 *6 | 40 μm | 1.5 m | Inv. |
| 8 | A(100 kg) | A(10 kg) | — | D(1 kg) | — | A(10 kg) | A(2 kg) | A | 1.1 *6 | 1.1 *6 | 40 μm | 1.5 m | Inv. |
| 9 | A(100 kg) | A(10 kg) | — | D(1 kg) | — | A(10 kg) | A(2 kg) | A | 1.1 *6 | 1.1 *6 | 80 μm | 1.5 m | Inv. |
| 10 | A(100 kg) | A(10 kg) | — | A(1 kg) | B(1 kg) | A(10 kg) | A(2 kg) | A | 1.1 *6 | 1.1 *6 | 80 μm | 1.5 m | Inv. |
| 11 | B(100 kg) | A(5 kg) | G(5 kg) | C(1 kg) | — | — | A(2 kg) | A | 1.1 *6 | 1.1 *6 | 40 μm | 1.5 m | Inv. |
| 12 | D(100 kg) | A(5 kg) | G(5 kg) | C(1 kg) | — | — | A(2 kg) | A | 1.1 *6 | 1.1 *6 | 70 μm | 1.5 m | Inv. |
| 13 | D(100 kg) | A(5 kg) | G(5 kg) | D(1 kg) | — | — | A(2 kg) | A | 1.1 *6 | 1.3 *6 | 80 μm | 1.5 m | Inv. |
| 14 | D(100 kg) | A(5 kg) | G(5 kg) | D(1 kg) | — | A(10 kg) | A(2 kg) | A | 1.1 *6 | 1.1 *6 | 70 μm | 2 m | Inv. |
| 15 | E(100 kg) | A(6 kg) | G(5 kg) | A(1 kg) | B(1 kg) | — | A(2 kg) | B | 1.1 *6 | 1.1 *6 | 57 μm | 1.5 m | Inv. |
| 16 | E(100 kg) | A(5 kg) | B(5 kg) | D(1 kg) | — | — | A(2 kg) | B | 1.1 *6 | 1.1 *6 | 57 μm | 1.5 m | Inv. |
| 17 | E(100 kg) | A(6 kg) | G(5 kg) | D(1 kg) | — | A(10 kg) | A(2 kg) | B | 1.1 *6 | 1.1 *6 | 57 μm | 1.5 m | Inv. |
| 18 | A(100 kg) | I(5 kg) | J(5 kg) | A(1 kg) | B(1 kg) | — | A(2 kg) | B | 1.1 *6 | 1.1 *6 | 80 μm | 1.5 m | Comp. |
| 19 | A(100 kg) | I(5 kg) | J(5 kg) | A(1 kg) | B(1 kg) | — | A(2 kg) | B | 1.1 *6 | 1.1 *6 | 40 μm | 1.5 m | Comp. |
| 20 | A(100 kg) | I(5 kg) | J(5 kg) | D(1 kg) | — | — | A(2 kg) | A | 1.1 *6 | 1.1 *6 | 40 μm | 2 m | Comp. |
| 21 | D(100 kg) | I(5 kg) | J(5 kg) | A(1 kg) | B(1 kg) | — | A(2 kg) | A | No drawing | 1.03 *6 | 57 μm | 1.5 m | Comp. |
| 22 | D(100 kg) | I(5 kg) | J(5 kg) | A(1 kg) | B(1 kg) | — | A(2 kg) | B | 1.1 *6 | 1.3 *6 | 80 μm | 1.5 m | Comp. |
| 23 | C(100 kg) | I(5 kg) | J(5 kg) | A(1 kg) | B(1 kg) | — | A(2 kg) | B | 1.1 *6 | 1.1 *6 | 57 μm | 1.5 m | Comp. |
| 24 | C(100 kg) | I(5 kg) | J(5 kg) | A(1 kg) | B(1 kg) | — | A(2 kg) | A | 1.1 *6 | 1.1 *6 | 57 μm | 1.5 m | Comp. |
| 25 | F(100 kg) | I(5 kg) | J(5 kg) | A(1 kg) | B(1 kg) | — | A(2 kg) | A | 1.1 *6 | 1.1 *6 | 57 μm | 1.5 m | Comp. |
| 26 | G(100 kg) | I(5 kg) | J(5 kg) | A(1 kg) | B(1 kg) | — | A(2 kg) | A | No drawing | 1.03 *6 | 57 μm | 1.5 m | Comp. |
| 27 | E(100 kg) | C(12 kg) | — | — | — | — | A(2 kg) | A | 1.1 *6 | 1.3 *6 | 70 μm | 1.5 m | Inv. |
| 28 | E(100 kg) | D(12 kg) | — | — | — | — | A(2 kg) | A | 1.1 *6 | 1.3 *6 | 70 μm | 1.5 m | Inv. |
| 29 | E(100 kg) | C(6 kg) | G(6 kg) | — | — | — | A(2 kg) | A | 1.1 *6 | 1.3 *6 | 70 μm | 1.5 m | Inv. |
| 30 | E(100 kg) | D(6 kg) | G(6 kg) | — | — | — | A(2 kg) | A | 1.1 *6 | 1.3 *6 | 70 μm | 1.5 m | Inv. |
| 31 | E(100 kg) | C(6 kg) | G(6 kg) | D(1 kg) | — | — | A(2 kg) | A | 1.1 *6 | 1.3 *6 | 70 μm | 1.5 m | Inv. |
| 32 | E(100 kg) | D(6 kg) | G(6 kg) | D(1 kg) | — | — | A(2 kg) | A | 1.1 *6 | 1.3 *6 | 70 μm | 1.5 m | Inv. |
| 33 | E(100 kg) | C(6 kg) | G(6 kg) | D(1 kg) | — | A(10 kg) | A(2 kg) | A | 1.1 *6 | 1.3 *6 | 70 μm | 1.5 m | Inv. |
| 34 | E(100 kg) | E(12 kg) | — | — | — | — | A(2 kg) | A | 1.1 *6 | 1.3 *6 | 70 μm | 1.5 m | Comp. |
| 35 | E(100 kg) | F(12 kg) | — | — | — | — | A(2 kg) | A | 1.1 *6 | 1.3 *6 | 70 μm | 1.5 m | Comp. |
| 36 | H(100 kg) | A(5 kg) | G(5 kg) | D(1 kg) | — | — | A(2 kg) | A | 1.1 *6 | 1.2 *6 | 40 μm | 1.5 m | Inv. |
| 37 | I(100 kg) | I(5 kg) | J(5 kg) | A(1 kg) | B(1 kg) | — | A(2 kg) | A | 1.1 *6 | 1.2 *6 | 40 μm | 1.5 m | Inv. |
| 38 | J(100 kg) | A(5 kg) | G(5 kg) | D(1 kg) | — | — | A(2 kg) | A | 1.1 *6 | 1.2 *6 | 40 μm | 1.5 m | Inv. |
| 39 | K(100 kg) | I(5 kg) | J(5 kg) | A(1 kg) | B(1 kg) | — | A(2 kg) | A | 1.1 *6 | 1.2 *6 | 40 μm | 1.5 m | Comp. |

*1: Cellulose Ester Film No.,
*2: Polycondensate of reactive metal compound,
*3: Microparticle disparsion,
*4: Longitudinal drawing immediately after peeling,
*5: Wide direction drawing,
*6: times,
Inv.: This invention,
Comp.: Comparative example Prepared Cellulose Ester Film Nos. 1-39 were evaluated on the following items, and the results are shown in Table 4.

<<Evaluation>>

(Breaking)

The number of film breaks of each roll of film was counted from start of film production till finish for twenty 2,600 m long rolls.
A: No breaks
B: 2-3 breaks
C: Frequent breaks (Transportation Test)

Each of 20 2,600 m rolls was stored in a closed container for 10 days summer, to simulate ocean shipment, and the winding status was evaluated.

Regarding sticking defects, the adhered parts were noted for a five-grade evaluation, as an average value of each roll. Further, regarding dip defects, the number of rolls exhibiting dip defects was noted for a five-grade evaluation.

(Sticking Defect)
A: none
B: 1-2 locations
C: 3-5 locations
D: 6-9 locations
E: more than 10 locations (Dip Defects)
A: no roll
B: 1-2 rolls
C: 3-5 rolls
D: 6-9 rolls
E: more than 10 rolls (Measurement of Dimensional Stability)

Each roll of Cellulose Ester Film was conditioned at 23° C. and 55% RH for 24 hours, after which two crossing cuts, longitudinal and lateral were made at 100 mm interval on the surface of the cellulose ester film, and the dimensions were measured very accurately and put it as "a". Then, the film was heat treated at 80° C. and 90% RH for 50 hours, and again stored at 23° C. and 55% RH for 24 hours, after which the distance between the two crossing cuts was measured employing a cathetometer, and put it as "b". The dimensional stability was determined from the following formula as the rate of dimensional changes met the following condition:

rate of dimensional changes (%)=[$(b-a)/a$]×100

TABLE 3

| *1 | Breaking | Sticking Defect | Dip Defects | Longitudinal direction | Lateral direction | Remarks |
|---|---|---|---|---|---|---|
| 1 | A | B | B | −0.07 | −0.05 | Inv. |
| 2 | A | B | B | −0.07 | −0.04 | Inv. |
| 3 | A | A | B | −0.08 | −0.08 | Inv. |
| 4 | A | A | B | −0.08 | −0.07 | Inv. |
| 5 | B | B | B | −0.15 | −0.15 | Inv. |
| 6 | B | B | B | −0.14 | −0.13 | Inv. |
| 7 | A | B | B | −0.07 | −0.05 | Inv. |
| 8 | A | A | A | −0.05 | −0.04 | Inv. |
| 9 | A | A | A | −0.12 | −0.10 | Inv. |
| 10 | A | A | A | −0.08 | −0.07 | Inv. |
| 11 | A | A | B | −0.08 | −0.06 | Inv. |
| 12 | A | A | B | −0.06 | −0.04 | Inv. |
| 13 | A | A | B | −0.07 | −0.07 | Inv. |
| 14 | A | A | A | −0.06 | −0.05 | Inv. |
| 15 | A | A | B | −0.07 | −0.06 | Inv. |
| 16 | A | B | B | −0.05 | −0.02 | Inv. |
| 17 | A | A | A | −0.04 | −0.03 | Inv. |
| 18 | D | D | D | −0.85 | −0.82 | Comp. |
| 19 | D | D | D | −0.41 | −0.39 | Comp. |
| 20 | D | D | D | −0.45 | −0.41 | Comp. |
| 21 | D | D | D | −0.55 | −0.51 | Comp. |
| 22 | D | D | D | −0.43 | −0.41 | Comp. |
| 23 | E | D | D | −0.62 | −0.61 | Comp. |
| 24 | E | D | D | −0.68 | −0.67 | Comp. |
| 25 | E | D | D | −0.88 | −0.85 | Comp. |
| 26 | E | D | D | −0.63 | −0.61 | Comp. |
| 27 | A | B | B | −0.06 | −0.04 | Inv. |
| 28 | B | B | B | −0.07 | −0.07 | Inv. |
| 29 | A | A | B | −0.06 | −0.03 | Inv. |
| 30 | B | B | B | −0.07 | −0.06 | Inv. |
| 31 | A | A | B | −0.05 | −0.02 | Inv. |
| 32 | B | B | B | −0.05 | −0.03 | Inv. |
| 33 | A | A | A | −0.05 | −0.01 | Inv. |
| 34 | E | D | D | −0.18 | −0.18 | Comp. |
| 35 | E | D | D | −0.19 | −0.18 | Comp. |
| 36 | A | A | A | −0.12 | −0.1 | Inv. |
| 37 | A | A | A | −0.13 | −0.1 | Inv. |
| 38 | A | B | B | −0.09 | −0.18 | Inv. |
| 39 | E | D | D | −0.95 | −0.92 | Comp. |

*1: Cellulose Ester Film No.,
Inv.: This invention,
Comp.: Comparative example

It is apparent from the noted results that the cellulose ester film of this invention exhibits less web breakage, minimized sticking defects and dip defects during transportation, and superior dimensional stability and flatness. Further, enhanced effects of this invention were exhibited when the acid number of the plasticizer of aromatic end ester is less than 0.5 mgKOH/g, based on comparison of Cellulose Ester Film Nos. 27-32.

Example 2

Coating of Active Ray Curable Resin Layer

An Active Ray Curable Resin Layer Coating Solution was prepared by filtration of following Coating Solution for Active Ray Curable Resin Layer employing a polypropylene filter at a pore diameter of 0.4 μm. On the surfaces of Cellulose Ester Film Nos. 1-39, this Coating Solution was coated employing a micro-gravure coater, after which the coated layer was dried at 90° C. Then, the dried layer was cured employing a UV lamp at 100 mV/cm² illuminance for irradiation parts at an irradiance level of 100 mJ/cm², whereby a 5 μm thick Active Ray Curable Resin Layer was formed, to prepare Hard Coat Film Nos. 1-39.

<Coating Solution for Active Ray Curable Resin Layer>

| | |
|---|---|
| Dipentaerythritol hexaacrylate | 70 parts |
| Dipentaerythritol pentaacrylate | 30 parts |
| Photoreaction initiator (IRGACURE 187, Produced by Ciba Speciality Chemicals) | 5 parts |
| Ethyl acetate | 120 parts |
| Propylene glycol monomethyl ether | 120 parts |
| Silicon compound (BYK-307, produced by BYK-Chemie Japan K.K.) | 0.4 part |

To above Coating Solution for an Active Ray Curable Resin Layer, added was the solution in which about 10 μm oxidized zirconium microparticles were dispersed in a solvent, after which the refractive index of the active ray curable resin layer was adjusted to 1.61, to prepare Coating Solution for Active Ray Curable Layer.

<<Coating of Back-Coat Layer>>

Further, following Coating Composition for a Back-Coat Layer was prepared by filtration of the following mixture employing a filter exhibiting more than a 99% capture ratio of 3 μm particles and less than a 10% capture ratio of less than 5 μm particles. This Coating Composition for Back-Coat Layer was applied onto the side opposite above Hard Coat Layer of Film employing an extrusion coater, to obtain a 15 μm wet thickness, and was dried at 90° C. for 30 seconds.

<Coating Composition for Back-Coat Layer>

| | |
|---|---|
| Diacetyl cellulose (acetyl group substitution degree of 2.4) | 0.5 part |
| Acetone | 70 parts |
| Methanol | 20 parts |
| Propylene glycol monomethyl ether | 10 parts |
| Microparticle of silica Aerosil 200V (produced by Nippon Aerosil Co., Ltd.) | 0.002 part |

As described above, Hard Coat Film Nos. 1-39 were prepared.

<<Preparation of Low Refractive Index Layer>>

Firstly, preparation of silica microparticles (being cavity particles) was conducted.

(Preparation of Silica Microparticle P-1)

A mixture of 100 g of silica sol, which exhibited an average 5 nm particle diameter, 20 weight % $SiO_2$ concentration, and 1,900 g of pure water was heated to 80° C. The pH of this reaction mother liquid was 10.5, which added at the same time were 9,000 g of sodium silicate containing 1.02 weight % $SiO_2$ and 9,000 g of sodium aluminate containing 1.02 weight % $Al_2O_3$, during which the temperature of the reaction liquid was maintained at 80° C. The pH of the reaction liquid was increased to 12.5 immediately after the addition, and then changed only a little. After the addition, the reacted liquid was cooled to ambient temperature, and washed using an ultrafiltration membrane, to prepare $SiO_2.Al_2O_3$ Core Particle Dispersion containing a solid content of 20 weight %. [Process (a)]

To 500 g of this Core Particle Dispersion, added was 1,700 g of pure water, and the solution was heated to 98° C. At this temperature, 3,000 g of silicic acid liquid (being a 3.5 weight % SiO2 concentration) which was obtained by dealkalization of an aqueous sodium silicate solution with a positive ion-exchange resin, to prepare a Dispersion in which 1$^{st}$ Silica Covering Layer was formed on the core particles.

[Process (b)]

Subsequently, to 500 g of Core Particle Dispersion having 1$^{st}$ Silica Covering Layer on the core, which dispersion contained a 13 weight % solid content due to washing after passing through an ultrafiltration membrane, added was 1,125 g of pure water, and further, 35.5% concentrated hydrochlic acid was dripped to bring the pH to 1.0, and thus, a dealuminization treatment was conducted. After that, while 10 L of an aqueous hydrochloride acid solution and 5 L of pure water were added, dissolved aluminum salt was removed, resulting in a Dispersion of $SiO_2.Al_2O_3$ Porous Particles, in which a part of constituent of the core particles forming 1$^{st}$ Silica Covering Layer were eliminated.

[Process (c)]

After a mixture of 1,500 g of above Porous Particle Dispersion, 500 g of pure water, 1,750 g of ethanol, and 626 g of 28% ammonia water was heated to 35° C., 104 g of ethyl silicate (being 28 weight % $SiO_2$) was added to form 2$^{nd}$ Silica Covering Layer on the surface of Porous Particles carrying a 1$^{st}$ Silica Covering Layer, covered with hydrolysis polycondensation of ethyl silicate. Subsequently, Dispersion of Silica Microparticles P-1 at a 20 weights solid content, the solvent of which was substituted with ethanol, was prepared employing an ultrafiltration membrane.

The thickness of 1$^{st}$ Silica Covering Layer, the average particle diameter, $MO_x/SiO_2$ (mol ratio), and the refractive index of this Silica Microparticle P-1, are shown in Table 4.

Herein, the average particle diameter was determined with a dynamic light scattering method, the refractive index was determined with the following method using Standard Refractive Index Liquids of Series A and AA produced by CARGILL Laboratories, Inc.

<Measuring method of Refractive Index of Particle>

(1) Charging the particle dispersion into an evaporator to evaporate the dispersion medium (2) Drying any of the above residue at 120° C., and powderizing the dried product (3) Dropping 2-3 drops of the standard refractive index liquid, of a known refractive index, onto a glass slide, and then, the above powder was mixed to it.

(4) Conducting above operation (3) using various standard refractive index liquids, and determining the refractive index of the colloid particle by the refractive index of the standard liquid when the mixture became transparent.

<<Surface Treatment and Coating of Low Refractive Index Layer>>

(Surface Treatment)

Conducted was an alkali treatment, that is, soaking above Hard Coat Film Nos. 1-39 in a 50° C. 1.5 N—NaOH aqueous solution for 2 minutes, and after washing in water, Film was neutralized by soaking in a 0.5 weight %-$H_2SO_4$ aqueous solution at ambient temperature for 30 seconds, followed by washing and drying.

(Preparation of Low Refractive Index Layer)

To a matrix of the mixture of 95 mol % $Si(OC_2H_5)_4$ and 5 mol % $C_3F_7$—$(OC_3F_6)$—O—$(CF_2)_2$—$C_2H_4$—O—$CH_2Si(OCH_3)_3$, added was 50 weight % of Silica Microparticles P-1 at an average particle diameter of 60 nm, after which 1.0 N—HCl was employed as a catalysis, followed by the solution being diluted with a solvent, to prepare a Solution for a Low Refractive Index Layer. The coating solution was applied onto the above Cellulose Ester Film on which surface treated a 0.1 µm Hard Coat Layer was formed employing a die coater method, after which UV irradiation was applied onto the coated layer after the coated layer was dried at 120° C. for one minute, to form a Low Refractive Index Layer exhibiting a 1.37 refractive index. Thus, prepared were Antireflection Film Nos. 1-39 coated with a Low Refractive Index Layer exhibiting a 1% reflection coefficient.

Subsequently, Polarizing Plates were prepared employing each of the Antireflection Film.

<<Preparation of Polarizing Plate>>

A polyvinyl alcohol film of 120 µm was subjected to uniaxial drawing (at a temperature of 110° C., and a drawing factor of 5). This drawn film was soaked in an aqueous solution comprising 0.075 g of iodine, 5 g of potassium iodide, 7.5 g of boric acid, and 100 g of water for 60 seconds, after which it was soaked in an aqueous solution of 6 g of potassium iodide, 7.5 g of boric acid, and 100 g of water. Then, the film was washed and dried, to prepare a polarizing film.

Subsequently, Polarizing Plates were prepared based on following Processes 1-5, for example, the polarizing film was adhered onto each of above Antireflection Film Nos. 1-17, to the opposite side of the polarized film Cellulose Ester Film No. 13 was pasted as an optical compensation film; the polarizing film was pasted with each of above Antireflection Film Nos. 18-26, 34 and 35, to the opposite side of which to be pasted with the polarizing film, while Cellulose Ester Film No. 22 was pasted as an optical compensation film; and the polarizing film was pasted with each of above Antireflection Film Nos. 27-33, to the opposite side of the polarizing film, and Cellulose Ester Film No. 30 was pasted as an optical compensation film. The phase difference of the reverse side of a Cellulose Ester Film was measured under the conditions of 23° C., 55% RH and at 590 nm, and the results were: in-plane

TABLE 4

| | | | Silica Covering Layer | | Outer Shell | Silica Microparticle | | |
|---|---|---|---|---|---|---|---|---|
| | | Core particle | Thickness | Thickness | | | Average particle | |
| No. | Kinds | $MO_x/SiO_2$ mol ratio | of 1$^{st}$ Layer (nm) | of 2$^{nd}$ Layer (nm) | Thickness (nm) | $MO_x/SiO_2$ mol ratio | diameter (nm) | Refractive Index |
| P-1 | Al/Si | 0.5 | 3 | 5 | 8 | 0.0017 | 47 | 1.28 | retardation $R_o$=45 nm, retardation of thickness direction $R_t$=130 nm; and exhibiting a slow axis in the width direction and its lag being within 1 degree (±1°).

Process 1: A Cellulose Ester Film was soaked in a 2 mol/L sodium hydroxide aqueous solution at 60° C. for 90 seconds, after which it was washed and dried, to obtain a saponified Cellulose Ester Film (being an optical compensation film), the side of which was adhered to a light polarizer. The above saponification treatment was conducted while the surface of the Antireflection Layer of the Antireflection Film was protected from alkali by adhering a polyethylene film.

Process 2: The above polarizing film was soaked for 1-2 seconds, in a tank of a polyvinyl alcohol adhesive having a solid content of 2 weight %.

Process 3: Any excessive adhesive during Process 2 was gently wiped off, after which this treated polarized film was placed on the Cellulose Ester Film treated in Process 1, and further both were put in position and laminated so that the Antireflection Layer was on the outside.

Process 4: The Antireflection Film, the polarizing film, and the Cellulose Ester Film (being the optical compensation film), all laminated in Process 3, were pasted at pressure of 20-30 N/cm² and a conveyance rate of about 2 m/min.

Process 5: The pasted sample prepared in Process 4 was dried at 80° C. in a drying machine, to prepare Polarizing Plate Nos. 1-39.

<<Preparation of Liquid Crystal Display>>

A liquid crystal panel to measure viewing angle was produced as below, and characteristics for a liquid crystal display device were evaluated.

Polarizing plates pasted on both sides of a 15 inch display VL-150SD produced by Fujitsu Ltd. were peeled away, after which two of each of Polarizing Plate Nos. 1-39 prepared as above were pasted onto both glass surfaces of a liquid crystal cell.

At that time, the orientation to paste that polarizing plate was placed so as to face the surface of the optical compensation film (being the retardation film) to the liquid crystal cell side, and also to face the absorption axis to the polarizing plate pasted originally in the same orientation, to prepare Liquid Crystal Display Device Nos. 1-39. Further, the employed polarizing plate was cut from the end portion of a long roll of antireflection film, the quality of which tended to fluctuate widely.

<Evaluation>

The following evaluation was conducted of the prepared antireflection films.

<<Flatness Index; Evaluation of Microasperity>>

Employing a laser displacement meter, Model LT-8100, exhibiting a resolution limit of 0.2 μm, produced by Keyence Corp., the flatness of the antireflection film was evaluated with measurement of minute rough spots on the surface by scanning in the lateral direction with the laser displacement meter.

The measurement method was: the film was placed on a flat and horizontal platform; both sides of the film were taped to the platform; a measurement camera was mounted to a conveyance rail parallel to the platform at a distance between the camera lens and the sample film of 25 mm; and scanning was conducted at a conveyance rate of 5 cm/min. The measurement was conducted from the reverse side provided with the antireflection layer to observe deformation of the film, such as undulation. The values obtained with measurement exhibited the status and the degree of microasperity of the film surface.

A: Microasperity due to deformation of the film was less than 0.5 μm.

B: Microasperity due to deformation of the film was between 0.5-1.0 μm.

C: Microasperity due to deformation of the film was between 1.0-3.0 μm.

D: Microasperity due to deformation of the film was at least 3.0 μm.

<<Flatness: Visual Evaluation>>

Each sample was cut to 10 cm width and 100 cm length, after which five 40 W fluorescent lamps (LR40S-EX-D/M, produced by Matsushita Electric Industrial Co., Ltd.) were fixed 1.5 m above the platform to irradiate the samples at the angle of 45°. Each film sample was placed on the platform, and asperity, observed by reflection on the film's reverse side, was visually judged as follows. With this method, "stretch" and "wrinkle" were evaluated.

A: All five fluorescent lamps were appeared in a straight line.

B: Some of the fluorescent lamps appeared to be slightly misaligned.

C: All the fluorescent lamps appeared to be misaligned.

D: The fluorescent lamps appeared to be grossly misaligned.

Next, the following evaluation was conducted on the obtained liquid crystal display devices.

<<Evaluation of Visibility>>

The above liquid crystal display devices were stored at 60° C. and 90% RH for 100 hours, and returned to 23° C. and 55% RH. As a result of observation of the surfaces of the display devices, ones employing the antireflection film of this invention exhibited superior flatness, while the comparative display devices exhibited minute ruffling unevenness and tended to cause fatigue when watching the device over a long time.

A: No ruffling was noted on the surface.

B: Slight ruffling was noted on the surface.

C: Minute ruffling was noted a little on the portion of the surface.

D: Minute ruffling unevenness was noted over the entire surface.

<<Evaluation of Color Shading>>

Each liquid display device displaying a black was visually evaluated on reflected unevenness of the surface.

A: No color shading of reflected light was noted, and displayed black appeared as tue black.

B: Slight color shading of reflected light was noted.

C: Color shading of reflected light was noted, but not to a practical issue.

D: Color shading of reflected light caused visual discomfort.

Evaluation results of the antireflection film and Liquid Crystal Display Device Nos. 1-39 are shown in Table 5. From the results, it was confirmed that Liquid Crystal Display Device Nos. 1-17 and 27-33 employed the antireflection film of this invention were superior in flatness, color shading, as well as visibility.

TABLE 5

| Anti-reflection Film No. | Antireflection Film | | Liquid Crystal Display Device | | |
|---|---|---|---|---|---|
| | Flatness Microasperity | Flatness Visual evaluation | *1 | Visibility | Remarks |
| 1 | A | A | A | A | Inv. |
| 2 | A | A | A | A | Inv. |

TABLE 5-continued

| Antireflection Film No. | Antireflection Film Flatness Microasperity | Antireflection Film Flatness Visual evaluation | Liquid Crystal Display Device *1 | Liquid Crystal Display Device Visibility | Remarks |
|---|---|---|---|---|---|
| 3 | A | A | A | A | Inv. |
| 4 | A | A | A | A | Inv. |
| 5 | A | A | A | A | Inv. |
| 6 | B | A | A | A | Inv. |
| 7 | A | A | A | A | Inv. |
| 8 | A | A | A | A | Inv. |
| 9 | A | A | A | A | Inv. |
| 10 | A | A | A | A | Inv. |
| 11 | A | A | A | A | Inv. |
| 12 | A | A | A | A | Inv. |
| 13 | A | A | A | A | Inv. |
| 14 | A | A | A | A | Inv. |
| 15 | A | A | A | A | Inv. |
| 16 | A | A | A | A | Inv. |
| 17 | A | A | A | A | Inv. |
| 18 | D | D | D | D | Comp. |
| 19 | C | D | C | D | Comp. |
| 20 | C | D | C | D | Comp. |
| 21 | D | D | D | D | Comp. |
| 22 | C | D | C | D | Comp. |
| 23 | D | D | D | D | Comp. |
| 24 | D | D | D | D | Comp. |
| 25 | C | D | C | D | Comp. |
| 26 | D | D | D | D | Comp. |
| 27 | A | A | A | A | Inv. |
| 28 | B | A | A | A | Inv. |
| 29 | A | A | A | A | Inv. |
| 30 | B | A | A | A | Inv. |
| 31 | A | A | A | A | Inv. |
| 32 | B | A | A | A | Inv. |
| 33 | A | A | A | A | Inv. |
| 34 | D | D | C | C | Comp. |
| 35 | D | D | C | C | Comp. |
| 36 | A | A | A | A | Inv. |
| 37 | A | A | A | A | Inv. |
| 38 | A | A | A | A | Inv. |
| 39 | D | D | D | D | Comp. |

Inv.: This invention,
Comp.: Comparative example
*1: Color shading of reflected light

INDUSTRIAL APPLICABILITY

This invention provides drawn cellulose ester film, hard coat film, antireflection film and optical compensation film which exhibit less web breakage during production, minimized sticking defects and dipping defects during transportation, and further exhibit superior dimensional stability and flatness, as well as providing a polarizing plate and a display device using the same.

The invention claimed is:

1. A stretched cellulose ester film, containing:
   a cellulose ester, and
   a plasticizer,
   wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and
   the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

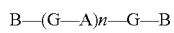   General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

2. The stretched cellulose ester film of claim 1, wherein the aromatic terminal ester type plasticizer expressed by the general formula (1) has an acid number of 0.5 mgKOH/g or less.

3. The stretched cellulose ester film of claim 1, further containing a benzophenone type ultraviolet absorber or a triazine type ultraviolet absorber.

4. The stretched cellulose ester film of claim 1, further containing a polycondensation of a reactive metallic compound.

5. The stretched cellulose ester film of claim 1, wherein the stretched cellulose ester film has a thickness of 10 μm to 70 μm.

6. The stretched cellulose ester film of claim 1, wherein the stretched cellulose ester film has a width of 1.4 m to 4 m.

7. The stretched cellulose ester film of claim 1, wherein the cellulose ester film contains the polyvalent alcohol ester type plasticizer in an amount of 1 to 12% by weight.

8. The stretched cellulose ester film of claim 1, wherein the cellulose ester film contains the aromatic terminal ester type plasticizer and the polyvalent alcohol ester type plasticizer in combination with the ratio of 1:5 to 5:1.

9. The stretched cellulose ester film of claim 1, wherein the total content of the plasticizers in the cellulose ester film is preferably from 5 to 20% by weight.

10. The stretched cellulose ester film of claim 1, wherein the cellulose ester film contains a phosphoric ester type plasticizer less than 1% by weight.

11. A hard coat film, comprising:
    a stretched cellulose ester film containing a cellulose ester and a plasticizer, and
    an acitinic ray-cured resin layer provided on the stretched cellulose ester film,
    wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and
    the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

   General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

12. An antireflective film, comprising:
    a stretched cellulose ester film containing a cellulose ester and a plasticizer, and
    an acitinic ray-cured resin layer and antireflective layer provided in this order on the stretched cellulose ester film,
    wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film containing the aromatic terminal ester type plasticizer in an amount of 1 to 20% by weight:

B—(G—A)n—G—B   General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

13. An optical compensation film, comprising:

a stretched cellulose ester film containing a cellulose ester and a plasticizer, wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

B—(G—A)n—G—B   General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more, and wherein the stretched cellulose ester film has $R_o$ of 20 to 300 nm under the condition of a temperature of 23° C. with a relative humidity of 55% RH and $R_t$ of 70 to 400 nm under the condition of a temperature of 23° C. with a relative humidity of 55% RH, wherein $R_o$ and $R_t$ are defined by the follow formulas:

$$Ro=(Nx-Ny)\times d$$

$$Rt=\{(Nx+Ny)/d-Nz\}\times d$$

where Nx, Ny and Nz represent refractive indexes in directions of main axes x, y and z of an indicatrix, respectively; Nx and Ny represent a refractive index in a film in-plane direction; and Nz represents a refractive index in a widthwise direction of the film, wherein Nx>Ny, and d represents the thickness (nm) of the film.

14. A polarizing plate, comprising:

an antireflective film, including:

a stretched cellulose ester film containing a cellulose ester and a plasticizer, and an acitinic ray-cured resin layer and antireflective layer provided in this order on the stretched cellulose ester film, wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

B—(G—A)n—G—B   General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

15. A polarizing plate, comprising:

an optical compensation film, including:

a stretched cellulose ester film containing a cellulose ester and a plasticizer, wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

B—(G—A)n—G—B   General formula (1)

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more, and wherein the stretched cellulose ester film has R0 of 20 to 300 nm under the condition of a temperature of 23° C. with a relative humidity of 55% RH and $R_t$ of 70 to 400 nm under the condition of a temperature of 23° C. with a relative humidity of 55% RH, wherein $R_o$ and $R_t$ are defined by the follow formulas:

$$Ro=(Nx-Ny)\times d$$

$$Rt=\{(Nx+Ny)/d-Nz\}\times d$$

where Nx, Ny and Nz represent refractive indexes in directions of main axes x, y and z of an indicatrix, respectively; Nx and Ny represent a refractive index in a film in-plane direction; and Nz represents a refractive index in a widthwise direction of the film, wherein Nx>Ny, and d represents the thickness (nm) of the film.

16. A display device, comprising:

an antireflective film, including:

a stretched cellulose ester film containing a cellulose ester and a plasticizer, and an acitinic ray-cured resin layer and antireflective layer provided in this order on the stretched cellulose ester film, wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

$$B-(G-A)n-G-B \qquad \text{General formula (1)}$$

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

17. A display device, comprising:

a polarizing plate including an antireflective film, wherein the antireflective film comprises:

a stretched cellulose ester film containing a cellulose ester and a plasticizer, and an acitinic ray-cured resin layer and antireflective layer provided in this order on the stretched cellulose ester film, wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

$$B-(G-A)n-G-B \qquad \text{General formula (1)}$$

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more.

18. A display device, comprising:

a polarizing plate including an optical compensation film, wherein the optical compensation film, includes:

a stretched cellulose ester film containing a cellulose ester and a plasticizer, wherein the cellulose ester has a total acyl substitution degree of 2.4 to 2.9, a number average molecular weight (Mn) of 30000 to 200000, and a value of a weight-average molecular weight (Mw)/a number average molecular weight (Mn) being 1.4 to 3.0, and the plasticizer includes at least two kinds of an aromatic terminal ester type plasticizer expressed by the following general formula (1) and a polyvalent alcohol ester type plasticizer in combination, and the cellulose ester film contains the aromatic terminal ester type plasticizer in an amount of 1 to 20% by weight:

$$B-(G-A)n-G-B \qquad \text{General formula (1)}$$

where B represents a benzenemonocarboxylic acid residue, G represents an alkylene glycol residue having a carbon number of 2 through 12 or an oxyalkylene glycol residue having a carbon number of 4 through 12, A represents an alkylene dicarboxylic acid residue having a carbon number of 4 to 12, and n indicates an integer of 0 or more, and wherein the stretched cellulose ester film has $R_0$ of 20 to 300 nm under the condition of a temperature of 23° C. with a relative humidity of 55% RH and $R_t$ of 70 to 400 nm under the condition of a temperature of 23° C. with a relative humidity of 55% RH, wherein $R_0$ and $R_t$ are defined by the follow formulas:

$$Ro=(Nx-Ny)\times d$$

$$Rt=\{(Nx+Ny)/d-Nz\}\times d$$

where Nx, Ny and Nz represent refractive indexes in directions of main axes x, y and z of an indicatrix, respectively; Nx and Ny represent a refractive index in a film in-plane direction; and Nz represents a refractive index in a widthwise direction of the film, wherein Nx>Ny, and d represents the thickness (nm) of the film.

* * * * *